(12) United States Patent
Yamaoka et al.

(10) Patent No.: US 8,040,785 B2
(45) Date of Patent: Oct. 18, 2011

(54) OPTICAL DISC, OPTICAL DISC MANUFACTURING METHOD, OPTICAL DISC RECORDING DEVICE AND OPTICAL DISC REPRODUCTION DEVICE

(75) Inventors: Masaru Yamaoka, Osaka (JP); Mamoru Shoji, Osaka (JP); Keiji Nishikiori, Kyoto (JP); Makoto Usui, Osaka (JP); Mitsuro Moriya, Nara (JP)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 12/302,201

(22) PCT Filed: May 28, 2007

(86) PCT No.: PCT/JP2007/060845
§ 371 (c)(1),
(2), (4) Date: Nov. 24, 2008

(87) PCT Pub. No.: WO2007/139077
PCT Pub. Date: Dec. 6, 2007

(65) Prior Publication Data
US 2009/0196140 A1 Aug. 6, 2009

(30) Foreign Application Priority Data
May 30, 2006 (JP) ................................. 2006-149187

(51) Int. Cl.
*G11B 7/24* (2006.01)
(52) U.S. Cl. ............... 369/275.1; 369/47.21; 369/47.28; 369/53.2; 264/447
(58) Field of Classification Search ............... 369/47.21, 369/47.28, 53.2, 275.1; 264/447
See application file for complete search history.

(56) References Cited

U.S. PATENT DOCUMENTS

| 6,038,207 | A | 3/2000 | Wachi | |
|---|---|---|---|---|
| 6,414,920 | B1 | 7/2002 | Lee | |
| 7,590,031 | B2 * | 9/2009 | Miyatake et al. | 369/13.38 |
| 7,619,953 | B2 * | 11/2009 | Shiina | 369/47.15 |
| 2002/0159356 | A1 | 10/2002 | Morioka et al. | |
| 2003/0054128 | A1 | 3/2003 | Sako et al. | |

(Continued)

FOREIGN PATENT DOCUMENTS
EP 1 251 505 10/2002
(Continued)

OTHER PUBLICATIONS

Supplementary European Search Report issued Mar. 16, 2009 in the Application No. EP 07 74 4279.

(Continued)

*Primary Examiner* — Wayne Young
*Assistant Examiner* — Brenda Bernardi
(74) *Attorney, Agent, or Firm* — Wenderoth Lind & Ponack, L.L.P.

(57) ABSTRACT

An optical disc includes a reflective film formed on concave and convex marks after the concave and convex marks are synchronized with the integral multiple of a channel bit length and formed in accordance with modulated main information. Thereafter, continuous or intermittent laser light synchronized with the integral multiple of the channel bit length is irradiated at intervals longer than the longest one of the concave and convex marks in accordance with a spiral track formed in a circumferential direction of the concave and convex marks, whereby an optical characteristic of the reflective film is changed to form a recordable mark and sub-information necessary to reproduce the main information is recorded in a superimposition manner.

15 Claims, 24 Drawing Sheets

U.S. PATENT DOCUMENTS

| | | |
|---|---|---|
| 2003/0152009 A1 | 8/2003 | Usui et al. |
| 2005/0128905 A1 | 6/2005 | Sako et al. |
| 2005/0163026 A1* | 7/2005 | Oshima et al. ............. 369/275.2 |
| 2005/0243691 A1 | 11/2005 | Usui et al. |

FOREIGN PATENT DOCUMENTS

| | | |
|---|---|---|
| EP | 1 345 214 | 9/2003 |
| JP | 8-147767 | 6/1996 |
| JP | 9-306030 | 11/1997 |
| JP | 2903422 | 3/1999 |
| JP | 2000-195192 | 7/2000 |
| JP | 2001-76345 | 3/2001 |
| JP | 3454410 | 7/2003 |
| WO | 02/101733 | 12/2002 |

OTHER PUBLICATIONS

International Search Report issued Sep. 4, 2007 in the International (PCT) Application No. PCT/JP2007/060845.

* cited by examiner

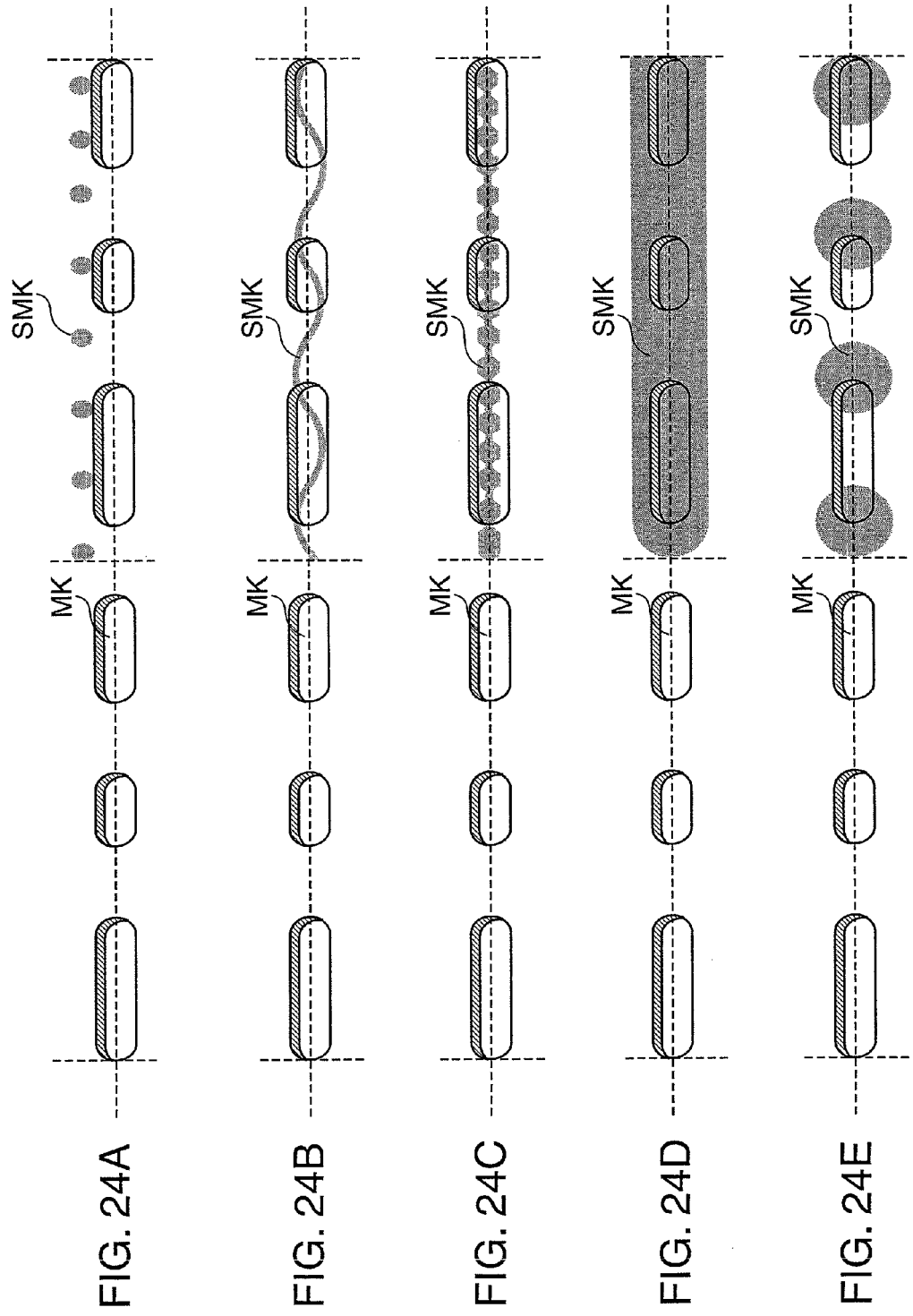

OPTICAL DISC, OPTICAL DISC MANUFACTURING METHOD, OPTICAL DISC RECORDING DEVICE AND OPTICAL DISC REPRODUCTION DEVICE

BACKGROUND OF THE INVENTION

1. Field of the Invention

The present invention relates to an optical disc such as a CD, a DVD or a Blu-ray disc, an optical disc manufacturing method for manufacturing an optical disc, an optical disc recording device for recording information on an optical disc and an optical disc reproduction device for reproducing information from an optical disc.

2. Description of the Background Art

Conventionally, optical discs are widely used as inexpensive recording media for digital information. For example, a Blu-ray disc has a capacity of 25 gigabytes with a single layer and 50 gigabytes with two layers and can record high-vision and good-quality video contents about 2 to 4.5 hours. Accordingly, as the optical disc capacity increases, the value of digital contents recorded on one optical disc increases and the protection of the copyright of the recorded digital content has become an essential technical problem.

However, nowadays, there are a great number of illegal optical disc manufacturer such as pirate makers for illegally duplicating digital contents from optical discs. This hinders a sound distribution of digital copyrighted works and creates a situation where profits are not fairly distributed to copyright holders.

Accordingly, technology for changing the reflectivity of a reproduction film on concave and convex marks by laser irradiation used for tracking of a guide groove in an optical disc having a digital copyrighted work recorded by the concave and convex marks is disclosed, for example, in patent document 1.

By using the optical disc disclosed in patent document 1, optical discs which need not be collected can be provided even if they are used, for example, for rental.

Further, for example, patent document 2 discloses technology for recording sub-information by locally changing the reflectivity of an information recording surface at a position at a specified distance from the edge of a mark or space based on a sub-data string for marks or spaces with a specified length or longer out of concave and convex marks.

According to the invention disclosed in patent document 2, the reflectivity of the mark or space is locally changed at such a timing as not to influence the positional information of the edge of the concave and convex mark. This enables the recording of sub-information that makes illegal copying difficult without influencing reproduction of a main data string represented by a mark string by an optical pickup.

Further, for example, patent document 3 discloses an information recording/reproducing method by which, using a recording medium which is optically changed depending on the quantity of irradiated laser light, laser light intensity modulated by a signal having the same band as a first signal obtained by modulating a signal such as a video or a data signal according to the quantity of laser light and having a recording state ON/OFF controlled by a second signal in a band lower than that of the first signal is irradiated twice or more to the same information track on the recording medium having the first signal already recorded with positions on the recording medium synchronized, the second signal is recorded in a superimposition manner to further optically change a part irradiated with the laser light, and the second signal is separated and reproduced at the time of reproduction.

According to the invention disclosed in patent document 3, by recording the second signal on the same information track in a superimposition manner as information indicating the deletion of the information of the first signal or information indicating the position of an information track as an alternative to the information of the first signal, the management of the information track on the recording medium can be realized without judging whether the information of the information track is valid or invalid or providing a special information track for managing the position of the information track as an alternative to the information track.

Further, for example, patent document 4 discloses an optical disc including a spiral first information track having specified data recorded thereon and a spiral second information track formed in a region between track parts of the first information track and having copy detection information recorded thereon.

According to the invention disclosed in patent document 4, by recording detection information used for copy disc discrimination on the second information track different form the first information track for data, an illegally copied disc can be effectively checked without influencing a normal operation. Further, by recording security information on the second information track, the illegal duplication of the security information can be prevented.

However, by any of these methods, it is difficult to record medium unique information of the optical disc while preventing the illegal duplication without increasing cost required for the manufacturing of the optical disc and without deteriorating the reading accuracy of main information. It is also difficult to record the medium unique information of the optical disc while efficiently preventing illegal duplication without sacrificing the recording region for the main information.

These are for the following reasons. In the invention disclosed in patent document 1, the guide groove is formed on the optical disc beforehand in order to change the reflectivity of the irradiated part by irradiating a recording laser beam of a specified intensity or higher to the optical disc. Normally, in the case of manufacturing an optical disc formed with a guide groove and concave and convex marks, it is necessary to record the guide groove to locate the concave and convex marks in the center after the concave and convex marks are recorded in an optical disc master or to record the concave and convex marks after the guide groove is recorded. However, in the case of a Blu-ray disc, accuracy in the order of several tens nanometers in a radial direction is necessary for positioning between these tracks, and it is difficult to record both the guide groove and the concave and convex marks using a normal mastering apparatus. In order to realize this, a special mastering apparatus is necessary and an increase of cost required for the manufacturing of an optical disc is unavoidable.

In the invention disclosed in patent document 2, laser light is irradiated to a position at the specified distance from the edge of the mark or space with the specified length or longer. Thus, it is necessary to search and save the mark or space with the specified length or longer, whereby a recording time for recording the sub-information is uselessly consumed and cost required for the manufacturing of the optical disc increases. In the case of recording the sub-information, for example, only on a synchronization code known to have a mark or space with the specified length or longer, a corresponding recording region is necessary to record the medium unique information of a hundred and several tens bytes. Therefore, in this case as well, the recording time or reproduction time is uselessly consumed.

In the invention disclosed in patent document 3, the second signal is recorded on the part prerecorded with the first signal a plurality of times in a superimposition manner, and this recording is repeated until the second signal can be normally read. Accordingly, the reading accuracy of the prerecorded first signal deteriorates and a recoverable defect margin such as an error correction deteriorates.

In the invention disclosed in patent document 4, the second information track having the security information recorded thereon is formed in the partial region between the track parts of the first information track and the first and second information tracks are arranged such that the position of the second information track is reached upon a movement from the first information track by one track pitch. However, the formation of the second information track between the track parts of the first information track means to double the track pitch of the adjacent parts of the first information track, wherefore the region for recording the main information is sacrificed by forming the second information track. In other words, recording capacity per optical disc is reduced by forming the second information track.

Patent document 1:
  Japanese Unexamined Patent Publication No. H09-306030
Patent document 2:
  Japanese Patent No. 3454410
Patent document 3:
  Japanese Patent No. 2903422
Patent document 4:
  Japanese Unexamined Patent Publication No. H08-147767

SUMMARY OF THE INVENTION

In view of the above problems, an object of the present invention is to provide an optical disc, an optical disc manufacturing method, an optical disc recording device and an optical disc reproduction device capable of recording sub-information necessary to reproduce main information without deteriorating the reading accuracy of the main information, so that the illegal duplication of optical discs is prevented.

An optical disc according to one aspect of the present invention is directed to an optical disc in which a reflective film is formed on concave and convex marks after the concave and convex marks synchronized with the integral multiple of a channel bit length are formed in accordance with modulated main information, characterized in that, after the optical disc is produced, continuous or intermittent laser light synchronized with the integral multiple of the channel bit length is irradiated at intervals longer than the longest one of the concave and convex marks in accordance with a spiral track formed in a circumferential direction of the concave and convex marks to change an optical characteristic of the reflective film, thereby forming a recordable mark to record sub-information necessary to reproduce the main information in a superimposition manner.

Another aspect of the present invention is directed to an optical disc manufacturing method, comprising a mastering step of producing an optical disc master formed with concave and convex marks synchronized with the integral multiple of a channel bit length in accordance with modulated main information; a stamping step of transferring the concave and convex marks of the optical disc master to an optical disc substrate; a sputtering step of forming a reflective film on the optical disc substrate; and a sub-information recording step of irradiating continuous or intermittent laser light synchronized with the integral multiple of the channel bit length at intervals longer than the longest one of the concave and convex marks in accordance with a spiral track formed in a circumferential direction of the concave and convex marks to change an optical characteristic of the reflective film after the reflective film is formed on the concave and convex marks of the optical disc in the sputtering step, thereby forming a recordable mark to record sub-information necessary to reproduce the main information in a superimposition manner.

Still another aspect of the present invention is directed to an optical disc recording device for recording sub-information necessary to reproduce main information on an optical disc prerecorded with the main information by concave and convex marks, comprising a tracking unit for controlling a position to be irradiated with laser light in accordance with a spiral track formed in a circumferential direction of the concave and convex marks; a reproduction signal extracting unit for extracting a reproduction signal from the reflected light of reproduction laser light irradiated to the concave and convex marks; a clock extracting unit for extracting a channel clock synchronized with a channel bit length of the concave and convex marks; and a sub-information recording unit for irradiating recording laser light synchronized with a band which is the integral multiple of the channel clock and lower than the band of the reproduction signal to change an optical characteristic of a reflective film formed on a recording surface of the optical disc, thereby forming a recordable mark to record the sub-information on the optical disc in a superimposition manner.

Further another aspect of the present invention is directed to an optical disc reproduction device for reproducing main information from concave and convex marks of an optical disc and reproducing sub-information necessary to reproduce the main information from a recordable mark formed by changing an optical characteristic of a reflective film of the optical disc through the irradiation of laser light, comprising a tracking unit for controlling a position to be irradiated with the laser light in accordance with a spiral track formed in a circumferential direction of the concave and convex marks; a reproduction signal extracting unit for extracting a reproduction signal from the reflected light of reproduction laser light irradiated to the concave and convex marks; a clock extracting unit for extracting a channel clock synchronized with a channel bit length from the reproduction signal; a separating unit for separating a concave and convex mark reproduction signal corresponding to the concave and convex marks and a recordable mark reproduction signal corresponding to the recordable mark from the reproduction signal; and a sub-information reproducing unit for reproducing the sub-information from the recordable mark reproduction signal synchronized with a band which is the integral multiple of the channel clock and lower than the band of the concave and convex mark reproduction signal.

Still another aspect of the present invention is directed to an optical disc including a main information recording region where main information is recorded by concave and convex marks and a sub-information recording region where sub-information necessary to reproduce the main information is recorded by a recordable mark formed by irradiating laser light after the concave and convex marks are formed, characterized in that the recordable mark is formed in the sub-information recording region by irradiating the laser light from a recording starting point based on an angular position of a reference position in the main information recording region to change the reflectivity of a reflective film, whereby the sub-information is recorded in a superimposition manner.

Still another aspect of the present invention is directed to an optical disc recording device for recording main information and sub-information on an optical disc including a main information recording region where main information is recorded by concave and convex marks and a sub-information recording region where sub-information necessary to reproduce the main information is recorded by a recordable mark formed by irradiating laser light after the concave and convex marks are formed, comprising a clock generator for generating a clock signal synchronized with the rotation of the optical disc; a reference angle extracting unit for extracting an angular position of a reference position in the main information recording region; and a sub-information recording unit for irradiating laser light synchronized with the clock signal generated by the clock generator from a recording starting point in the sub-information recording region specified based on the angular position extracted by the reference angle extracting unit to record the sub-information in a superimposition manner.

Still another aspect of the present invention is directed to an optical disc reproduction device for reproducing main information and sub-information from an optical disc including a main information recording region where main information is recorded by concave and convex marks and a sub-information recording region where sub-information necessary to reproduce the main information is recorded by a recordable mark formed by irradiating laser light after the concave and convex marks are formed, comprising a clock generator for generating a clock signal synchronized with the rotation of the optical disc; a reference angle extracting unit for extracting an angular position of a reference position in the main information recording region; and a sub-information reproducing unit for reproducing the sub-information in synchronism with the clock signal generated by the clock generator from a reproduction starting point in the sub-information recording region specified based on the angular position extracted by the reference angle extracting unit.

According to the present invention, the sub-information necessary to reproduce the main information can be recorded without deteriorating the reading accuracy of the main information, so that the illegal duplication of the optical disc can be prevented.

BRIEF DESCRIPTION OF THE DRAWINGS

FIG. 24A is a diagram showing recordable marks intermittently formed between tracks, FIG. 24B is a diagram showing a recordable mark meandering on concave and convex marks, FIG. 24C is a diagram showing recordable marks having a short interval in a circumferential direction and intermittently formed, FIG. 24D is a diagram showing a recordable mark longer than the length of concave and convex marks in a radial direction and continuously formed, and FIG. 24E is a diagram showing recordable marks longer than the length of concave and convex marks in a radial direction and intermittently formed.

DETAILED DESCRIPTION OF THE INVENTION

Hereinafter, embodiments of the present invention are described with reference to the accompanying drawings. The present invention can be embodied while being suitably changed without changing the essential point thereof.

First Embodiment (1-1) Optical Disc According to First Embodiment

Figure 1:
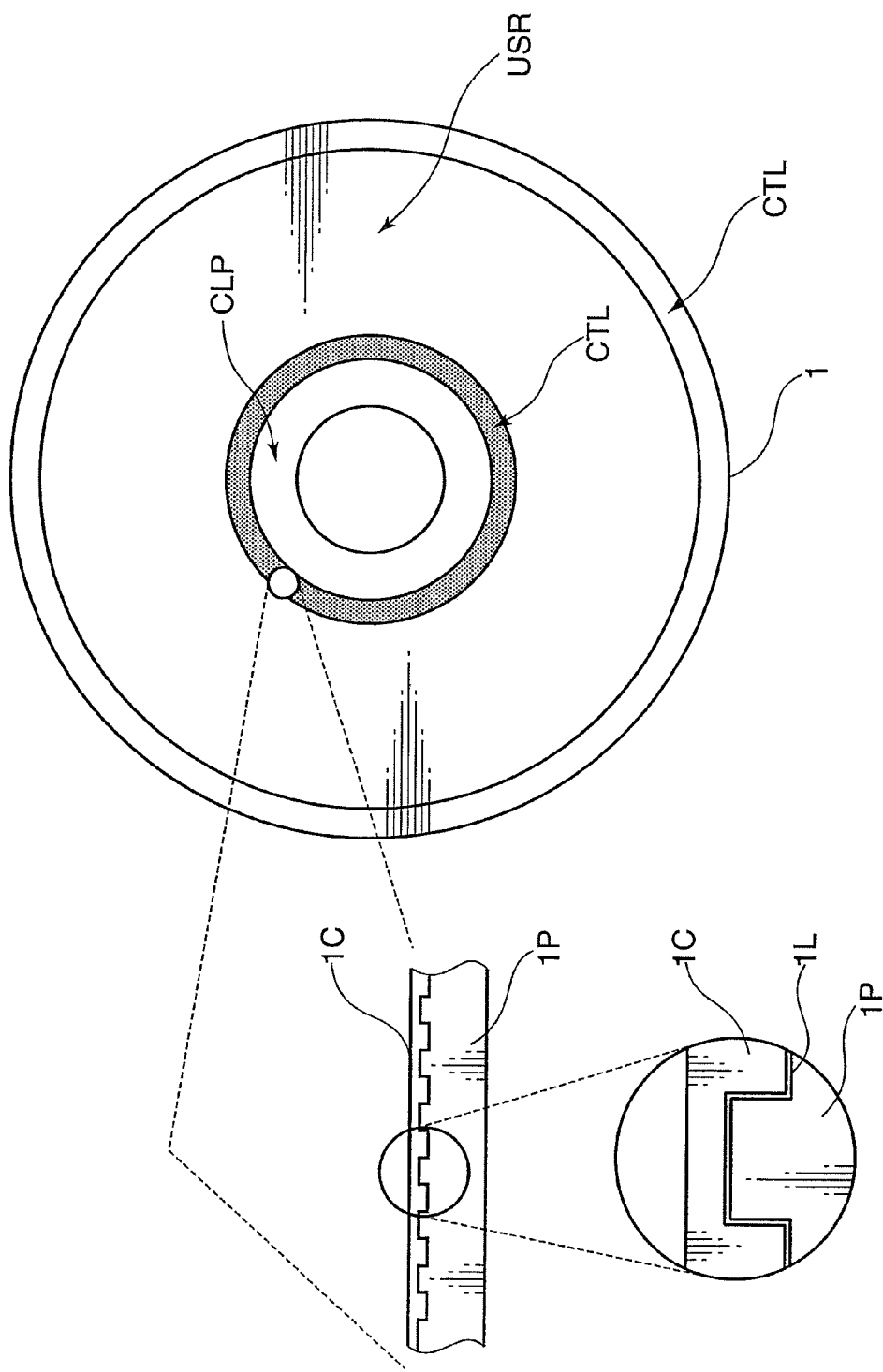
FIG. 1 is a conceptual diagram showing the construction of an optical disc according to a first embodiment.

FIG. 1 is a conceptual diagram showing the construction of an optical disc 1 according to a first embodiment. The optical disc 1 shown in FIG. 1 is comprised of a clamp region CLP, control regions CTL at inner and outer circumferential sides, and a user region USR.

The clamp region CLP is a feed portion upon loading the optical disc 1 and, normally, no information is recorded thereon.

The control regions CTL are provided at two positions, i.e. at the inner and outer circumferential sides of the user region USR, and management information, copyright information, physical characteristic information or the like of the optical disc 1 is recorded by concave and convex recording marks. The characteristic of the optical disc 1 is that a medium ID (medium unique information) is recorded by locally changing the reflectivity of a reflective film 1L on the concave and convex marks on the same track as the one formed by the concave and convex marks in the control region CTL at the inner circumferential side through the irradiation of laser light. The medium ID is information for identifying the optical disc.

The optical disc 1 is formed by transferring concave and convex marks to an optical disc substrate 1P using a stamper, depositing (sputtering) a reflective film 1L, whose reflectivity changes according to laser irradiation, on the concave and convex marks and covering the reflective film 1L with a cover layer 1C, for example, by the application of a thin film sheet or by a spin coating method. After the optical disc 1 is produced, the medium ID is recorded as information unique to each optical disc in a superimposition manner by laser irradiation to the concave and convex marks in the control region CTL at the inner circumferential surface.

The reflective film 1L of the optical disc 1 may be realized by using a pigmented film made of an organic material whose reflectivity irreversibly changes by the irradiation of laser light or by using a phase-change film such as a film made of an inorganic alloy material or a Te—O—Pd recording film. Information can be recorded on all of these recording films by changing the reflectivities thereof through thermal fluctuation caused by the irradiation of laser light with a specified intensity.

Figure 2:
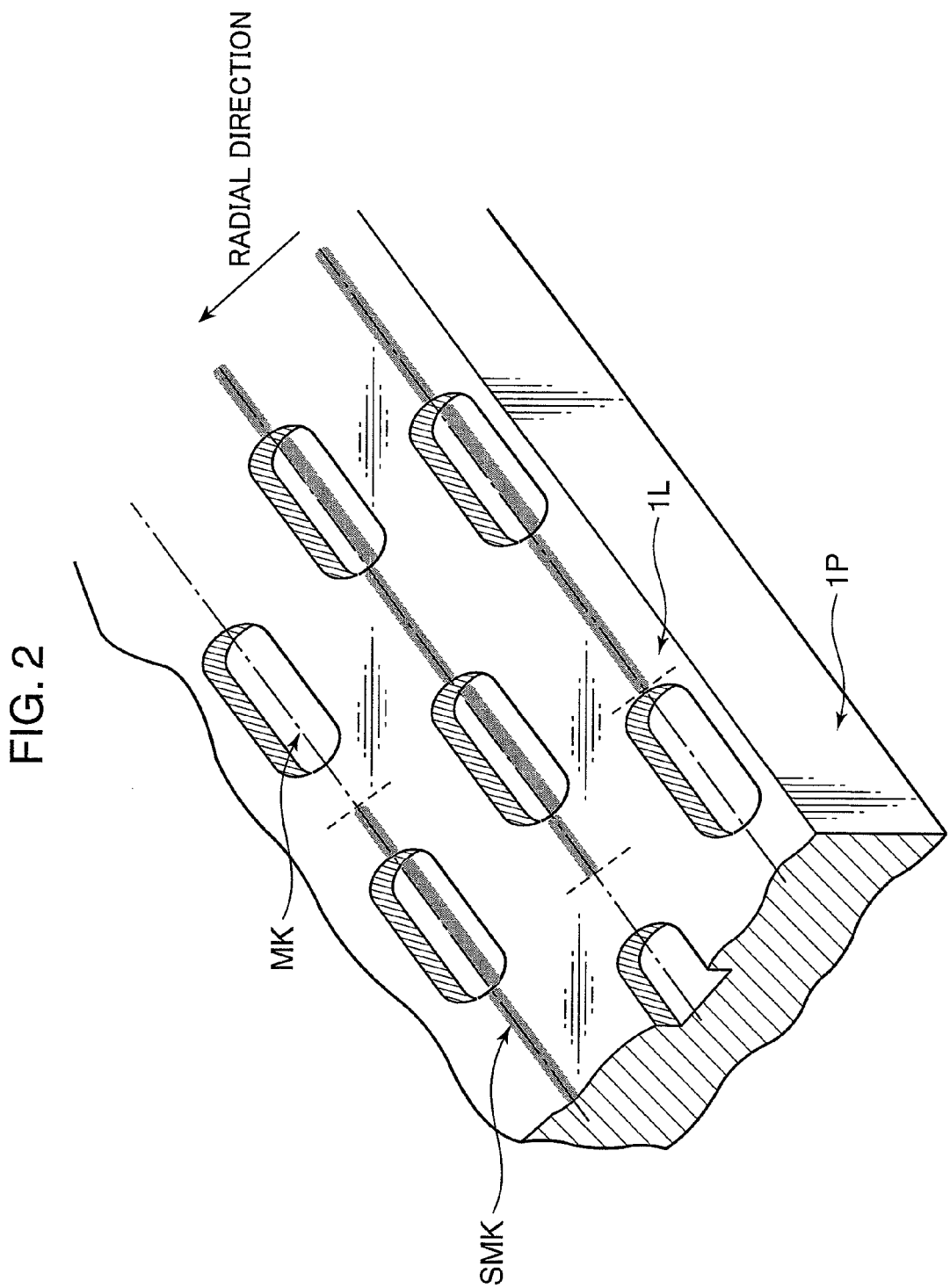
FIG. 2 is a conceptual diagram showing a recording surface of a control region at an inner circumferential side of the optical disc according to the first embodiment.
Figure 3:
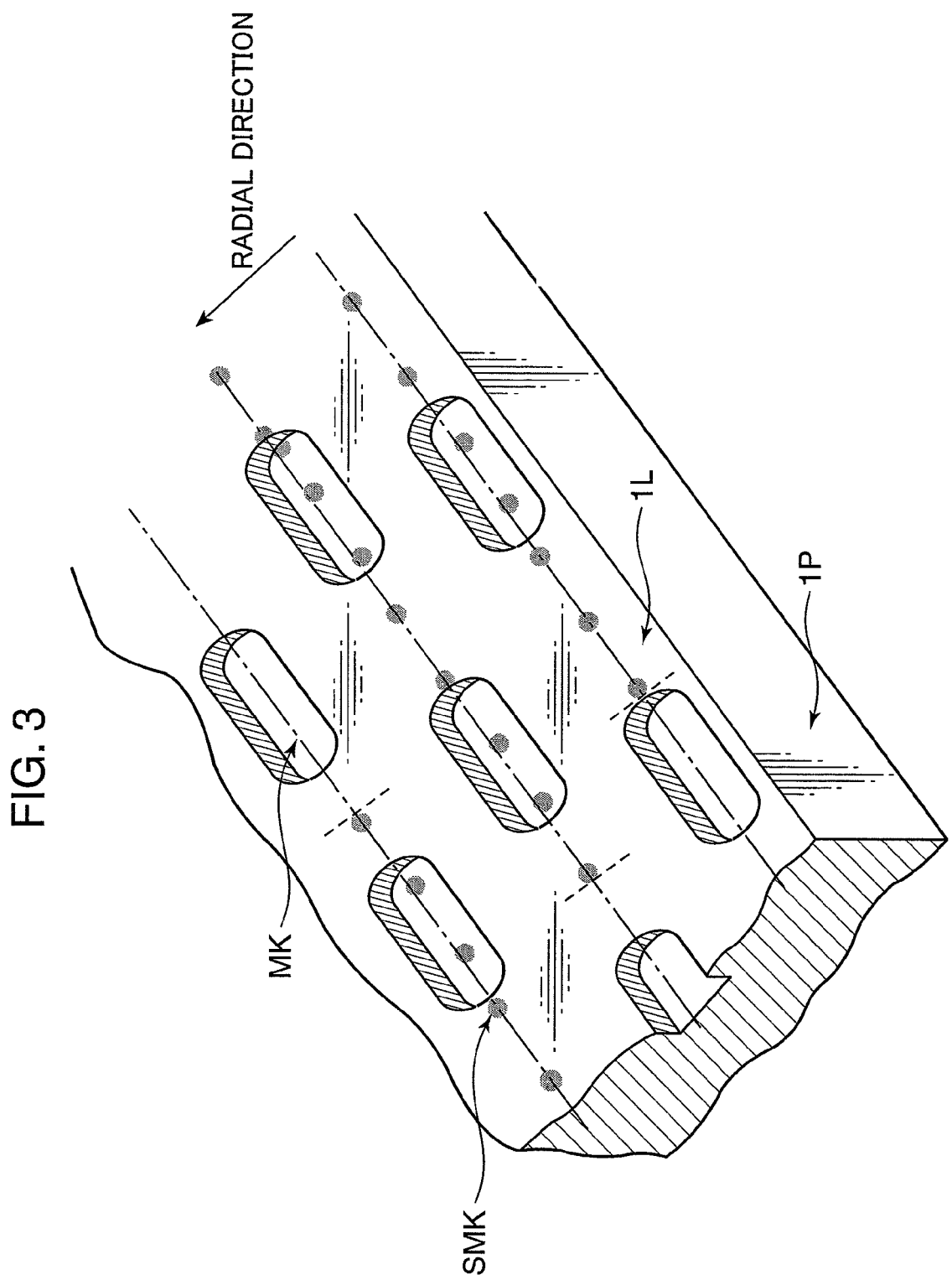
FIG. 3 is a conceptual diagram showing the recording surface of the control region at the inner circumferential side of the optical disc according to the first embodiment.
Figure 4:
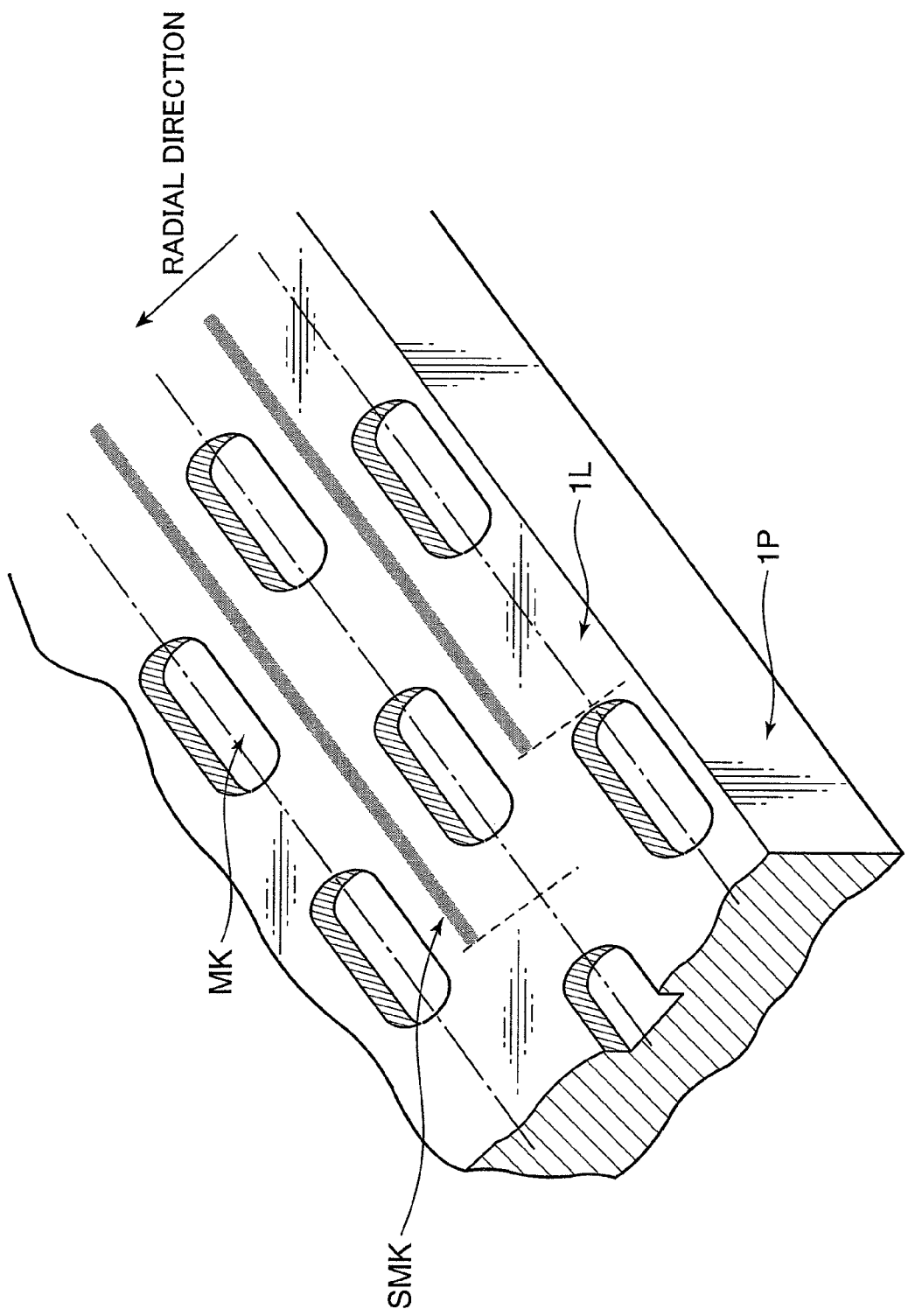
FIG. 4 is a conceptual diagram showing the recording surface of the control region at the inner circumferential side of the optical disc according to the first embodiment.

FIGS. 2 to 4 are conceptual diagrams showing a recording surface of the control region CTL at the inner circumferential side of the optical disc 1 according to the first embodiment.

As described above, the optical disc 1 according to the first embodiment is formed by transferring concave and convex marks MK to the optical disc substrate 1P, for example, made of polycarbonate, depositing the reflective film 1L whose reflectivity changes through laser irradiation on the concave and convex marks, and recording reproducible management information, copyright information, physical characteristic information or the like as main information on the control region CTL at the inner circumferential side by laser irradiation.

After these pieces of main information are transferred to produce the optical disc, recordable marks SMK are formed on the optical disc 1 by locally changing the reflectivity of the reflective film 1L through the irradiation of laser light and the medium ID is recorded as sub-information in a superimposition manner.

The feature of the recordable marks SMK shown in FIG. 2 is that the recordable marks SMK are formed by irradiating the laser light on the tracks formed by the concave and convex marks MK. Further, the width of the recordable marks SMK in a radial direction of the optical disc is narrower than that of the concave and convex marks MK in the radial direction of the optical disc. Thus, the fluctuation of the reflected light level caused by forming the recordable marks SMK can be made smaller than the modulation factor of the concave and convex marks MK at the time of reproduction, wherefore the deterioration of the reproduction accuracy of the concave and convex marks MK can be reduced.

By averagely setting the modulation factor of the recordable marks SMK, which is the fluctuation of the reflected light level produced by forming the recordable marks SMK, smaller than half the modulation factor of the concave and convex marks MK as a difference between the reflected light level of the concave and convex marks MK and that of the reflective film other than the concave and convex marks MK, there is no likelihood of erroneously reproducing the edge position of a reproduction signal of the concave and convex marks MK. Therefore, the reproduction accuracy of the concave and convex marks MK is not influenced.

The recording band of the recordable marks SMK is lower than that of the longest mark of concave and convex mark MK. Thus, it becomes possible to separate the concave and convex marks MK and the recordable marks SMK by a band-limiting circuit (filter) at the time of reproduction, wherefore mutual reproduction accuracies can be ensured.

The feature of the recordable marks shown in FIG. 3 is that the recordable marks SMK are formed by irradiating laser light on the tracks formed by the concave and convex marks MK. Further, the recordable marks SMK are discretely formed in a band lower than the recording band of the longest one of the concave and convex marks MK. The width of one recordable mark SMK discretely formed in a track direction is smaller than that of the shortest one of the concave and convex marks MK and shorter than a channel bit length for recording the concave and convex marks MK. Thus, the recordable marks SMK have a higher recording band than the concave and convex marks MK from a micro perspective while having a lower recording band than the concave and convex marks MK from a macro perspective. Accordingly, it becomes possible to separate the concave and convex marks MK and the recordable marks SMK by a band-limiting circuit (filter) at the time of reproduction, wherefore mutual reproduction accuracies can be ensured.

Since the recordable marks SMK shown in FIG. 3 are discretely formed, the fluctuation amount of the reflected light level can be set smaller than the fluctuation amount of the reflected light level of the recordable mark SMK shown in FIG. 2, whereby the influence on the reproduction accuracy of the concave and convex marks MK can be further reduced. On the other hand, the reproduction accuracy of the recordable marks SMK shown in FIG. 3 is inferior to that of the recordable mark SMK shown in FIG. 2.

The feature of the recordable marks SMK shown in FIG. 4 is that the recordable marks SMK are formed by changing the reflectivity of the reflective film 1L between the tracks of the concave and convex marks MK through laser irradiation. Similar to the recordable marks SMK shown in FIGS. 2 and 3, those shown in FIG. 4 are recorded in a recording band lower than that of the longest one of the concave and convex marks MK. Thus, the recordable marks SMK shown in FIG. 4 are better than those shown in FIGS. 2 and 3 in not influencing the reproduction accuracy of the concave and convex marks MK. On the other hand, at the time of recording, the recordable marks SMK shown in FIG. 4 is inferior to those shown in FIGS. 2 and 3 in needing an additional construction for tracking control between the tracks.

By the recordable marks SMK shown in FIGS. 2 to 4, identification information unique to each medium can be recorded on the produced optical disc 1 while reducing the influence on the reproduction accuracy of the concave and convex marks MK.

The optical disc 1 of the first embodiment preferably uses the reflective film 1L whose reflectivity increases by the irradiation of laser light. This is because the reflectivity of a reflective film made of a metal film in a normal read-only optical disc is reduced by the irradiation of laser light. Thus, if the reflectivity of the optical disc is increased by the irradiation of laser light, an effect of preventing illegal duplication is improved. Such a reflective film can be realized by using an organic pigmented film or a phase-change film or by being initialized to have the above characteristic using a phase-change film.

(1-2) Optical Disc Manufacturing Method According to First Embodiment

Figure 5:
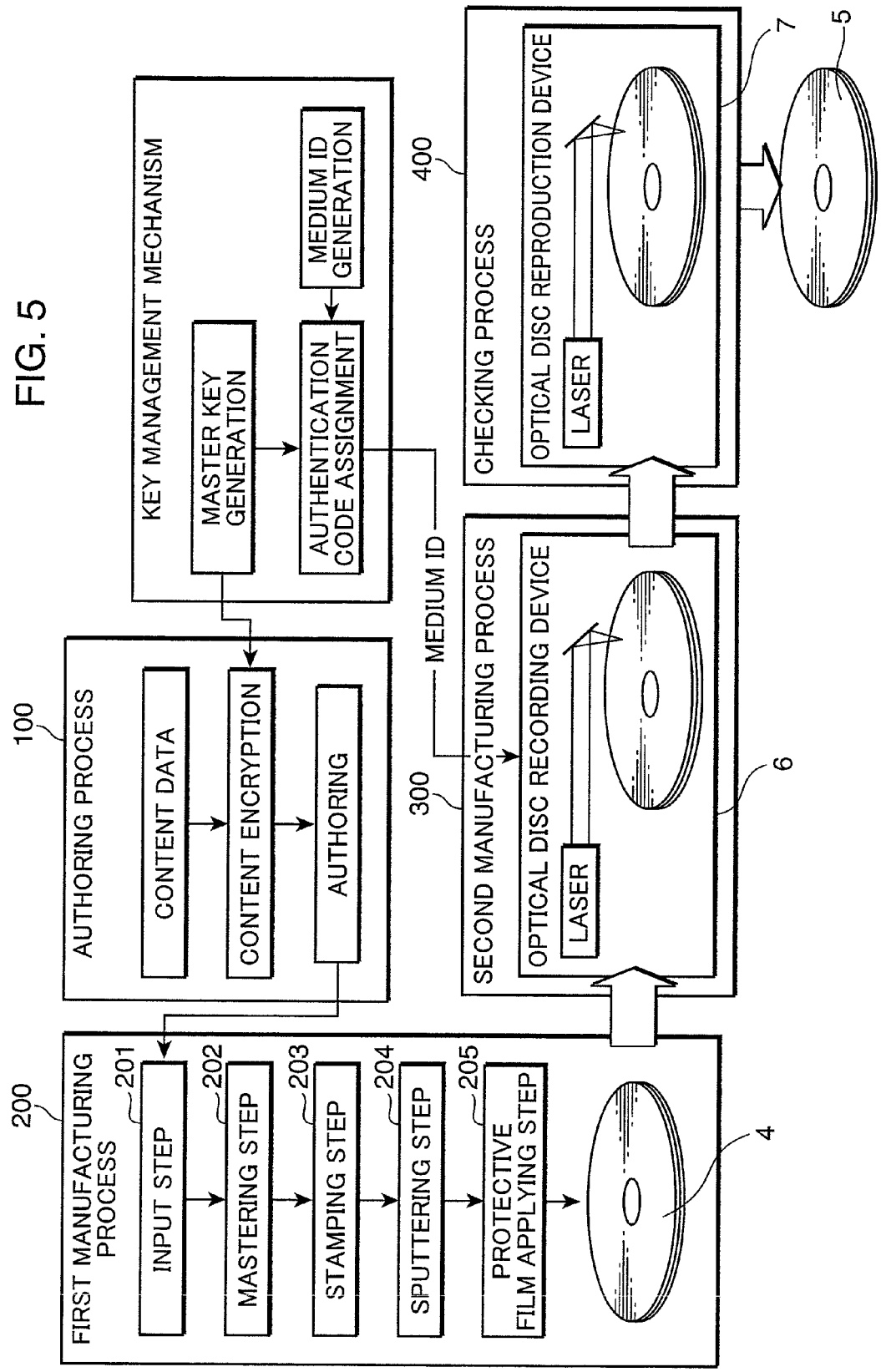
FIG. 5 is a diagram showing an optical disc manufacturing method according to the first embodiment.

FIG. 5 is a diagram showing an optical disc manufacturing method according to the first embodiment. The optical disc manufacturing method according to the first embodiment includes an authoring process 100, a first manufacturing process 200, a second manufacturing process 300 and a checking process 400.

In the authoring process 100, content data to be recorded on the optical disc is authored in a disc format after being encrypted using an encryption key (master key) generated by a key management mechanism. The authored content data is outputted to the first manufacturing process 200.

In the first manufacturing process 200, an input step 201, a mastering step 202, a stamping step 203, a sputtering step 204 and a protective film applying step 205 are successively performed in this order to produce an optical disc having no medium ID recorded thereon.

In the input step 201, the content data generated in the authoring process 100 is inputted.

In the mastering step 202, a glass master having a photoresist applied thereto is exposed with a laser or electron beam for development based on the authored content data inputted from the authoring process 100, whereby a disc master cut with concave and convex marks is produced.

The disc master produced in the mastering step 202 has, thereafter, plating applied to a recording surface side where the concave and convex marks are formed, thereby producing a stamper. The stamping step 203 is a so-called replication step of replicating this stamper, wherein an optical disc substrate 1P having the concave and convex marks transferred by the injection molding of transparent resin is produced.

In the sputtering step 204, a reflective film is formed by sputtering or deposition on the concave and convex marks of the optical disc master having the concave and convex marks transferred thereto and produced in the stamping step 203. This reflective film may be a pigmented film or a phase change film made of an inorganic alloy material or Te—O—Pd recording film. In other words, these reflective films are those, the reflectivities of the recording films of which changes by the irradiation of laser light having a specified intensity and on which irreversible recording marks can be formed. The optical disc manufacturing method of this embodiment is characterized by this point as compared with normal optical disc manufacturing methods.

In the protective film applying step 205, a protective film 1C is formed on the concave and convex marks by applying a thin protective sheet or forming a thin film by spin coating on the optical disc substrate 1P having the reflective film applied in the sputtering step 204.

By the first manufacturing process 200 comprised of the above steps 201 to 205, the optical disc having the concave and convex marks formed and having the reflective film with the changeable reflectivity by the irradiation of laser light formed on the concave and convex marks is manufactured, and the second manufacturing process 300 follows.

In the second manufacturing process 300, a medium ID assigned with a digital certificate issued from the key management mechanism or an authentication code such as a message authentication code (MAC) is recorded on the optical disc manufactured in the first manufacturing process 200 by an optical disc recording device (sub-information recording device) 6.

The optical disc recording device 6 records the medium ID by reproducing the concave and convex marks of the optical disc and changing the reflectivity of the reflective film on the concave and convex marks through the irradiation of laser light having recording intensity at a specified timing based on the addresses of the concave and convex marks. The construction of the optical disc recording device 6 is described in detail in "(3-1) Optical Disc Recording Device According to First Embodiment". In this process, the medium ID is recorded on the optical disc, and the next checking process 400 follows.

In the checking process 400, whether or not the medium ID was normally recorded in the second manufacturing process 300 is checked by an optical disc reproduction device 7. The optical disc reproduction device 7 may be realized using the same device as the optical disc recording device 6 in the second manufacturing process 300 or using a device different therefrom.

The optical disc reproduction device 7 reproduces the concave and convex marks of the optical disc, generates a correlation sequence from a specified timing based on the addresses of the concave and convex marks, and detects the medium ID by performing a correlation integral of a reproduction signal obtained from the reflected light of the irradiated laser light and the correlation sequence. A method for judging whether or not the medium ID was normally recorded in the checking process 400 may be such that an error correction is performed using parity bits assigned to the medium ID beforehand and judgment is made based on the error bit number or such that the correlation integral is performed within a specified time, a resulting correlation integration value is judged using a predetermined threshold value and the medium ID is judged to be normal if the correlation integration value higher than the threshold value is detected. The construction of the optical disc reproduction device 7 is described in detail later in "(1-4) Optical Disc Reproduction Device According to First Embodiment".

Finally, in this checking process 400, an optical disc 5 having the medium ID normally recorded thereon is shipped as a final product.

As described above, if the optical disc manufacturing method of the first embodiment is used, the medium ID unique to each optical disc can be additionally recorded even for the read-only optical disc manufactured by the input process, the mastering process, the stamping process, the sputtering process and the protective film applying process. Further, since the second manufacturing process for recording the medium ID on the optical disc and the checking process 400 for checking the presence of the medium ID recorded on the optical disc can be realized by devices whose constituent elements are not largely different from normal optical disc recording devices and optical disc reproduction devices, there is no likelihood of increasing the production cost of the optical disc. Further, the medium ID is extracted by detecting a fine fluctuation of the reflected light at the time of reproducing the concave and convex marks, specifically extracted by performing a correlation integral of the reproduction signal of the concave and convex marks and the correlation sequence secretly produced inside. Thus, the manufacturing of the optical disc by pirate makers who cannot know the medium ID and the duplication thereof can be prevented. Further, since the recordable marks recording the medium ID are recorded by changing the reflectivity through the irradiation of laser light, there is sufficient resistance to illegal duplication methods for transferring information by peeling off the protective film 1C.

(1-3) Optical Disc Recording Device According to First Embodiment

Figure 6:
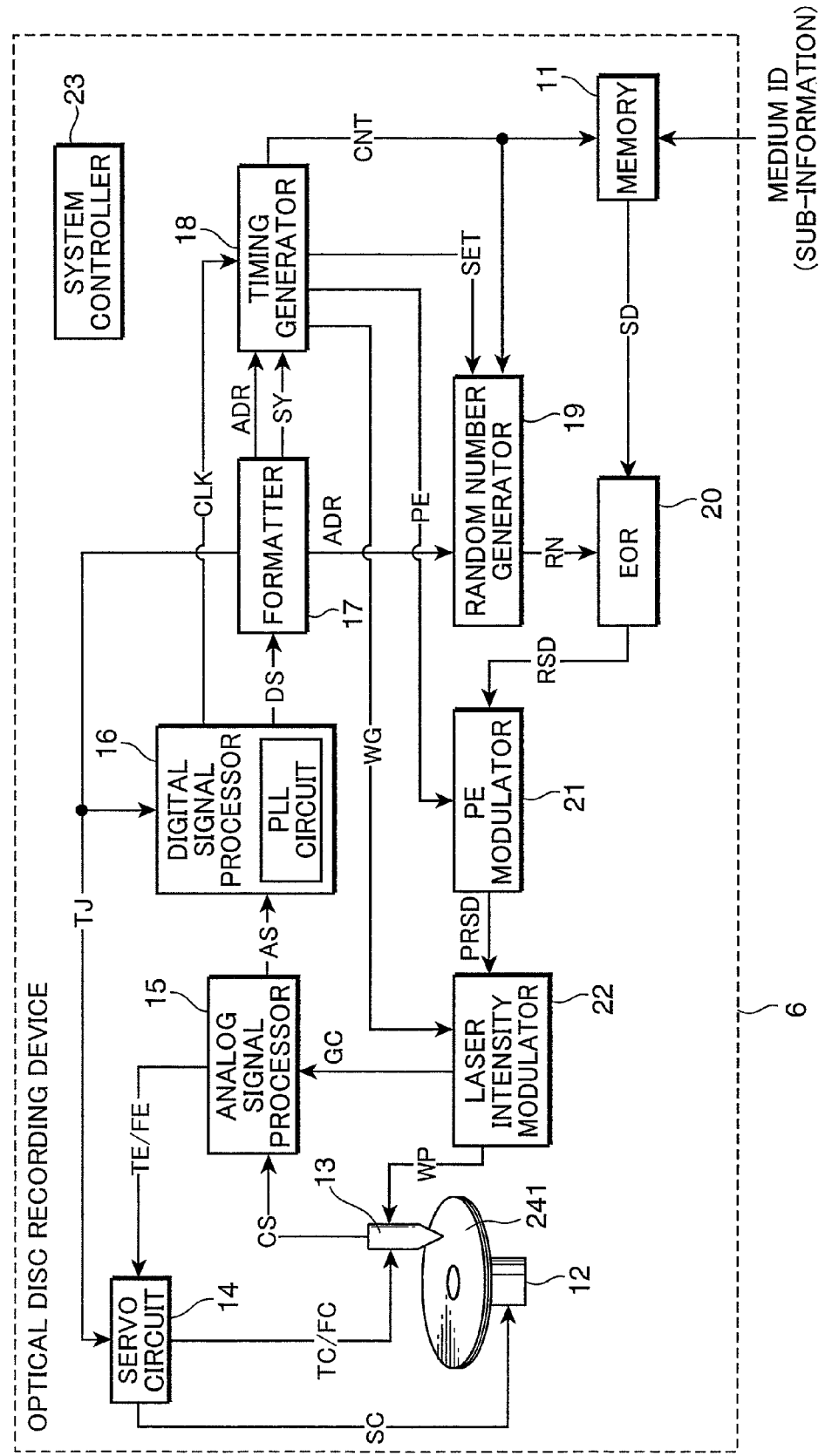
FIG. 6 is a block diagram showing the construction of an optical disc recording device according to the first embodiment.

FIG. 6 is a block diagram showing the construction of the optical disc recording device used in the second manufacturing process of the optical disc manufacturing method according to the first embodiment. The optical disc recording device 6 records the medium ID assigned with the authentication code by the key management mechanism in a superimposition manner on the optical disc having the reflective film whose reflectivity changes through the irradiation of laser light applied on the concave and convex marks after the optical disc is produced in the first manufacturing process 200.

The optical disc recording device 6 shown in FIG. 6 is provided with a memory 11, a spindle motor 12, an optical head 13, a servo circuit 14, an analog signal processor 15, a digital signal processor 16, a formatter 17, a timing generator 18, a random number generator 19, an EOR 20, a PE modulator 21, a laser intensity modulator 22 and a system controller 23.

The memory 11 is for saving the medium ID received from the key management mechanism beforehand. The medium ID is normally information updated medium by medium so as to be unique to each medium.

The spindle motor 12 rotates an optical disc 241 at a rotation speed corresponding to the optical disc 241 when the optical disc 241 formed in the first manufacturing process 200 and having no medium ID recorded thereon is inserted into a drive.

The optical head 13 irradiates the optical disc 241 with laser light having reproduction intensity when the rotation speed of the optical disc 241 reaches a target rotation speed, generates a channel signal CS from the reflected light and outputs it to the analog signal processor 15.

The analog signal processor 15 generates a focus error signal FE indicating a displacement of a focus position and a tracking error signal TE indicating a displacement of a tracking position with respect to the concave and convex marks in accordance with the channel signal CS inputted from the optical head 13, and outputs them to the servo circuit 14. The analog signal processor 15 also generates an analog reproduction signal AS corresponding to the concave and convex marks by equalizing the waveforms of the channel signal CS inputted from the optical head 13 or amplifying the channel signal CS, and outputs it the digital signal processor 16.

The servo circuit 14 generates a focus control signal FC and a tracking control signal TC for controlling the focus position and the tracking position of a spot position of the laser light in accordance with the tracking error signal TE and the focus error signal FE inputted from the analog signal processor 15, and outputs them to the optical head 13. The optical head 13 finely adjusts the focus position and the tracking position in accordance with these control signals. Further, the servo circuit 14 generates a rotation control signal SC for finely adjusting the rotation speed based on a radial position, and outputs it to the spindle motor 12. The spindle motor 12 finely adjusts the rotation speed in accordance with the rotation control signal SC inputted from the servo circuit 14.

The digital signal processor 16 extracts binary digital reproduction data from the analog reproduction signal AS inputted from the analog signal processor 15. The digital signal processor 16 is internally provided with a PLL (Phase Locked Loop) circuit, extracts a synchronizing clock signal CK in accordance with the analog reproduction signal AS inputted from the analog signal processor 15, samples the analog reproduction signal AS using the extracted clock signal CK to quantize it, then generates a digital reproduction signal DS by binarizing the quantized analog reproduction signal AS and outputs it to the formatter 17. The digital signal processor 16 outputs the extracted clock signal CK to the timing generator 18.

The formatter 17 detects synchronization codes assigned at specified time intervals from the digital reproduction signal DS inputted from the digital signal processor 16, formats it into a frame structure, divides it into sector units (address units) including a plurality of frames and having address information to reproduce address information ADR, and outputs the address information ADR to the timing generator 18 and the random number generator 19. The formatter 17 also outputs a synchronization code detection timing signal SY indicating a detection timing of the synchronization code to the timing generator 18.

The timing generator 18 generates a timing of recording the medium ID from the address information ADR inputted in synchronism with the clock signal CK inputted from the digital signal processor 16. The timing is that of a sub-frame indicating an interval for recording one bit of the medium ID and is generated by a counter synchronized with the clock signal CK and the synchronization code detection timing signal SY. A sub-frame count value CNT indicating a sub-frame position generated by the counter is outputted to the random number generator 19 and the memory 11. The timing generator 18 generates a PE modulation signal PE for applying a PE modulation to the medium ID to be recorded to substantially equalize a displacement probability of the recordable marks toward the outer circumferential side and that of the recordable marks toward the inner circumferential side using a similar counter, and outputs it to the PE modulator 21. The timing generator 18 also generates an initial value set timing signal SET as a timing of presetting an initial value to a random sequence and outputs it to the random number generator 19.

The random number generator 19 presets the address information ADR from the formatter 17 as an initial value at an output timing of the initial value set timing signal SET inputted from the timing generator 18. Further, the random number generator 19 generates a pseudo random sequence RN bit by bit at the increment timing of the sub-frame count value CNT inputted from the timing generator 18 and outputs it to the EOR 20. Although the address information ADR is used as an initial value in this embodiment, the present invention is not limited to this. If the address information ADR is data converted by a one-way function or the like, resistance to the illegal recording of the medium ID can be further improved since pirate makers, who do not know this method, cannot generate a similar random number sequence. Further, the initial value may have a secret inside or may be recorded as a concave and convex mark on the medium. The random number generator 19 is a general M-sequence generator including a shift register, and generates the pseudo random sequence bit by bit by shifting the internal shift register at every increment timing of the sub-frame count value.

The memory 11 extracts the bit corresponding to the count value from the medium ID received from the key management mechanism and stored beforehand based on the sub-frame count value CNT from the timing generator 18, and outputs it as sub-information SD to the EOR 20.

The EOR 20 is constructed by a general XOR gate, calculates an exclusive OR of one bit of the pseudo random sequence RN inputted from the random number generator 19 and one bit of the medium ID inputted from the memory 11 to generate diffuse sub-information RSD and outputs it to the PE modulator 21.

Similar to the EOR 20, the PE modulator 21 is also constructed by a general XOR gate, applies a PE modulation to the diffuse sub-information RSD by calculating an exclusive OR of the diffuse sub-information RSD inputted from the EOR 20 and the PE modulation signal PE inputted from the timing generator 18, thereby generating post-PE modulation diffuse sub-information PRSD, and outputs it to the laser intensity modulator 22.

The laser intensity modulator 22 increases a current flowing into a laser in a section "H" of the post-PE modulation diffuse sub-information PRSD inputted from the PE modulator 21, thereby modulating laser light with recording intensity into a recording pulse WP for irradiation, and outputs the recording pulse WP to the optical head 13. This laser irradiation intensity modulation may be in the form of multiple pulses for increasing and decreasing the laser intensity at high speed or may be in the form of irradiation of laser light with specified intensity higher than the reproduction intensity. Which laser irradiation method is adopted does not matter at least if the reflectivity of the reflective film changes by the irradiation of laser light.

The optical head 13 controls the amount of the current flowing into the laser using the recording pulse WP from the laser intensity modulator 22 while executing a tracking control to the track of the concave and convex marks by the servo circuit 14, whereby the reflective film of the optical disc 241 is irradiated with the laser light whose intensity was adjusted and the medium ID is recorded in a superimposition manner by forming the recordable marks, whose reflectivity was changed, on the concave and convex marks.

In this embodiment, the spindle motor 12, the optical head 13, the servo circuit 14 and the analog signal processor 15 correspond to an example of a tracking unit, the analog signal processor 15 to an example of a reproduction signal extracting unit, the digital signal processor 16 to an example of a clock extracting unit, and the memory 11, the optical head 13, the formatter 17, the timing generator 18, the random number generator 19, the EOR 20, the PE modulator 21 and the laser intensity modulator 22 to an example of a sub-information recording unit.

Figure 7:
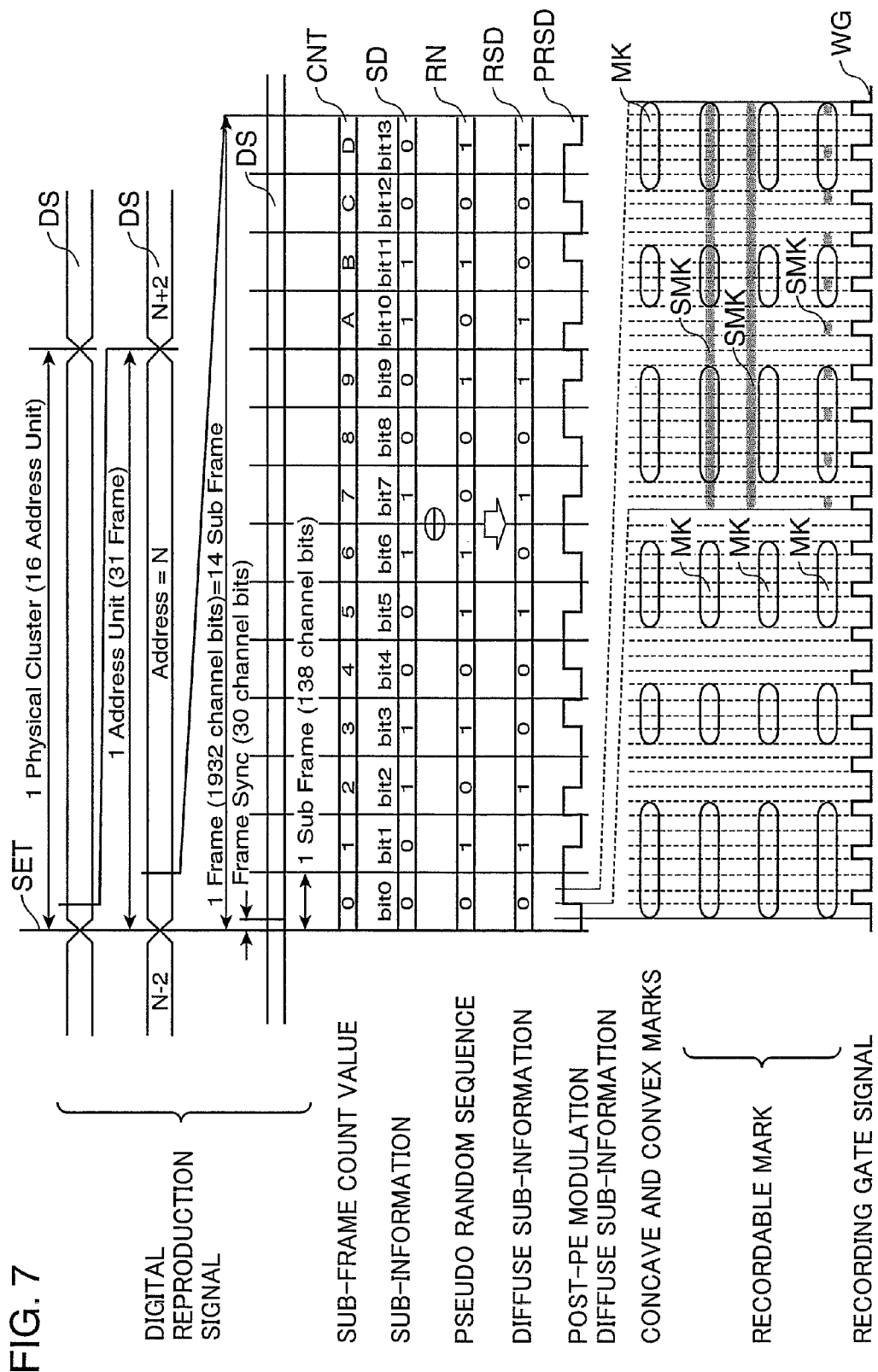
FIG. 7 is a timing chart showing a characteristic operation of the optical disc recording device according to the first embodiment.

Next, the operation of the optical disc recording device 6 is described in detail with respect to an exemplary case where the optical disc of this embodiment is a Blu-ray ROM disc. FIG. 7 is a timing chart showing a characteristic operation of the optical disc recording device according to the first embodiment.

Physical clusters as units for performing one error correction (64 kilobytes in user data) are consecutively recorded on a track in the Blu-ray ROM disc. Each physical cluster is made up of 16 address units each having address information ADR. Each address unit is made up of 31 frames each having a synchronization code. Further, one frame is made up of 1932 channel bits.

Accordingly, the formatter 17 of the optical disc recording device 6 formats the digital reproduction signal DS from a digital lead channel into a frame structure by detecting the synchronization codes therefrom and divides it into address units as recording units of the address information ADR while judging which frame in the address unit by the pattern of the synchronization codes.

The timing generator 18 of the optical disc recording device 6 counts the sub-frames for recording one bit of medium information by counting one frame as "+1" in the units of 138 channel bits, generates the sub-frame count value CNT and outputs it to the random number generator 19 and the memory 11. Further, the timing generator 18 generates such a PE modulation signal PE that first 69 channel bits are "L" and the following 69 channel bits are "H" although not shown as a signal, and outputs it to the PE modulator 21.

The memory 11 extracts the medium ID stored beforehand bit by bit as sub-information SD corresponding to the sub-frame count value CNT at the timing of incrementing the sub-frame count value CNT inputted from the timing generator 18, and outputs it to the EOR 20.

The random number generator 19 generates the pseudo random sequence RN bit by bit at the timing of incrementing the similarly inputted sub-frame count value CNT and outputs it to the EOR 20. In this embodiment, a target address where the recording of the medium ID is started is described to be "N". Thus, the initial value set timing signal SET for setting the initial value of the random number generator 19 is outputted before the starting end of the address unit of an address N from the timing generator 18, and the initial value is set in the M-sequence generating shift register of the random number generator 19. Address data converted beforehand by a one-way function or the initial value secretly stored inside may be used as this initial value as described above. In Blu-ray, addresses are not actually recorded at the leading ends of the address units, but are recorded in discrete areas in the address units called BIS clusters. Thus, the address to come is not determined at the leading end of the address unit. Accordingly, the address is extracted from the address unit immediately before the address unit of the target address where the recordable mark is recorded, and an address obtained by adding "+2" to the extracted address is used as an initial value of the random number generator 19 (since the address is incremented by "+2" for each address unit in Blu-ray discs).

The EOR 20 calculates an exclusive OR of the pseudo random sequence RN inputted from the random number generator 19 and each bit in the sub-frame of the sub-information SD to generate the diffuse sub-information RSD, and outputs it to the PE modulator 21.

The PE modulator 21 applies a PE modulation to the diffuse sub-information RSD by calculating an exclusive OR of the inputted PE modulation signal PE and the diffuse sub-information RSD, thereby generating the post-PE modulation diffuse sub-information PRSD, and outputs it to the laser intensity modulator 22.

The laser intensity modulator 22 irradiates laser light having reproduction intensity in an "L" section of the post-PE modulation diffuse sub-information PRSD inputted from the PE modulator 21 and irradiates laser light having recording intensity in an "H" section. The laser intensity modulator 22 forms the recordable mark by irradiating recording laser light at an "H" timing of the post-PE modulation diffuse sub-information PRSD to change the reflectivity of the reflective film.

As described above, the optical disc recording device 6 records the medium ID in a superimposition manner by irradiating the laser light onto the track of the concave and convex marks MK formed by replication to form the recordable marks. Thus, the optical disc recorded with the medium ID can be manufactured by forming the recordable marks on the track of the concave and convex marks having no medium ID recorded thereon.

In the case of forming the recordable marks longer than the maximum mark length of the concave and convex marks on the concave and convex marks as in this embodiment, it is necessary to make the fluctuation of the reflected light level caused by the recording of the recordable marks smaller than the modulation factor of the concave and convex marks at the time of reproduction in order to avoid the influence on the reproduction accuracy of the concave and convex marks. This can be realized by making the width of the recordable marks smaller than the concave and convex marks in the radial direction. Generally, it is known that the recording mark width monotonously increases according to laser intensity in a region where laser light of specified intensity is irradiated. Thus, the formation of the recordable marks narrower than the concave and convex marks can be realized by decreasing the laser intensity. The laser intensity can be regulated by regulating a time during which irradiation is made with high output power or by regulating the intensity of the power itself through the control of the value of the current flowing into the laser.

Next, the operation of the optical disc recording device 6 when the recordable mark recorded by changing the reflectivity through the irradiation of laser light is formed between the tracks formed by the concave and convex marks as shown in FIG. 4 or 7 is supplementarily described.

In this case as well, similar to the above, if the target address where the recordable mark is formed is "N", the formatter 17 generates a track jump signal TJ at the leading end position of the address unit having the address "N" and outputs it to the servo circuit 14 and the digital signal processor 16 as an additional operation of the optical disc recording device of FIG. 6.

The servo circuit 14 shifts the tracking position by half the track in accordance with the track jump single TJ inputted from the formatter 17. A tracking control method of the servo circuit 14 at this time is desirably a push-pull method for controlling the tracking position with respect to the reflected light of the laser spot such that a difference between brightness at the inner circumferential side of the disc and brightness at the outer circumferential side is "0". This is because the tracking control can be stably executed even if no concave and convex mark is located in the center of the spot since the control is executed based on the brightness difference between the inner circumferential side and the outer circumferential side according to the push-pull method. In other words, the tracking control can be stably executed between the tracks having no concave and convex mark in the middle. Further, according to the push-pull method, the brightness difference between the inner circumferential side and the outer circumferential side and a relationship of actually controlling the spot position at the inner circumferential side/outer circumferential side are reversed when the tracking control is executed between the tracks of the concave and convex marks and when the control is executed in the track centers. Therefore, the control is executed while reversing the polarity of the push-pull control at the time of a track jump.

The digital signal processor 16 fixes an oscillation frequency of the internally provided PLL circuit in a region where the recordable mark is recorded from the timing of the track jump signal TJ inputted from the formatter 17 and holds a clock frequency to be outputted. Normally, when the tracking control is executed between the tracks, there are problems that no stable reproduction signal of the concave and convex marks can be obtained, the oscillation of the PLL circuit cannot be fixed, and the recordable mark cannot be formed at an intended position. However, these problems can be solved by fixing the clock frequency.

Normally, even if the oscillation frequency of the PLL circuit is locked, there is a problem that the concave and convex marks and the clock get out of synchronization and the formation position of the recordable mark is displaced if the recording time is long. Thus, the recordable mark is formed, for example, of a plurality of physical clusters or a plurality of address units, and the frequency of the PLL circuit is caused to follow the frequency of the concave and convex marks immediately before the target address every time the recordable mark is formed. Thus, the recordable mark can be stably formed although the recording time is increased more or less.

The servo circuit 14 controls the track position between the tracks at the leading end position of the address unit having the target address where the recordable mark is to be formed. Thereafter, the PE modulator 21 applies a PE modulation to the diffuse sub-information RSD obtained by scrambling the sub-information SD by the pseudo random sequence RN generated by the random number generator 19. The laser intensity modulator 22 irradiates the optical disc with the laser light after modulating the intensity of the laser light based on the post-PE modulation diffuse sub-information PRSD, and forms the recordable mark between the tracks formed by the concave and convex marks. In this way, the medium ID can be recorded between the tracks.

In this way, the recordable mark can be formed between the tracks of the concave and convex marks and the medium ID can be recorded without influencing the reproduction accuracy of the concave and convex marks at all.

Normally, in the case of forming the recordable marks, whose reflectivity was changed, between the tracks, a direct-current component may be included in a tracking error signal when the tracking is controlled to the concave and convex marks at the time of reproduction and the tracking operation may not be normally performed. However, since the recording pulse is used to apply the PE modulation to the recordable mark to be formed between the tracks in this embodiment, the areas where the recordable mark is formed and those where the recordable mark is not formed exist at a probability of 50%. Since the reflectivity between the tracks is constantly an average of the reflectivity of the recordable marks and that of the reflective film other than the recordable marks in a band where the tracking control is executed, no extra direct-current component is outputted.

Next, the recording operation of the optical disc recording device 6 when the medium ID is recorded by intermittently forming the recordable marks on the track of the concave and convex marks through the irradiation of laser light as shown in FIG. 3 or 7 is supplementarily described.

In this case, similar to the above, if the target address where the recordable mark is formed is "N", the timing generator 18 generates one recording gate signal WG for three channel bits from the above sub-frame counter for counting "+1" in the units of 138 channel bits in an area of forming the recordable mark from the leading end position of the address unit having an address "N", and outputs it to the laser intensity modulator 22. The recording gate signal WG can be generated if being outputted at a timing where the remainder of the quotient obtained by dividing the count value of the sub-frame counter by 3 is "0".

The PE modulator 21 applies a PE modulation to the diffuse sub-information RSD obtained by scrambling the sub-information SD by the pseudo random sequence RN generated by the random number generator 19 and outputs the post-PE modulation diffuse sub-information PRSD to the laser intensity modulator 22. The laser intensity modulator 22 generates the recording pulse WP used for the irradiation of laser light in accordance with a signal indicating the calculation result of a logical product of the post-PE modulation diffuse sub-information PRSD and the recording gate signal WG from the timing generator 18 and outputs the recording pulse WP to the optical head 13. The optical head 13 intermittently forms the recordable marks by irradiating the laser light having recording intensity on the track of the concave and convex marks on the optical disc based on the recording pulse WP. In this way, the medium ID can be intermittently recorded on the track.

By doing so, only one channel bit of the recordable mark can be recorded between three channel bits of the concave and convex marks, wherefore the influence on the reproduction accuracy of the concave and convex marks can be reduced. Further, by intermittently recording the recordable marks, it can be made even more difficult to discriminate the recordable marks by the eyes and to discriminate at which position of the optical disc the sub-information is recorded.

Although the recordable mark length is described to be one channel bit of the concave and convex marks in this embodiment, it is not limited to this. For example, an optical disc recording device normally includes a timing modulator (recording compensation circuit) for modulating the irradiation timing of a recording pulse in units smaller than channel clocks. If this is used, the recordable mark can be formed by irradiating laser light to an area smaller than the channel bit length. If the recordable mark length is equal to or shorter than the shortest length of the concave and convex marks (2 channel bits in Blu-ray discs), the concave and convex marks and the recordable mark can be separated. Thus, the recordable mark may be formed by irradiating laser light such that the recordable mark length is equal to or shorter than the shortest length of the concave and convex marks.

It is also within the scope of the present invention to discretely form the recordable marks longer than the shortest mark length of the concave and convex marks. A method for recording the recordable marks longer than the shortest mark length of the concave and convex marks is as described above. However, in this case, it is desirable to form the recordable marks whose width in the radial direction is narrower than the concave and convex marks.

As described above, the medium ID unique to the medium can be recorded on the optical disc by irradiating the laser light on the reflective film on the track of the concave and convex marks using the optical disc recording device of this embodiment. Further, the optical disc recording device of this embodiment can realize the recording of the medium ID without requiring constituent elements leading to a considerable cost increase as against a general optical disc recording device. If the medium ID different for each optical disc is used, there can be provided an optical disc enabling the realization of copyright management of a network base for managing the medium by an authentication server via a network.

Although the method for recording the medium ID of 14 bits in one frame is described in this embodiment, the present invention is not limited to this. The central aim of the present invention is to record the medium ID in synchronism with the frame structure. For example, the medium ID of 1 bit may be recorded in one frame (in this case, frame=sub-frame) or the medium ID of 1 bit may be recorded in two frames (in this case, frame<sub-frame).

A method for not recording the recordable marks in synchronization code recording areas, address recording areas or specific frame areas which play an important role in frame synchronization may also be thought. By doing so, the deterioration of the reproduction accuracy of the concave and convex marks can be maximally prevented.

In order to improve the reproduction reliability of the recordable mark, the same bit may be recorded in a plurality of discrete areas a plurality of times. Then, even if there are areas with bad reading accuracy due to scratch or dust on the optical disc, the readability of the medium ID can be improved since the same bit is repeatedly recorded.

If the error correction code is assigned to the medium ID, the reproduction reliability of the medium ID can be further improved. In this case, the parity bit for the error correction may be assigned in the optical disc recording device disclosed in this embodiment or may be assigned by the key management mechanism. If an error detection code is assigned, it is even better since an error correction by parity can be judged.

(1-4) Optical Disc Reproduction Device According to First Embodiment

Figure 8:
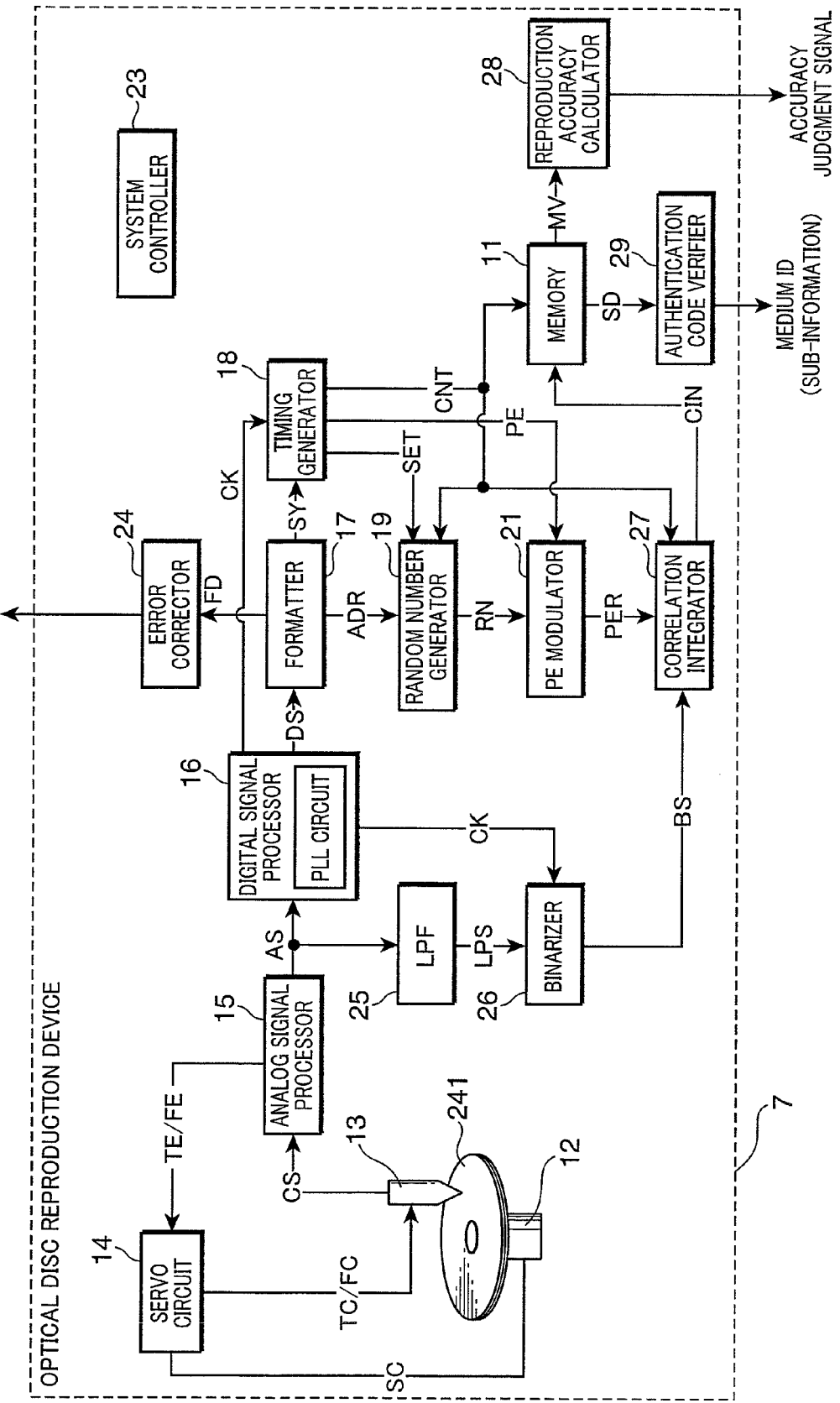
FIG. 8 is a block diagram showing the construction of an optical disc reproduction device according to the first embodiment.

FIG. 8 is a block diagram showing the construction of the optical disc reproduction device (checking device) used in the checking process of the optical disc manufacturing method according to the first embodiment. In the second manufacturing process 300, laser light is irradiated onto the concave and convex marks to change the reflectivity of the reflective film for the formation of the recordable mark, whereby the optical disc having the medium ID recorded in a superimposition manner is manufactured. The optical disc reproduction device 7 reproduces the medium ID from the optical disc having the medium ID recorded thereon in the second manufacturing process 300 and checks whether or not the medium ID is normally recorded on the optical disc.

The optical disc reproduction device 7 shown in FIG. 8 is provided with a spindle motor 12, an optical head 13, a servo circuit 14, an analog signal processor 15, a digital signal processor 16, a formatter 17, an error corrector 24, a timing generator 18, a random number generator 19, a PE modulator 21, a LPF 25, a binarizer 26, a correlation integrator 27, a memory 11, a reproduction accuracy calculator 28, an authentication code verifier 29 and a system controller 23. The constituent elements of the optical disc reproduction device 7 may be mounted in the same device as the above optical disc recording device 6 of the first embodiment.

The spindle motor 12 rotates an optical disc 241 at a rotation speed corresponding to the optical disc 241 when the optical disc 241 is inserted into the optical disc reproduction device 7.

The optical head 13 irradiates the optical disc 241 with laser light having reproduction intensity when the rotation speed of the inserted optical disc 241 by the spindle motor 8 reaches a target rotation speed, generates a channel signal CS from the reflected light and outputs it to the analog signal processor 15.

The analog signal processor 15 extracts a tracking error signal TE indicating a displacement of a laser spot position in the radial direction and a focus error signal FE indicating a displacement of a focus position of a laser spot in accordance with the channel signal CS inputted from the optical head 13, and outputs them to the servo circuit 14. The analog signal processor 15 also extracts an analog reproduction signal AS corresponding to the concave and convex marks by equalizing the waveforms of the channel signal CS inputted from the optical head 13 or amplifying the channel signal CS, and outputs it to the digital signal processor 16 and the LPF 25.

The servo circuit 14 calculates a focus control signal FC for correcting the displacement of the focus position in accordance with the focus error signal FE inputted from the analog signal processor 15 and a tracking control signal TC for correcting the displacement of the tracking position in accordance with the tracking error signal TE, and outputs them to the optical head 13. The optical head 13 irradiates laser light while correcting the focus position and the tracking position of a laser spot in accordance with these signals. The servo circuit 14 also calculates a linear velocity in accordance with the reproduction signal, generates a rotation control signal SC for controlling the rotation speed and outputs it to the spindle motor 12. The spindle motor 12 corrects the rotation speed in accordance with the rotation control signal SC inputted from the servo circuit 14.

The digital signal processor 16 is internally provided with a PLL (Phase Locked Loop) circuit, extracts the clock signal CK synchronized with the analog reproduction signal AS inputted from the analog signal processor 15, samples the analog reproduction signal AS using the extracted clock signal CK to quantize it, then generates a digital reproduction signal DS by binarizing the quantized analog reproduction signal AS and outputs it to the formatter 17. The digital signal processor 16 also outputs the extracted clock signal CK to the timing generator 18 and the binarizer 26.

The formatter 17 detects synchronization patterns assigned at specified time intervals from the digital reproduction signal DS inputted from the digital signal processor 16 and formats the digital reproduction signal DS into a frame structure. The formatter 17 formats a set including the addresses of a specified number of frames in address units based on the synchronization pattern. The formatter 17 also formats in physical clusters, in which an error correction is made, based on the addresses. The reproduction signal formatted in this way is outputted as format data FD to the error corrector 24. The formatter 17 also outputs a synchronization code detection timing signal SY indicating a detection timing of the synchronization pattern by the frame to the timing generator 18, and outputs the address information ADR assigned to the address units to the random number generator 19.

The timing generator 18 generates an initial value set timing signal SET indicating a timing of setting an initial value to a random number generator 19 at the leading end position of the address unit having a target address where the medium ID is reproduced, and outputs it to the random number generator 19. In this embodiment, it is assumed that the target address is set in the system controller 23 beforehand.

The timing generator 18 includes a counter which operates in accordance with the clock signal CK inputted from the digital signal processor 16 and the synchronization code detection timing signal SY inputted from the formatter 17. The counter counts clocks in the frame in synchronism with the clock signal CK, and resets the held count value at the timing of the synchronization code detection timing signal SY. Further, the counter includes a counter for adding 1 to the sub-frame unit for detecting 1 bit of the medium ID (sub-information), and outputs this sub-frame count value CNT to the random number generator 19, the correctional integrator 27 and the memory 11. The timing generator 18 also generates such a PE modulation signal PE that a front half is "L" and a rear half is "H" in the sub-frame and outputs it to the PE modulator 21.

The random number generator 19 is constructed by a general M-sequence generation circuit including a shift register, and sets the address information ADR inputted from the formatter 17 as an initial value for generating the pseudo random sequence RN in the shift register of the M-sequence generation circuit at an output timing of the initial value set timing signal SET inputted from the timing generator 18. Further, the random number generator 19 generates a pseudo random sequence RN of 1 bit by shifting the shift register at the increment timing of the sub-frame count value CNT inputted from the timing generator 18 and outputs it to the PE modulator 21. It should be noted that the random number generator 19 has the same configuration as the random number generator 19 of the optical disc recording device 6 of this embodiment.

The PE modulator 21 applies a PE modulation to the pseudo random sequence RN inputted from the random number generator 19 in accordance with the PE modulation signal PE inputted from the timing generator 18. The PE modulator 21 is constructed by a general XOR gate, generates a correlation sequence PER by calculating an exclusive OR of the pseudo random sequence RN and the PE modulation signal PE, and outputs it to the correlation integrator 27.

The LPF 25 is constructed by a general low-pass filter for limiting the band of the analog reproduction signal AS inputted from the analog signal processor 15, generates a band-limiting reproduction signal LPS by extracting only low-band components of the analog reproduction signal AS and outputs it to the binarizer 26. The LPF 25 is a filter for passing the band slower than the longest one of the concave and convex marks. Thus, the band-limiting reproduction signal LPS limiting the band indicating the concave and convex marks from the reproduction signal is outputted from the LPF 25 to the binarizer 26. The binarizer 26 cuts off direct-current components of the band-limiting reproduction signal LPS, detects a zero-crossing point of the band-limiting reproduction signal LPS in synchronism with the clock signal CK inputted from the digital signal processor 16 to generate a binary reproduction signal BS and outputs it to the correlation integrator 27.

The correlation integrator 27 is internally provided with an up/down counter, calculates and integrates a correlation between the correlation sequence PER from the PE modulator 21 and the binary reproduction signal BS from the binarizer 26. The up/down counter increments the value of an internal counter when the correlation between the correlation sequence PER and the binary reproduction signal BS is recognized, i.e. the correlation sequence PER is "H" and the binary reproduction signal BS is "H" or the correlation sequence PER is "L" and the binary reproduction signal BS is "L".

On the other hand, the up/down counter decrements the value of the internal counter when the correlation between the correlation sequence PER and the binary reproduction signal BS is not recognized, i.e. the correlation sequence PER is "H" and the binary reproduction signal BS is "L" or the correlation sequence PER is "L" and the binary reproduction signal BS is "H". Further, the correlation integrator 27 resets the correlation integration value to "0" after outputting a held correlation integration value CIN to the memory 11 at the increment timing of the sub-frame count value CNT inputted from the timing generator 18. Accordingly, an integration value of the correlation sequence PER and the binary reproduction signal BS in the sub-frame as the range for detecting 1 bit of the medium ID is outputted to the memory 11.

The memory 11 adds the correlation integration value CIN inputted from the correlation integrator 27 to a value stored in a memory space corresponding to the sub-frame count value CNT inputted from the timing generator 18 and stores it. Thus, the memory 11 has memory spaces corresponding to all the bits of the medium ID and an integration value of each bit of the medium ID is stored during the reproduction of the medium ID.

The authentication code verifier 29 inputs a code bit of the integration value corresponding to each bit of the medium ID in the memory 11 as medium information. Specifically, the authentication code verifier 29 calculates a bit value of "0" when the integration value is "+" and a bit value of "1" when the integration value is "−". The authentication code verifier 29 judges whether the read medium ID is normal or altered based on the authentication code assigned to the calculated medium ID. A digital signature or MAC is used as this authentication code, and the authentication code verifier 29 judges whether or not the digital signature is normally verified or whether or not the assigned MAC is normal. The authentication code verifier 29 outputs the extracted medium ID if the authentication code is judged to be normal or continues to perform the reproduction operation if the authentication code is judged not to be normal. If no normal medium ID is detected even if the reproduction operation is continued for longer than a specified time, the optical disc is ejected as an illegal disc or a defective disc and the reproduction operation is ended. If parity for error correction or error detection is assigned to the medium ID, the continuation of the reproduction operation may be judged based on this parity. In other words, the authentication code verifier 29 extracts the medium ID from the code bit of the memory and performs an error correction or error detection using the assigned parity. The reproduction operation is continued if an error is judged, and the digital signature or the MAC is verified if no error is judged.

The reproduction accuracy calculator 28 receives the integration values corresponding to the respective bits of the medium ID from the memory 11, calculates an average absolute value and a standard deviation of the integration values, estimates a bit error rate of the medium ID from a Gaussian distribution based on the average and the standard deviation, and judges whether or not the medium ID is normally recorded by judging the estimated bit error rate using a threshold value. If the bit error rate is below the threshold value, i.e. the medium ID is judged not to be normally recorded, the disc being reproduced is ejected as a defective disc. The above bit error rate can be estimated by integration from $-\infty$ to 0 of the above Gaussian distribution.

In this embodiment, the spindle motor 12, the optical head 13, the servo circuit 14 and the analog signal processor 15 correspond to an example of a tracking unit, the analog signal processor 15 to an example of a reproduction signal extracting unit, the digital signal processor 16 to an example of a clock extracting unit, the LPF 25 and the binarizer 26 to an example of a separating unit, the formatter 17, the timing generator 18, the random number generator 19, the PE modulator 21, the correlation integrator 27 and the memory 11 to an example of a sub-information reproducing unit, the formatter 17 to an example of a synchronization code detector, the LPF 25 to an example of a band-limiting filter, the random number generator 19 to an example of a correlation sequence generator, the correlation integrator 27 to an example of a correlation detector and the authentication code verifier 29 to an example of a reproducing unit.

Figure 9:
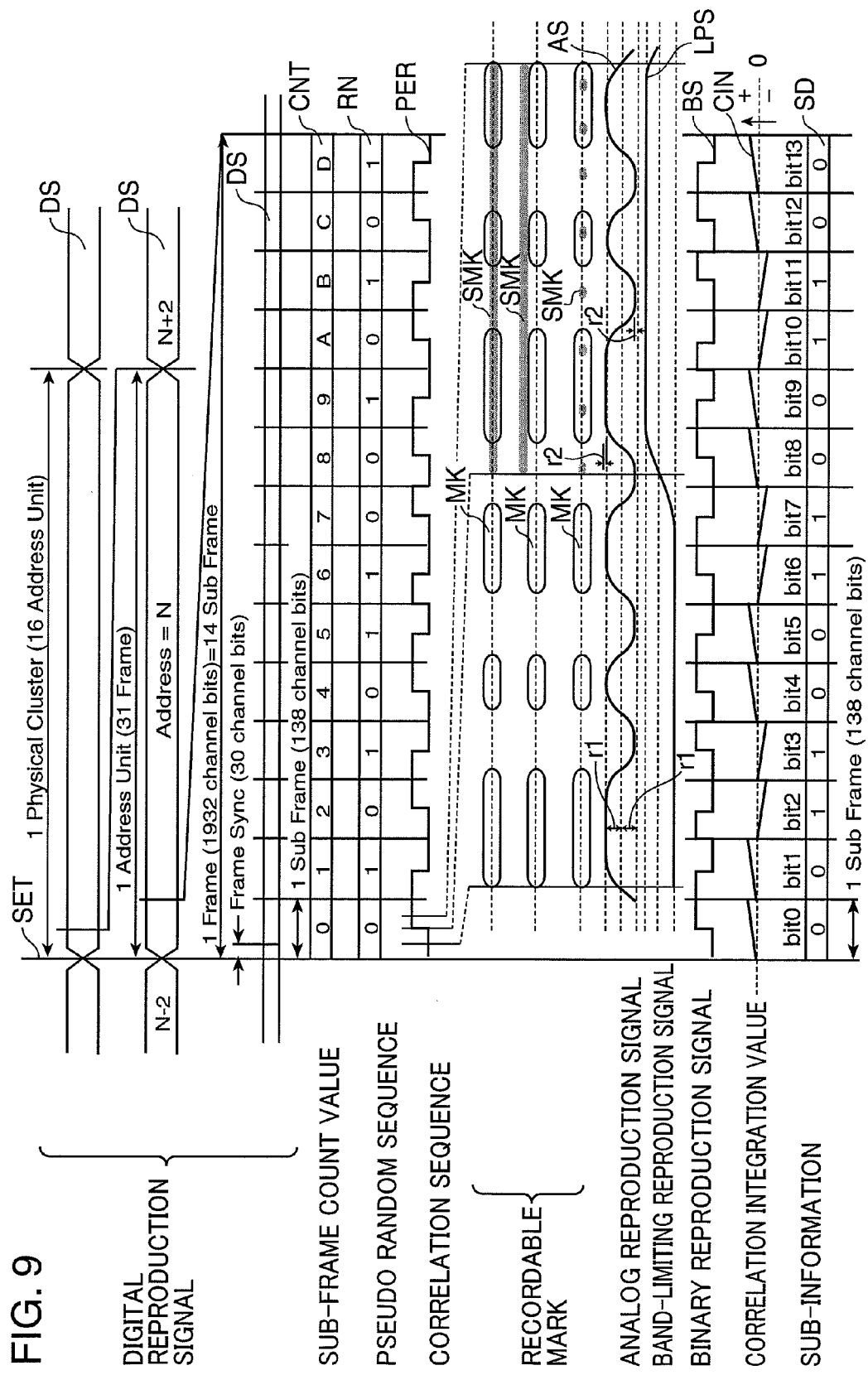
FIG. 9 is a timing chart showing a characteristic operation of the optical disc reproduction device according to the first embodiment.

Next, the operation of the optical disc reproduction device 7 is described in detail. FIG. 9 is a timing chart showing a characteristic operation of the optical disc reproduction device according to the first embodiment. In the following description, the optical disc is a Blu-ray ROM disc.

The digital reproduction signal DS outputted from the digital signal processor 16 of the optical disc reproduction device 7 is reproduced as consecutive physical clusters as units of error correction (64 kilobytes in user data). Each physical cluster is comprised of 16 address units assigned with the address information ADR. The address unit is made up of 31 frames each assigned with a synchronization code, and 1 frame is made up of 1932 channel bits.

Here, if the target address where the detection of the medium ID is started is "N", the timing generator 18 outputs the initial value set timing signal SET to the random number generator 19 at the leading end position of the address unit assigned with the address "N", and the formatter 17 outputs the address "N" to the random number generator 19.

The timing generator 18 includes a counter for adding 1 by the sub-frame (1 sub-frame is 138 channel bits) for detecting 1 bit of the medium ID in one frame, and outputs the count value of this counter as the sub-frame count value CNT to the random number generator 19, the correlation integrator 27 and the memory 11.

The random number generator 19 sets the address "N" outputted from the formatter 17 as an initial value in the internal shift register at an output timing of the initial value set timing signal SET from the timing generator 18. The random number generator 19 also generates a pseudo random sequence RN bit by bit by shifting the internal shift register at the increment timing of the sub-frame count value CNT from the timing generator 18 and outputs it to the PE modulator 21.

The timing generator 18 generates such a PE modulation signal PE that first 69 channel bits are "L" and the following 69 channel bits are "H", and outputs it to the PE modulator 21. The PE modulator 21 generates the random sequence PER by calculating an exclusive OR of the PE modulation signal PE inputted from the timing generator 18 and the pseudo random sequence RN outputted from the random number generator 19, and outputs it to the correlation integrator 27.

FIG. 9 shows recording modes of three types of recordable marks SMK, and the concave and convex marks MK on the optical disc and the recordable marks SMK having the reflectivity changed by the irradiation of laser light are shown in any of these recording modes. At any rate, the reflected light level indicated by the analog reproduction signal AS outputted from the analog signal processor 15 is averagely larger in a part where the recordable marks SMK are recorded than in a part where no recordable marks are recorded. This is because the reflective film applied to the optical disc has such a characteristic to increase the reflectivity by the irradiation of laser light.

A modulation factor r2 influential to the reflected light intensity of the recordable marks SMK is smaller than a modulation factor r1 of the reflected light level of the concave and convex marks MK. Desirably, if the modulation factor r2 of the reflected light level of the recordable marks SMK is equal to or below ½ (half) the modulation factor r1 of the reflected light level of the concave and convex marks MK, the influence of the recording of the recordable marks SMK on the reproduction accuracy of the concave and convex marks MK can be made rare. The above relationship of the reflected light levels can be realized by adjusting the laser intensity or adjusting the irradiation time of the laser light upon recording the recordable marks SMK to make the width of the recordable marks SMK in the track direction smaller than that of the concave and convex marks MK in the track direction.

Also when the recordable mark SMK is present between the tracks of the concave and convex marks MK as shown in FIG. 9, the laser spot at the time of reading the concave and convex marks MK is normally wider than the width of the concave and convex marks MK in the track direction, and the characteristic of the reflected light level of the analog reproduction signal AS changes in the area where the recordable mark SMK is formed.

Also in the case of discretely arranging the recordable marks SMK, the reflectivity is higher in the part where the recordable marks SMK are formed to change the characteristic of the reflected light level of the analog reproduction signal AS.

Normally, the optical disc reproduction device often includes a so-called baseline control circuit for detecting an error of a zero-crossing point of the analog reproduction signal AS and pursuing the error for correction. However, the recordable mark SMK in this embodiment is formed by the sub-frame (=138 channel bits=about 480 KHz at a 1× speed of the Blu-ray disc) and outside the pursuit band of the normal baseline control circuit. Thus, the zero-crossing point is corrected and there is no likelihood of making it impossible to reproduce the recordable marks SMK.

The LPF 25 is constructed by a band-limiting circuit (filter) for applying a passband limitation to the analog reproduction signal AS inputted from the analog signal processor 15 and, in this embodiment, is realized by a low-pass filter in which a band higher than the band of the sub-frames and lower than that of a combination of the mark and land of the longest mark length of the concave and convex mark is set as a cutoff frequency. The band-limiting reproduction signal LPS obtained by passing the LPF 25 is "H" in the parts where the recordable marks SMK are formed and "L" in the parts where no recordable mark SMK is formed.

The binarizer 26 generates the binary reproduction signal BS by calculating and binarizing the zero-crossing point while synchronizing the band-limiting reproduction signal LPS inputted from the LPF 25 with the clock signal CK from the digital signal processor 16, and outputs it to the correlation integrator 27.

The correlation integrator 27 integrates the correlation values of the binary reproduction signal BS from the binarizer 26 and the correlation sequence PER from the PE modulator 21 within the range of the sub-frame indicated by the sub-frame count value CNT of the timing generator 18, and outputs the integration value to the memory 11. In other words, the correlation integrator 27 judges the correlation between the binarized signal BS and the correlation sequence PER and increments the count value of the internal up/down counter in synchronism with the clock signal CK when the correlation sequence PER is "H" and the binary reproduction signal BS is "H" or the correlation sequence PER is "L" and the binary reproduction signal BS is "L".

On the other hand, the correlation integrator 27 judges no correlation between the binarized signal BS and the correlation sequence PER and decrements the count value of the internal up/down counter when the correlation sequence PER is "H" and the binary reproduction signal BS is "L" or the correlation sequence PER is "L" and the binary reproduction signal BS is "H". The correlation integrator 27 repeatedly performs this within the sub-frame to calculate the integration value corresponding to 1 bit of the medium ID. The correlation integrator 27 also outputs the internally held correlation integration value CIN of 1 bit to the memory 11 at the increment timing of the sub-frame count value CNT from the timing generator 18, and resets the internally held integration value.

The memory 11 adds the correlation integration value CIN of 1 bit inputted from the correlation integrator 27 to the value stored in the memory space indicated by the sub-frame count value CNT inputted from the timing generator 18.

The authentication code verifier 29 receives the code bit of the memory 11 corresponding to 1 bit of the medium ID and confirms whether or not the readout is normally made based on the assigned authentication code or error correction code. The system controller 23 ends the reproduction operation when the normal readout of the medium ID is confirmed as a result of verification by the authentication code verifier 29. On the other hand, the system controller 23 continues the reproduction operation to continue the integration operation of each bit of the medium ID if the authentication code verifier 29 judges fraud by verifying the digital signature or the MAC or judges incapability of error correction or the presence of an error bit. Further, the system controller 23 ejects the optical disc as an illegal disc if the normal readout of the medium ID was impossible within a designated time range.

The reproduction accuracy calculator 28 obtains the integration values of the respective bits of the medium ID from the memory 11, calculates an average value and a standard deviation of the absolute values of the integration values of the respective bits, estimates a bit error rate of the medium ID by approximating these calculated average value and standard deviation to a Gaussian distribution, and verifies the optical disc based on the bit error rate. The reproduction accuracy calculator 28 judges the optical disc to have poor reading accuracy of the medium ID if the bit error rate is equal to or higher than a specified value as a result of verification. The optical disc judged to have poor reading accuracy is ejected.

In the checking process for checking the reading accuracy of the medium ID, a judgment criterion for the judgment of an illegal disc needs to be set sufficiently low. This is because there is reliability variation in the readout of the medium ID among optical disc reproduction devices. Thus, the specified value sufficiently taking account of this needs to be set. Although the reliability in the reading accuracy of the medium ID is estimated based on the average and variation of the integration values stored in the memory 11 in this embodiment, the present invention is not particularly limited to this and the reliability may be estimated merely from the average value since the variation is uniquely outputted in optical discs to a certain extent.

An integration time until the authentication code verifier 29 judges that the error correction is possible or no error bit is present in the medium ID may be used as an indicator of the reliability in the reading accuracy of the medium ID. This is because the integration time for the readout is short if the recording accuracy of the medium ID is good while being long if the recording accuracy is poor. For example, if the integration values of the respective bits of the medium ID completely form a Gaussian distribution, time four times as long is required to read the medium ID at the same accuracy if the signal components of the medium ID are halved.

As described above, the optical disc reproduction device 7 according to this embodiment reproduces the main information of the concave and convex marks from the optical disc having the medium ID recorded thereon by the recordable marks formed by changing the reflectivity of the reflective film on the concave and convex marks and, at the same time, reproduces the medium ID by integrating the fluctuation of the reflected light level of the reproduction signal. Further, the recording accuracy of the medium ID is judged based on the average value and variation of the integration values of the respective bits of the medium ID or the time until the readout of the medium ID is completed, and the optical disc judged to have poor recording accuracy is ejected as an illegal disc. Further, the medium ID is recorded in the form of the digital signature information, MAC or error correction code, the integration operation is continued, assuming no sufficient integration, if the digital signature cannot be verified, the MAC cannot be verified or the error cannot be corrected, and ejects the optical disc by judging it as an illegal disc if the integration time is longer than the specified time.

In this embodiment, the recording position where the medium ID is to be recorded is not limited to the control region CTL and may be a user region USR on the optical disc or any region where the address information is recorded in the form of concave and convex marks.

Although the optical disc according to this embodiment is described as a read-only optical disc having information recorded thereon by the concave and convex marks, the present invention is not limited to this. In a recordable disc or rewritable disc including a wobble track and formed with a recordable film or a phase change film as well, it is possible to record a medium ID by irradiating laser light to a region where main information was recorded by irradiating laser light. In this way, the medium ID can be recorded on the recordable disc and the rewritable disc. On these discs, if the medium ID can be recorded as an encryption key of the main information, an optical disc recordable by changing the key for each recording, whereby copyright protection can be further improved.

If the present invention is applied, the medium ID can be recorded even on a read-only optical disc, wherefore network copyright management can be realized. Specifically, frequency information on the reproduction, transfer or copy of contents recorded on optical discs is managed by a management server connected via a network. Thus, even if the optical disc is a read-only optical disc, a using method convenient to users such as the copy of content on another medium such as a hard disc for the backup purpose or the transfer of the content to the hard disc for viewing and listening purpose can be provided. For example, when the content is transferred from the optical disc to the hard disk, the medium ID of the optical disc is transmitted to the management server at the time of the transfer and the transfer of the content is recorded while being related to the medium ID in the management server. Upon receiving a request to permit the reproduction of the content including the medium ID, the management server judges that the content was already transferred based on the management information stored therein, and dismisses this reproduction request. By building such a system, an environment capable of transferring contents while protecting copyrights can be provided.

Second Embodiment (2-1) Optical Disc According to Second Embodiment

Figure 10:
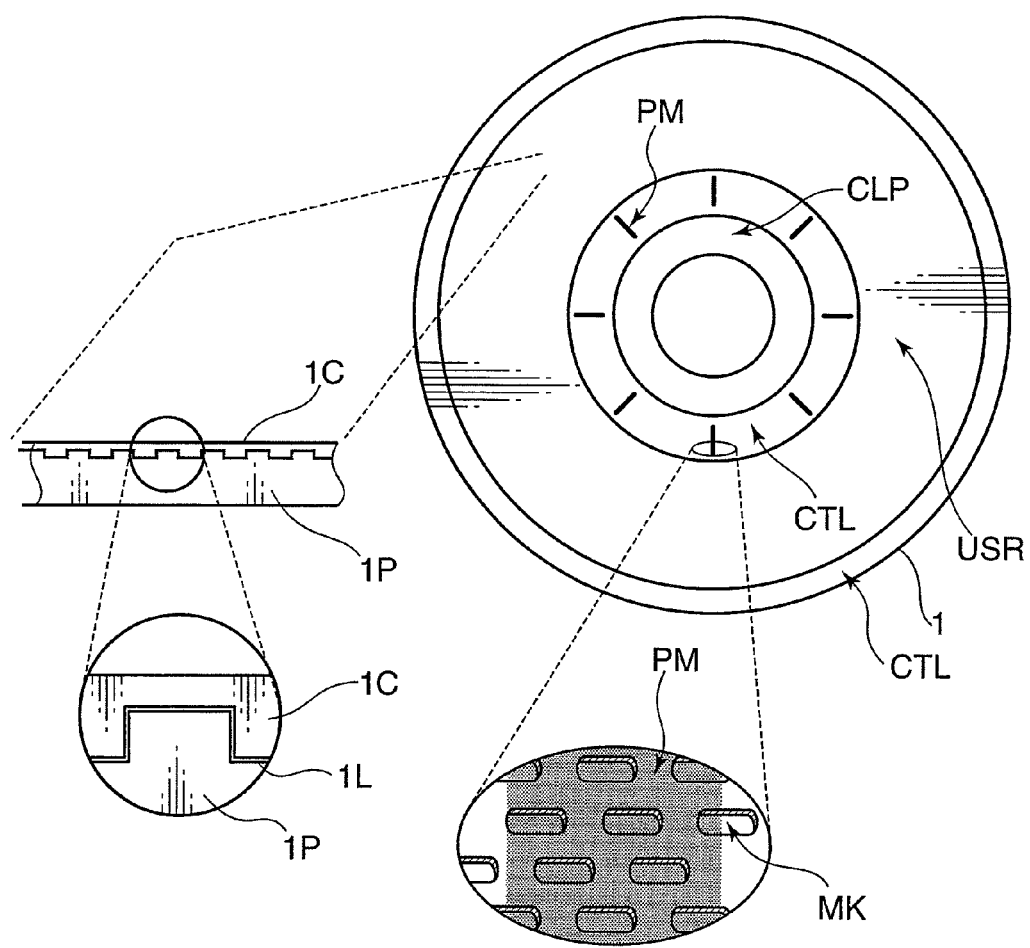
FIG. 10 is a conceptual diagram showing the construction of an optical disc according to a second embodiment.

FIG. 10 is a conceptual diagram showing the construction of an optical disc according to a second embodiment. The optical disc 1 shown in FIG. 10 includes a clamp region CLP to be clamped upon loading the optical disc 1 into an optical disc recording device or an optical disc reproduction device, two control regions CTL at inner and outer circumferential sides where information on copyright, a physical characteristic of the optical disc 1 or management information of the optical disc 1 is recorded in the form of concave and convex marks, and a user region USR where, for example, encrypted movie title or PC data information is recorded in the form of concave and convex marks.

At least the user region USR and the control regions CTL of the optical disc 1 are formed by transferring the concave and convex marks to an optical disc substrate 1P made of polycarbonate or the like, applying a reflective film 1L, whose reflectivity changes by the irradiation of laser light, on the concave and convex marks, and then applying a protective film IC.

In the control region CTL at the inner circumferential side of the optical disc 1, premarks PM formed by changing the reflectivity of the reflective film on the concave and convex marks MK or removing the reflective film by the irradiation of laser light, long in radial directions of the optical disc and crossing the track formed by the concave and convex marks are formed after the reflective film of the optical disc is applied. Further, the length of the recorded premarks PM in a circumferential direction is longer than the longest one of the concave and convex marks MK. The premarks PM may be recording marks whose reflectivity increases or decreases by the irradiation of laser light or may be non-reflective marks, for example, in the case of removing the reflective film.

In regions with the address information of the optical disc, i.e. at least in the control regions CTL and the user region USR, recordable marks are formed by irradiating laser light onto the track of the concave and convex marks MK similar to the medium ID recording method of the first embodiment after the disc shaping and the recording of the premarks PM, whereby distances from address positions recorded by the concave and convex marks to the premarks PM are recorded as physical position information. Further, the physical position information includes addresses as reference positions of the concave and convex marks PM, and a set of at least two points distanced by a specified distance in the radial direction are recorded for one premark PM.

Thus, in the control regions CTL of the optical disc 1 of this embodiment, the concave and convex marks MK including the addresses are transferred, and the premarks PM are recorded by changing the reflectivity of the reflective film or moving the reflective film removed by irradiating the laser light to the reflective film. Further, the radial distances from the address positions as references of the concave and convex marks MK to the premarks PM are obtained as the physical position information. The physical position information is detected twice or more at different radial positions with respect to one Premark PM. The physical position information is recorded as the recordable mark formed by irradiating laser light based on the track of the concave and convex marks MK in an address recorded area of at least the user region USR or the control regions CTL to change the reflectivity of the reflective film on the tracks.

The premarks PM in this embodiment are long in the radial directions of the optical disc. Accordingly, in the case of copying them, all of the recording start position, rotation speed, linear velocity and the like of the optical disc need to be identical between a copy destination and a copy source. If these differ even slightly, a reproduction position (angular position) at the copy source and a recording position (angular position) at the copy destination are displaced, whereby it becomes impossible to copy the premarks PM as recording marks straight in the radial directions. Therefore, it is very difficult to copy such marks as they are.

At the time of recording, a distance (physical position information) from the reference address position to the premark PM is measured by a reproduction clock and recorded as a recordable mark on the concave and convex marks. For one premark PM, the physical position information from at least one reference address to two points distanced by several tracks in the radial direction is recorded. At the time of reproduction, the recordable mark is reproduced to obtain the physical position information of the target address and at least two points at the time of recording, and the obtained physical position information from the target address to the premark is confirmed at least at the same two points as at the time of recording.

Accordingly, unless the optical disc is an illegally duplicated optical disc, there is a correlation between the physical position information at the time of recording and the one at the time of reproduction and the reproduction of the optical disc is permitted. On the other hand, there is no correlation between them, the optical disc is judged to be an illegally duplicated optical disc and the reproduction of the optical disc is not permitted. By comparing the pieces of physical position information from one address position to at least two points of one premark PM, it can be judged whether or not the premark PM is straight in the radial direction. Normally, if the recording position of the copy source and that of the copy destination are displaced due to illegal copying, the premark PM having lost linearity in the radial direction is duplicated. Since the linearity is judged by verifying the physical position information on at least two points in this way, resistance to illegal copying can be improved.

Further, a plurality of premarks PM may be provided on a circumference of the optical disc 1. By confirming the physical position information of all of these premarks PM, resistance to illegal copying can be improved.

Although the recording positions of the premarks PM are described to be located in the control region CTL at the inner circumferential side in this embodiment, they may be located in the control region CTL at the outer circumferential side, the user region USR or any region where the address information is recorded.

The recording positions of the premarks PM and those of the recordable marks are preferably distanced from each other by a specified radial distance. This is because it becomes difficult to separate these pieces of information if they are recorded in the same region since they are both recorded by changing the reflectivity of the reflective film.

(2-2) Optical Disc Manufacturing Method According to Second Embodiment

Figure 11:
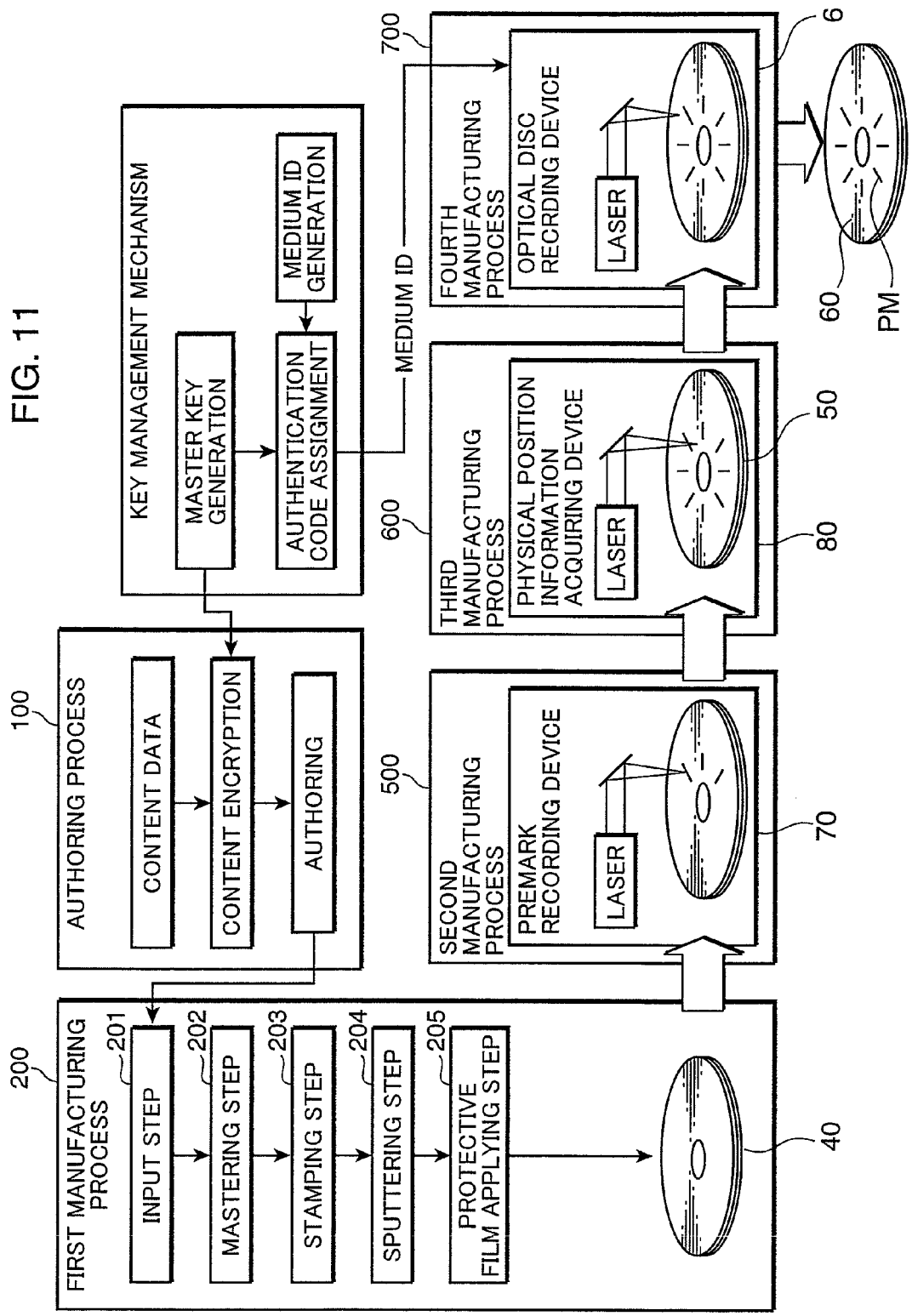
FIG. 11 is a diagram showing an optical disc manufacturing method according to the second embodiment.

FIG. 11 is a diagram showing an optical disc manufacturing method according to the second embodiment. By the optical disc manufacturing method according to the second embodiment, an optical disc is manufactured in the procedure of an authoring process 100, a first manufacturing process 200, a second manufacturing process 500, a third manufacturing process 600 and a fourth manufacturing process 700.

The authoring process 100 is a process similar to the authoring process 100 of the first embodiment, and content data to be recorded on the optical disc is authored in a disc format. The content data to be recorded is encrypted using an encryption key generated by a key management mechanism, and encrypted content data is authored and outputted to the first manufacturing process 200.

The first manufacturing process 200 is a process similar to the first manufacturing process 200 of the first embodiment, and an input step 201, a mastering step 202, a stamping step 203, a sputtering step 204 and a protective film applying step 205 are successively performed in this order to produce an optical disc 40 having no physical position information recorded thereon. Specifically, in the input step 201, the content data generated in the authoring process 100 is inputted. In the mastering step 202, a disc master is produced. In the stamping step 203, a stamper is formed to stamp the optical disc substrate, whereby concave and convex recording marks are transferred. In the sputtering step 204, a reflective film whose reflectivity changes by the irradiation of laser light is deposited on the concave and convex marks. In the protective film applying step 205, an optical disc 40 having a protective film applied on the concave and convex marks is produced. The produced optical disc 40 is transferred to the second manufacturing process 500.

In the second manufacturing process 500, a premark recording device 70 records straight premarks in radial directions by irradiating laser light at radial positions corresponding to the control region CTL at the inner side of the optical disc. The premark recording device 70 rotates the optical disc by a CAV (Constant Angular Velocity) control when the optical disc 40 produced in the first manufacturing process 20 is loaded. The premark recording device 70 moves an optical head to the radial position where the premark is to be recorded when the optical disc 40 reaches a specified rotation speed, intermittently irradiates the laser light in synchronism with a rotation synchronization signal synchronized with one rotation of the disc, and moves the optical head by a specified amount toward the outer circumferential side every time the optical disc makes one rotation. By repeatedly performing this, the premark long in the radial direction is formed on the optical disc 40.

The premark recording device 70 may form the premark by irradiating semiconductor laser light to change the reflectivity of the reflective film or may form the premark by trimming the reflective film through the irradiation of a beam by an initializer employing a YaG laser. An optical disc 50 having the premarks formed in the control region CTL at the inner circumferential side of the optical disc in the second manufacturing process 500 is transferred to the third manufacturing process 600.

In the third manufacturing process 600, the physical position information of the premarks are measured based on the address information by the concave and convex marks from the optical disc 50 having the premarks formed in the second manufacturing process 500.

A physical position information acquiring device 80 moves an optical head to the radial position, where the premark is formed, in the control region CTL at the inner circumferential side when the optical disc 50 formed with the premarks in the second manufacturing process 500 is loaded. Subsequently, the physical position information acquiring device 80 measures the physical position information of the premarks on the optical disc based on the address information recorded by the concave and convex marks. The physical position information is a clock number from the reference address position to the starting position of the premark calculated by counting reproduction clocks at the time of reproducing the concave and convex marks. In other words, the physical position information acquiring device 80 acquires the physical position information as information on a distance from the reference address position or an angle.

The physical position information acquiring device 80 measures at least two points of premark position distanced from one address reference position by a specified distance in the radial direction and outputs them in correspondence with reference address information to the fourth manufacturing process 700.

The physical position information acquiring device 80 also detects the physical position information of two or more premarks when a plurality of premarks are present in the circumferential direction and outputs it to the fourth manufacturing process 700.

The fourth manufacturing process 700 is a process similar to the second manufacturing process 300 of the first embodiment. Although the medium ID is recorded by changing the reflectivity of the reflective film through the irradiation of laser light from a specified address position in the first embodiment, this embodiment differs in that the physical position information acquired in the third manufacturing process 600 is further recorded. Since an optical disc recording device 6 similar to the one used in the second manufacturing process 300 of the first embodiment is used in the fourth manufacturing process 700, it is not described in detail in this embodiment.

Figure 12:
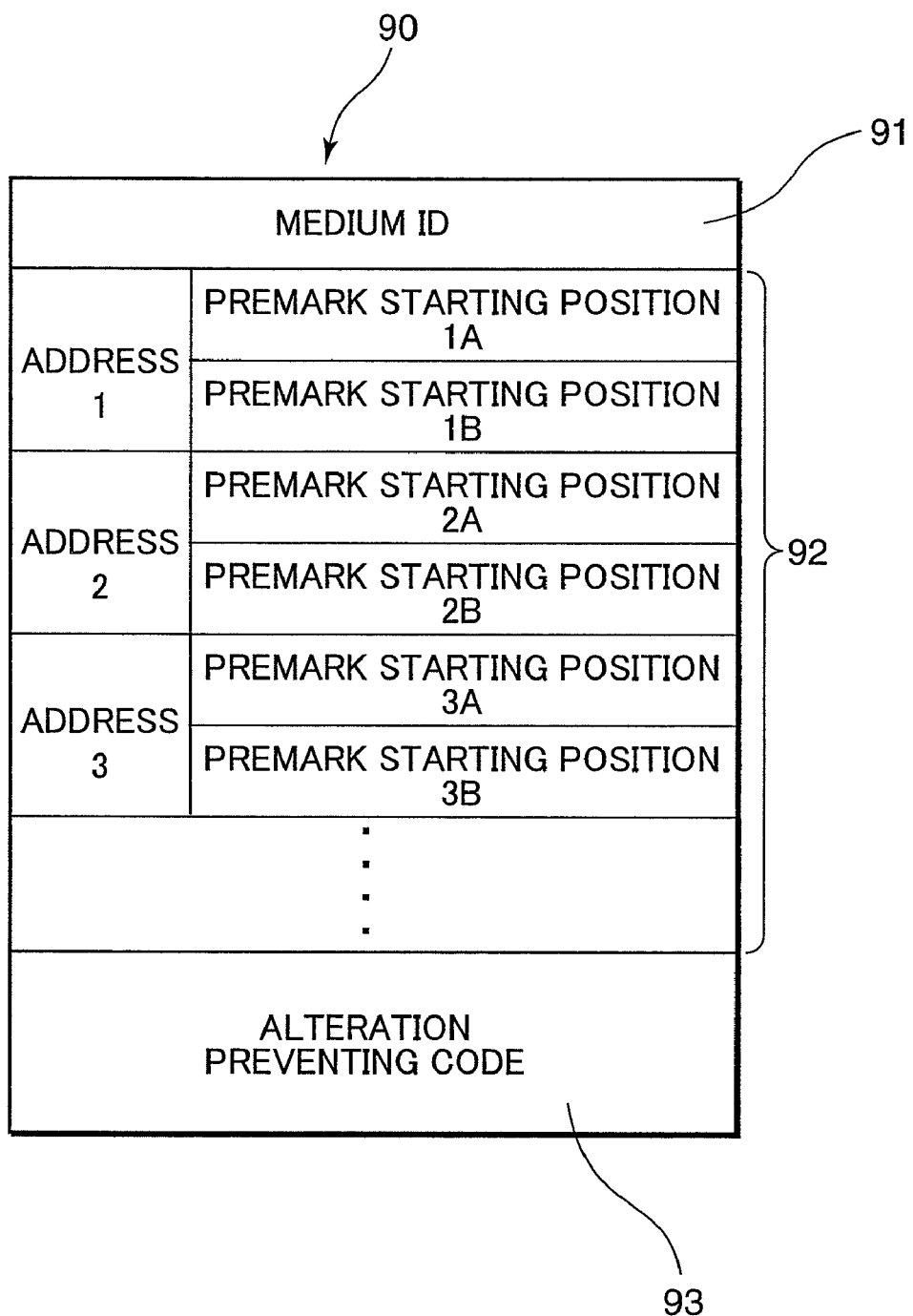
FIG. 12 is a diagram showing a data format of physical position information according to the second embodiment.

FIG. 12 is a diagram showing a data format of the physical position information indicating from the reference address positions to the positions of the premarks detected in the third manufacturing process 600 and outputted to the fourth manufacturing process 700. Physical position information 90 includes a medium ID 91, premark position information 92 and an alteration preventing code 93.

The medium ID 91 is similar to the medium ID of the first embodiment and individual identification information of each optical disc issued from the key management mechanism.

The premark position information 92 is data relating the clock number of the reproduction clock up to the starting position of the premark and the address position of the concave and convex mark based on the address information recorded by the concave and convex marks in the third manufacturing process 600 of the optical disc manufacturing method. If a plurality of premarks are recorded in the circumferential direction, the premark position information 92 includes reference addresses corresponding to the respective premarks. The premark position information 92 on at least two points distanced from the same premark distanced by a specified radial distance is detected from one address position. In other words, a premark starting position 1A and a premark starting position 1B are in correspondence with a reference address 1 in the premark position information 92 of FIG. 12. The premark starting position 1A is the starting position of the premark detected on the same track as the reference address, and the premark starting position 1B is the starting position of the premark acquired upon moving several tracks toward the outer or inner circumferential side from the reference address 1.

The alteration preventing code 93 is, for example, a MAC (Message Authentication Code). For example, a hash value of the medium ID 91 and the premark position information 92 is calculated and generated as a MAC. Key information used for the generation of the hash value is obtained from the key management mechanism. At the time of reproduction, a hash value is similarly calculated based on the medium ID 91 and the premark position information 92, it is judged whether or not the physical position information was altered by comparing the calculated hash value and the hash value (alteration preventing code 93) included in the physical position information, and the reproduction operation is continued only when no alteration is judged.

As described above, according to the optical disc manufacturing method according to the second embodiment, the straight premark is recorded in the radial direction in the control region CTL at the inner circumferential side after the optical disc having the content data recorded by the concave and convex marks is produced, the physical position information of this premark is detected based on the address position recorded by the concave and convex marks, the recordable mark whose reflectivity is changed by the irradiation of laser light onto the track of the concave and convex marks is formed, and the physical position information is recorded by the recordable mark.

It is desirable to incorporate the premark recording device, the physical position information acquiring device and the optical disc recording device used in the optical disc manufacturing method according to the second embodiment into the same device, but these devices are described as separate devices in order to simplify the description of the respective functions here.

The premark long in the radial direction is recorded on the optical disc of the second embodiment, the physical position information of this premark is measured in the manufacturing process and the measured physical position information is recorded as the recordable mark. As described above, in order to copy the premark long in the radial direction, it is necessary to accurately control the recording starting position, the rotation speed and the linear velocity at the copy source and the copy destination. However, it is virtually impossible to match these factors at both sides, wherefore illegal duplication can be eliminated. Further, since the physical position information of the premark is recorded by the method similar to the medium ID recording method of the first embodiment, the optical disc of the second embodiment has drastically higher resistance to illegal duplication as compared to the first embodiment.

(2-3) Premark Recording Device According to Second Embodiment

Figure 13:
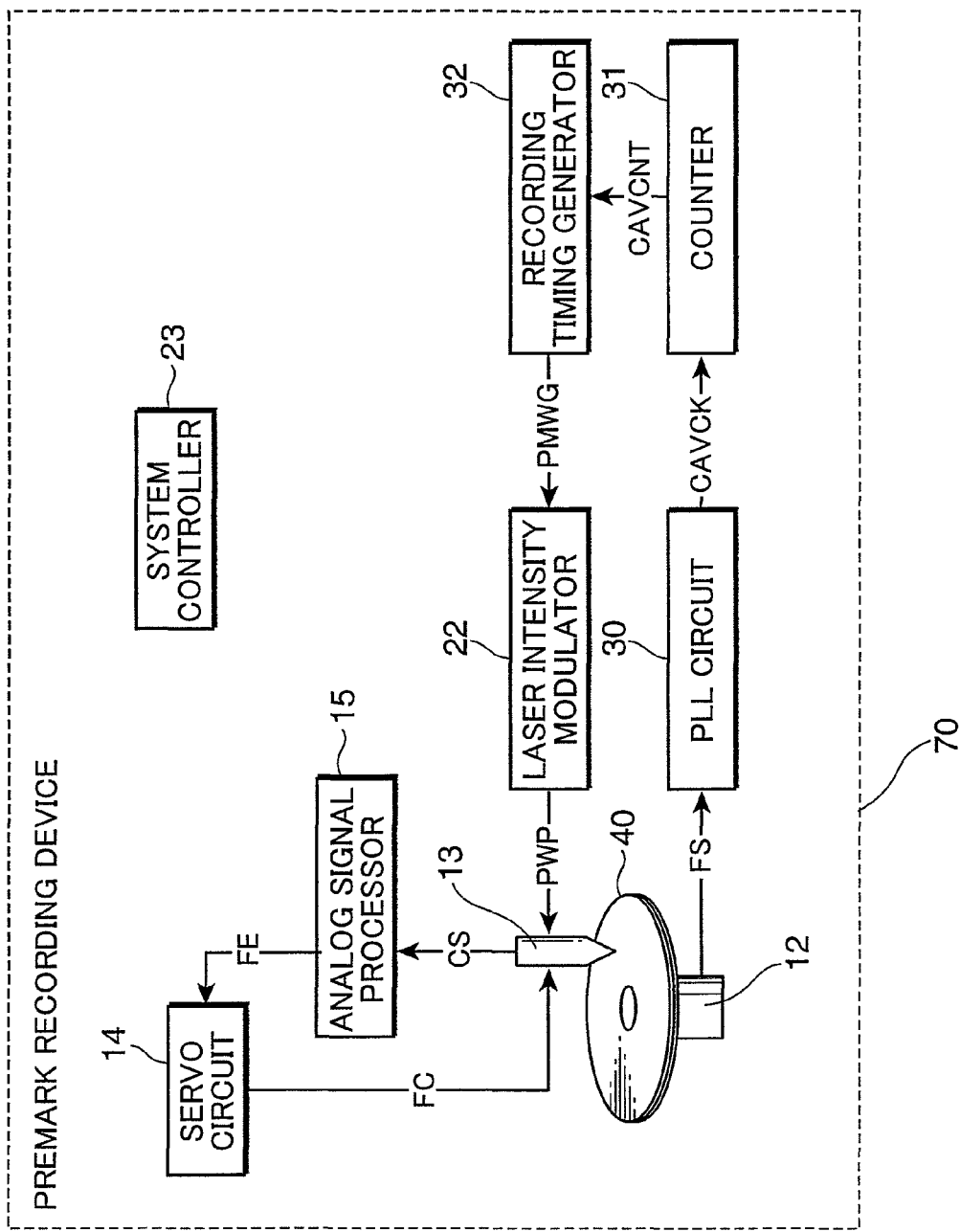
FIG. 13 is a block diagram showing the construction of a premark recording device according to the second embodiment.

FIG. 13 is a block diagram showing the construction of a premark recording device used in the second manufacturing process 500 of the optical disc manufacturing method of the second embodiment.

The premark recording device 70 is provided with a spindle motor 12, an optical head 13, an analog signal processor 15, a servo circuit 14, a PLL circuit 30, a counter 31, a recording timing generator 32, a laser intensity modulator 22 and a system controller 23.

The spindle motor 12 rotates the optical disc 40 by a CAV (Constant Angular Velocity) control when the optical disc 40 having the physical position information generated in the first manufacturing process 200 not yet recorded is inserted into a drive. The spindle motor 12 also generates a rotation synchronization signal FS to be outputted a plurality of times in synchronism with one rotation of the disc and outputs it to the PLL circuit 30.

The optical head 13 irradiates the optical disc 40 with laser light, generates a channel signal CS from the reflected light and outputs it to the analog signal processor 15.

The analog signal processor 15 generates a focus error signal FE indicating a displacement of a focus position, to which the laser light is irradiated, from the channel signal CS inputted from the optical head 13 and outputs it to the servo circuit 14.

The servo circuit 14 generates a focus control signal FC for controlling the focus position from the focus error signal FE inputted from the analog signal processor 15, and outputs it to the optical head 13. Thus, the optical head 13 irradiates the laser light while correcting the focus position.

The PLL circuit 30 generates a rotation synchronizing clock CAVCK pursuing the rotation synchronization signal FS synchronized with one rotation of the disc from the spindle motor 12 and outputs it to the counter 31. One rotation synchronization signal FS may be output per rotation, but it is desirable to output a plurality of rotation synchronization signals FS per rotation. For example, if the rotation synchronization signal FS is outputted four times per rotation, the rotation synchronization signal is outputted at every rotation angle of 45°. If the rotation synchronization signal FS is outputted 360 times per rotation, the rotation synchronization signal is outputted at every rotation angle of 1°. The PLL circuit 30 generates the rotation synchronizing clock CAVCK pursuing these rotation synchronization signals FS. If only about one rotation synchronization signal FS can be obtained per rotation, it is desirable to increase the frequency of the rotation synchronizing clock CAVCK to be outputted using a multiplying circuit after the rotation synchronizing clock CAVCK synchronized with the rotation synchronization signal FS is generated.

The counter 31 counts the rotation synchronizing clocks CAVCK outputted from the PLL circuit 30. In other words, the counter 31 equivalently counts the rotational angle of the disc. The counter 31 is reset upon one rotation of the disc. In other words, the counter 31 is reset upon counting 360 if the rotation synchronization signal FS is outputted 360 times per one rotation of the disc. The count value of this counter 31 is outputted as the rotation synchronizing clock count value CAVCNT to the recording timing generator 32.

The recording timing generator 32 generates a timing of irradiating recording laser light based on the rotation synchronizing clock count value CAVCNT from the counter 31. For example, the recording timing generator 32 generates a premark recording timing signal PMWG by detecting a timing at which the remainder is 0 when the rotation synchronizing clock count value CAVCNT is divided by 90. Thus, the recording timing generator 32 generates the premark recording timing signal PMWG four times per one rotation of the disc and within the rotational angle range of 1°. The premark recording timing signal PMWG generated by the recording timing generator 32 is outputted to the laser intensity modulator 22.

The light intensity modulator 22 increases the amount of a current flowing into a laser to generate a premark recording pulse PWP for irradiating laser light with a recording power at an output timing of the premark recording timing signal PMWG from the recording timing generator 32 and outputs it to the optical head 13. In parts where the premark recording timing signal PMWG is not outputted, the premark recording pulse PWP for irradiating the laser light having reproduction intensity is outputted.

The optical head 13 moves a laser spot position toward the outer circumferential side by a specified amount per one rotation of the disc. The specified amount is set equal to or shorter than the length in the radial direction of the premark recorded by one rotation through the irradiation of laser light. Thus, the premark straight and continuous in the radial direction of the optical disc can be recorded.

As described above, the premark recording device 70 controls the rotation of the optical disc by the CAV control after the optical disc having the concave and convex marks transferred thereto is produced, and irradiates the laser light based on the angular information (here, rotation synchronizing clock count value CAVCNT) of the optical disc. In this way, the premark long in the radial direction can be recorded.

The premark recording device 70 may employ a high-output YaG laser or the like instead of the semiconductor laser. In such a case, it is known that the reflective film in a part irradiated with the laser light is melted and removed.

Figure 14:
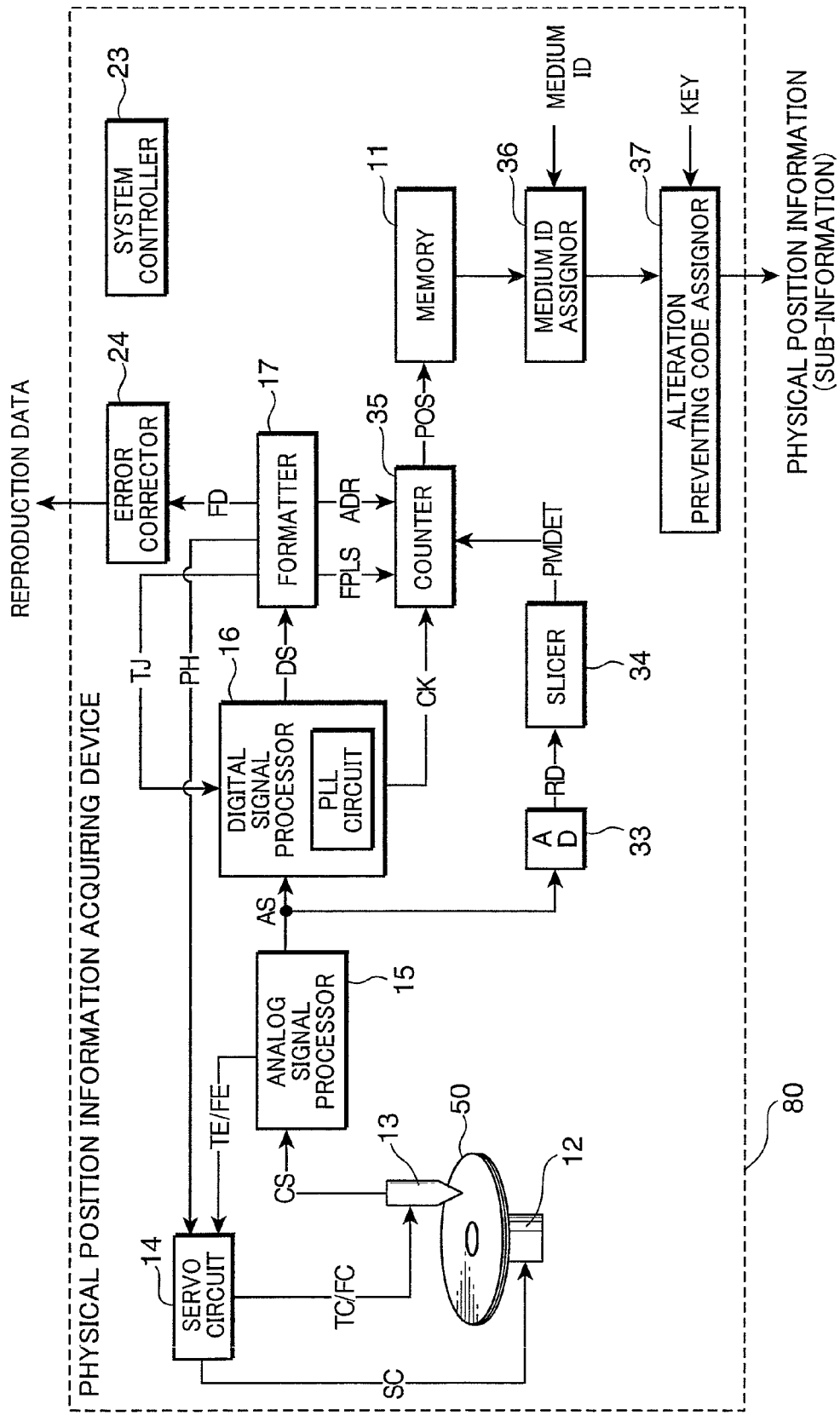
FIG. 14 is a block diagram showing the construction of a physical position information acquiring apparatus according to the second embodiment.

(2-4) Physical Position Information Acquiring Device According to Second Embodiment FIG. 14 is a block diagram showing the construction of the physical position information acquiring device used in the third manufacturing process 600 of the optical disc manufacturing method according to the second embodiment.

The physical position information acquiring device 80 extracts the address of the concave and convex mark at the radial position where the premark is recorded from the optical disc recorded with the premark in the second manufacturing process 500 of the second embodiment, and detects the starting point of the premark based on the extracted address as the physical position information. The physical position information acquiring device 80 is provided with a spindle motor 12, an optical head 13, a servo circuit 14, an analog signal processor 15, a digital signal processor 16, a formatter 17, an error corrector 24(A)D33, a slicer 34, a counter 35, a memory 11, a medium ID assignor 36, an alteration preventing code assignor 37 and a system controller 23.

The spindle motor 12 rotates an optical disc 50 at a rotation speed corresponding to the optical disc 50 when the optical disc 50 recorded with the premark is inserted, and moves the optical head 13 to a specified radial position where the premark is recorded.

The optical head 13 irradiates the optical disc 50 with laser light having reproduction intensity when the spindle motor 12 reaches a specified rotation speed, generates a channel signal CS from the reflected light and outputs it to the analog signal processor 15.

The analog signal processor 15 generates a tracking error signal TE indicating a displacement of a tracking position of a laser spot with respect to the track of the concave and convex marks and a focus error signal FE indicating a displacement of a focus position of the laser spot in accordance with the channel signal CS inputted from the optical head 13, and outputs them to the servo circuit 14. The analog signal processor 15 also generates an analog reproduction signal AS corresponding to the concave and convex marks by equalizing the waveforms of the channel signal CS inputted from the optical head 13 or amplifying the channel signal CS, and outputs it to the digital signal processor 16.

The servo circuit 14 generates a tracking control signal TC for correcting the tracking position of the laser spot in accordance with the tracking error signal TE inputted from the analog signal processor 15 and a focus control signal FC for correcting the focus position in accordance with the focus error signal FE, and outputs them to the optical head 13. The optical head 13 irradiates laser light while correcting the tracking position and the focus position in accordance with these control signals. The servo circuit 14 also generates a rotation control signal SC by comparing the rotation speed corresponding to the radial position and the current rotation speed, and outputs it to the spindle motor 12. The spindle motor 12 controls the rotation speed in accordance with the rotation control signal SC to rotate the optical disc 50.

The digital signal processor 16 is internally provided with a PLL circuit and extracts a clock signal CK synchronized with the analog reproduction signal AS inputted from the analog signal processor 15. The digital signal processor 16 also generates a binary digital reproduction signal DS by quantizing the analog reproduction signal AS inputted from the analog signal processor 15 in synchronism with the clock signal CK, and outputs it to the formatter 17.

The formatter 17 detects synchronization codes assigned at specified time intervals from the digital reproduction signal DS inputted from the digital signal processor 16 and formats by the frame that is a group of data assigned with the synchronization codes. The formatter 17 discriminates frame positions by judging the synchronization pattern of the synchronization codes, and divides into address units each comprised of a plurality of frames and assigned with address information ADR. The formatter 17 also formats into physical clusters as units of error correction based on the address information ADR to generate format data FD, and outputs it to the error corrector 24. Further, the formatter 17 extracts a frame pulse FPLS indicating the timing of the synchronization code and the address information ADR assigned to each address unit, and outputs them to the counter 35.

The error corrector 24 separates parity for error correction from the format data FD inputted from the formatter 17 and performs an error correction to the data, whereby reproduction data recorded by the concave and convex marks is outputted.

The AD 33 is constructed by a general analog-to-digital converter, and outputs a quantized reproduction signal RD to the slicer 34 by quantizing the analog reproduction signal AS inputted from the analog signal processor 15 in synchronism with the inputted clock.

The slicer 34 generates a binary premark detection signal PMDET by slicing the inputted quantized reproduction signal RD at a specified slice level, and outputs it to the counter 35. The specified slice level is set higher or lower than a slice level for binarization of the digital signal processor 16 in the physical position information acquiring device 80. This is determined whether the premark is recorded by increasing the reflectivity through the irradiation of laser light or recorded as a non-reflective mark by removing the reflective film. The specified slice level is not a fixed value and preferably automatically set by scanning the premark several times.

The counter 35 includes a channel bit counter for counting the clock signal CK inputted from the digital signal processor 16 and a frame counter for counting the number of frames.

The channel bit counter counts the number of clocks in synchronism with the clock signal CK inputted from the digital signal processor 16 and is reset by a frame pulse FPLS indicating the starting position of the frame inputted from the formatter 17.

The frame counter counts the frame pulse FPLS inputted from the formatter 17 and is reset at a timing at which the address information ADR inputted from the formatter 17 is updated.

The counter 35 generates premark position information POS based on the current count values of the channel bit counter and the frame counter and the address information ADR inputted from the formatter 17 at an input timing of the premark detection signal PMDET from the slicer 34, and outputs it to the memory 11.

The memory 11 temporarily saves the premark position information POS outputted from the counter 35. If a plurality of premarks are recorded in the circumferential direction of the optical disc, pieces of premark position information POS corresponding to the respective premarks are measured and saved.

The medium ID assignor 36 relates the medium ID inputted from the outside to the premark position information POS saved in the memory 11 when the detection of the premark of the optical disc is completed.

The alteration preventing code assignor 37 calculates hash values of the medium ID and the premark position information POS using a key given from the outside or secretly saved inside to generate an alteration preventing code (e.g. MAC), and generates the physical position information by assigning the generated alteration preventing code to the medium ID and the premark position information POS. This physical position information is outputted to the fourth manufacturing process 700 of the second embodiment.

As described above, it more effectively prevents the illegal duplication to measure the premark position information POS at two positions distanced in a specified radial direction from the same address for one premark. In this case, the formatter 17 jumps one track toward the inner circumferential side and reproduces the track at the same address position again after detecting the starting position of the premark on the same track as the reference address position, generates a track jump signal TJ for moving the track position several tracks toward the outer or inner circumferential side again at the timing of the reference address and outputs it to the servo circuit 14.

The servo circuit 14 moves the tracking position several tracks toward the outer or inner circumferential side in accordance with the track jump signal TJ. Upon the completion of a track jump, the premark position is judged from the reproduction signal, whereby the premark position can be detected at a plurality of positions distanced by the specified radial distance from one premark.

The physical position information acquiring device 80 extracts the physical position information from the reference address to the premark starting position by counting the clock signal CK at the time of reproduction. Accordingly, if the clock signal CK at the time of reproduction is disturbed by the track jump, it is impossible to detect the correct physical position information. Accordingly, the formatter 17 generates a PLL hold signal for locking the oscillation frequency of the clock signal CK generated by the PLL circuit of the digital signal processor 16 at an output timing of the track jump signal TJ to the servo circuit 14 and outputs it to the digital signal processor 16. The digital signal processor 16 can supply the stable clock signal CK even in the case of a track jump by locking the oscillation band of the PLL circuit in an output interval of the PLL hold signal.

Figure 15:
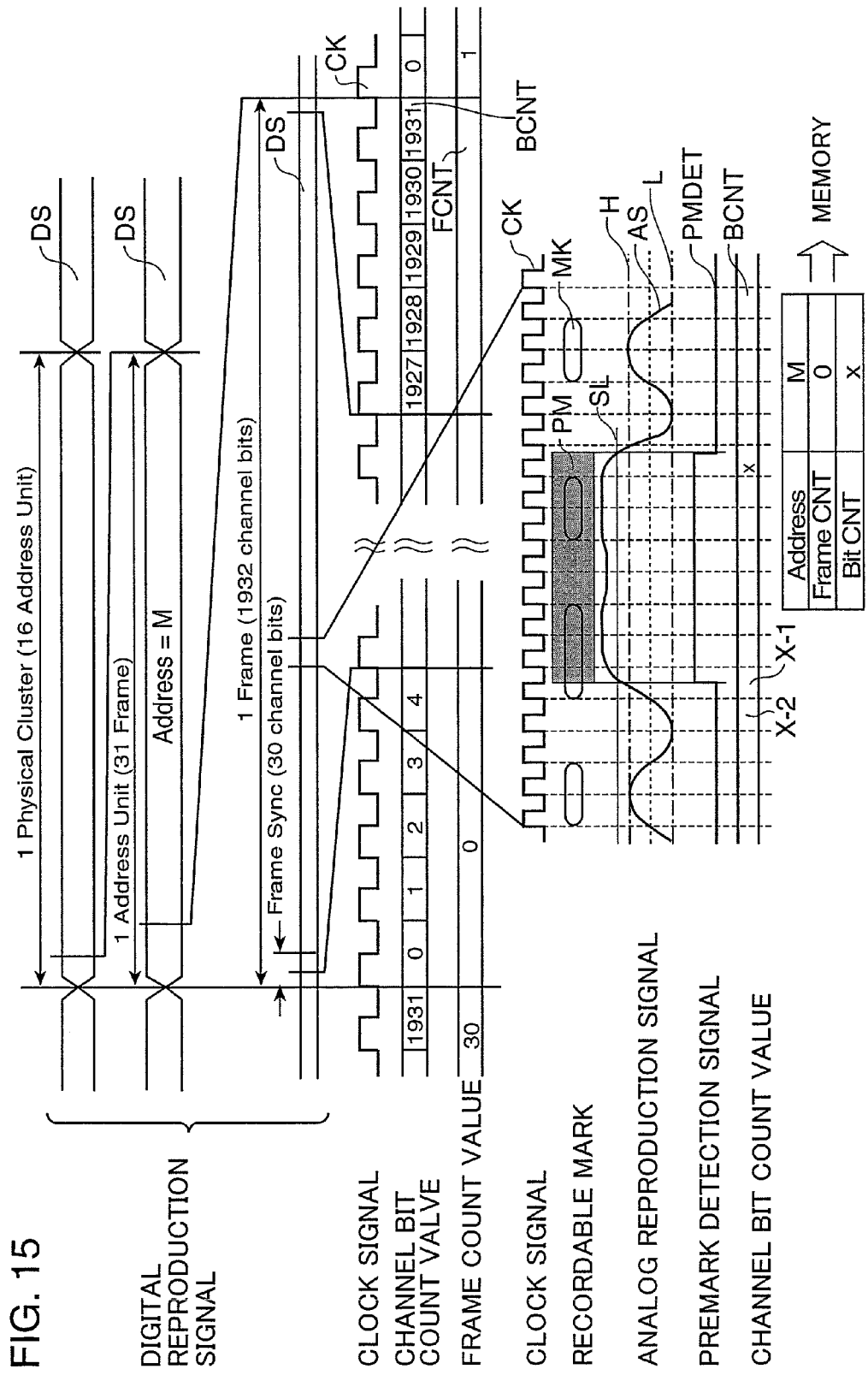
FIG. 15 is a timing chart showing a characteristic operation of the physical position information acquiring apparatus according to the second embodiment.

FIG. 15 is a timing chart showing a characteristic operation of the physical position information acquiring device 80 when the optical disc of the second embodiment is a Blu-ray disc.

The digital reproduction signal DS outputted from the digital signal processor 16 of the physical position information acquiring device 80 to the formatter 17 is formatted by the physical cluster as a unit for error correction of main information corresponding to the concave and convex mark by the formatter 17. One physical cluster is made up of 16 address units having addresses. Further, one address unit can be divided into 31 frames with synchronization codes. Further, one frame is made up of 1932 channel bits and has a synchronization code of 30 channel bits at the leading end.

The counter 35 of the physical position information acquiring device 80 is a counter synchronized with the clock signal CK from the digital signal processor 16 and includes the channel bit counter for counting the clock signal CK and the frame counter for counting the frame pulses indicating the leading end positions of the frames from the formatter 17.

The channel bit counter counts the number of clocks in synchronism with the clock signal CK and is reset at the timing of the frame pulse FPLS. In other words, the channel bit counter operates as a counter for counting 0 to 1931 per frame.

The frame counter is a counter for counting the frame pulses and counts 0 to 15 per address unit. The frame counter is reset at an update timing of the address information ADR inputted from the formatter 17.

Next, a method for detecting the premark is described. The physical position information acquiring device 80 irradiates the laser light having reproduction intensity to the concave and convex marks of the optical disc and generates the analog reproduction signal AS from the reflected light. In the digital signal processor 16, the clock signal CK synchronized with the analog reproduction signal AS is extracted from this analog reproduction signal AS by the internally provided PLL circuit. The digital signal processor 16 also generates the digital reproduction signal DS by quantizing this analog reproduction signal AS in synchronism with the clock signal CK and slicing the quantized reproduction signal at a slice level SL1 to binarize the reproduction signal.

The premark PM straight in the radial direction is so prerecorded in the control region CTL at the inner circumferential side as to cross the track of the concave and convex marks MK. In the second embodiment, an operation in the case of forming the premark by improving the reflectivity through the irradiation of laser light is described.

If the premark is present during the reproduction by tracking on the concave and convex marks, the modulation factor of the analog reproduction signal AS is increased since the reflectivity is higher than a maximum level H of the reflected light during the reproduction of the concave and convex marks.

The slicer 34 generates a premark detection signal PMDET by slicing the quantized reproduction signal RD at a slice level SL2 for detecting the premark position of the level higher than the slice level SL1 for binarizing the analog reproduction signal AS and higher than the maximum level H of the reflected light from the concave and convex marks, and outputs it to the counter 35.

The counter 35 stops the counting operations of the channel bit counter and the frame counter provided inside upon detecting the rise of the premark detection signal PMDET and holds the respective count values (channel bit count value BCNT and frame count value FCMT).

The held frame count value FCMT and channel bit count value BCNT are transferred as the premark position information POS to the memory 11 together with the address information ADR, and saved in the memory 11.

As described above, the physical position information acquiring device 80 can extract the premark position information from the reference address to the premark starting position based on the address of the reproduction signal, the frame position and the channel bit position. By setting the slice levels for binarizing the analog reproduction signal AS respectively for the concave and convex marks and the premark, it is possible to detect the concave and convex marks and the premark while distinguishing them. Although the premark whose reflectivity is increased by the irradiation of laser light is described in the second embodiment, a level lower than the minimum level of the reflected light from the concave and convex marks is conversely set as the slice level SL2 for premark detection in the case of the premark in a non-reflecting state by removing the reflective film.

If no large difference is confirmed between the maximum level of the reflected light from the concave and convex marks and the maximum level of the reflected light from the premark, if no large difference is confirmed between the minimum level of the reflected light from the concave and convex marks and the minimum level of the reflected light from the premark or if the reproduction signal cannot be normally sliced due to large noise of the premark portion, the slice level SL1 for the concave and convex marks may be set as the slice level SL2 for premark detection. In this case, the premark and the concave and convex marks can be distinguished by detecting that the output interval (=premark width) of the premark detection signal is wider than the maximum width of the concave and convex marks in the circumferential direction.

Figure 16:
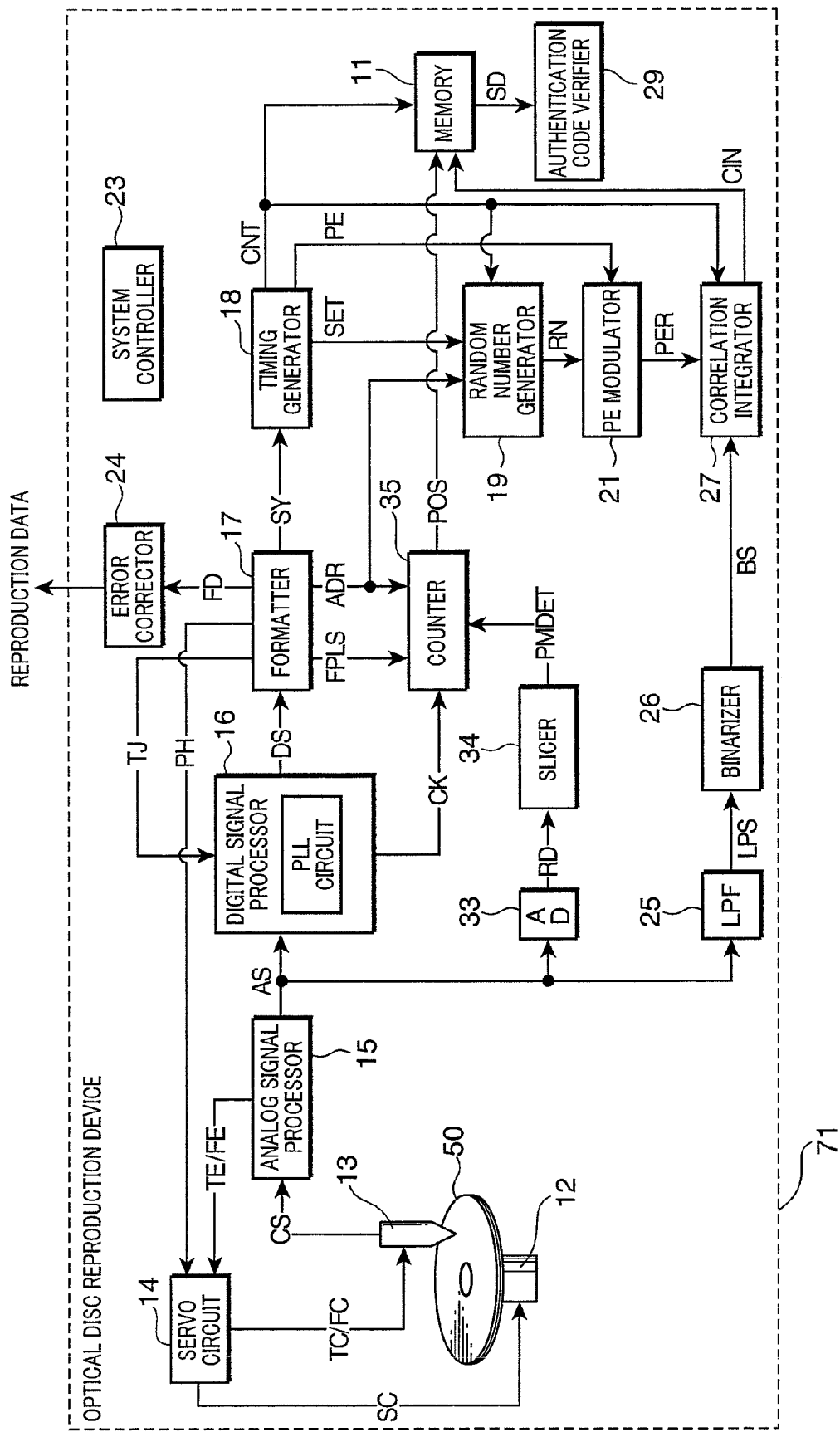
FIG. 16 is a block diagram showing the construction of an optical disc reproduction device according to the second embodiment.

Next, an optical disc reproduction device according to the second embodiment is described. FIG. 16 is a block diagram showing the construction of the optical disc reproduction device according to the second embodiment. An optical disc reproduction device 71 shown in FIG. 16 is provided with a spindle motor 12, an optical head 13, a servo circuit 14, an analog signal processor 15, a digital signal processor 16, a formatter 17, an error corrector 24, a timing generator 18, a random number generator 19, a PE modulator 21, a LPF 25, a binarizer 26, a correlation integrator 27, a memory 11, an authentication code verifier 29, an AD 33, a slicer 34, a counter 35 and a system controller 23.

The optical disc reproduction device 71 according to the second embodiment is a combination of the optical disc reproduction device 7 shown in FIG. 8 and the physical position information acquiring device 80 shown in FIG. 14. Since the respective constituent elements are the same as those of the optical disc reproduction device 7 and the physical position information acquiring device 80, they are not described.

In this embodiment, the formatter 17, the memory 11, the authentication code verifier 29, the AD 33, the slicer 34 and the counter 35 correspond to an example of a position confirming unit, and the system controller 23 to examples of a comparing unit and a reproduction limiting unit.

Figure 17:
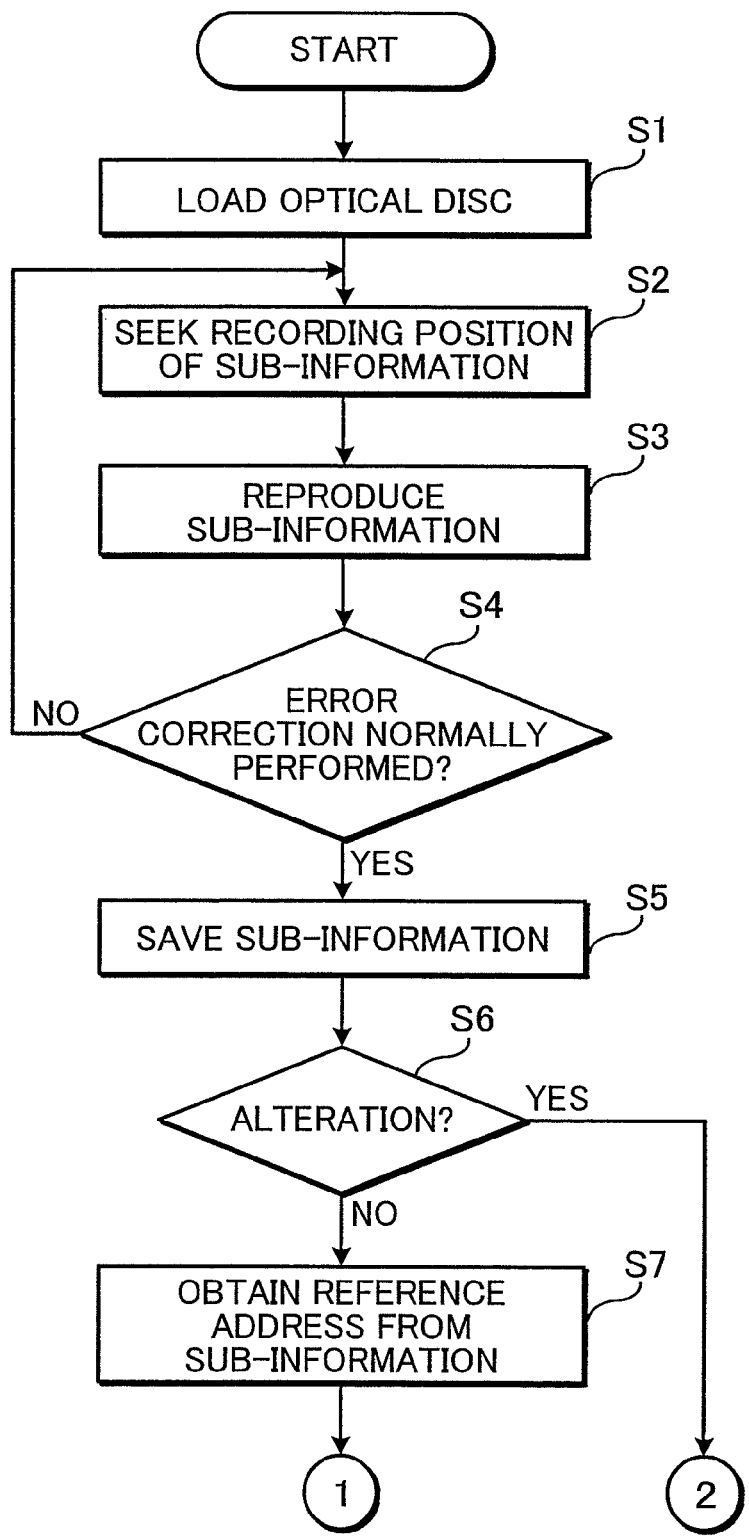
FIG. 17 is a first flow chart showing an illegal disc judgment process in the optical disc reproduction device according to the second embodiment.
Figure 18:
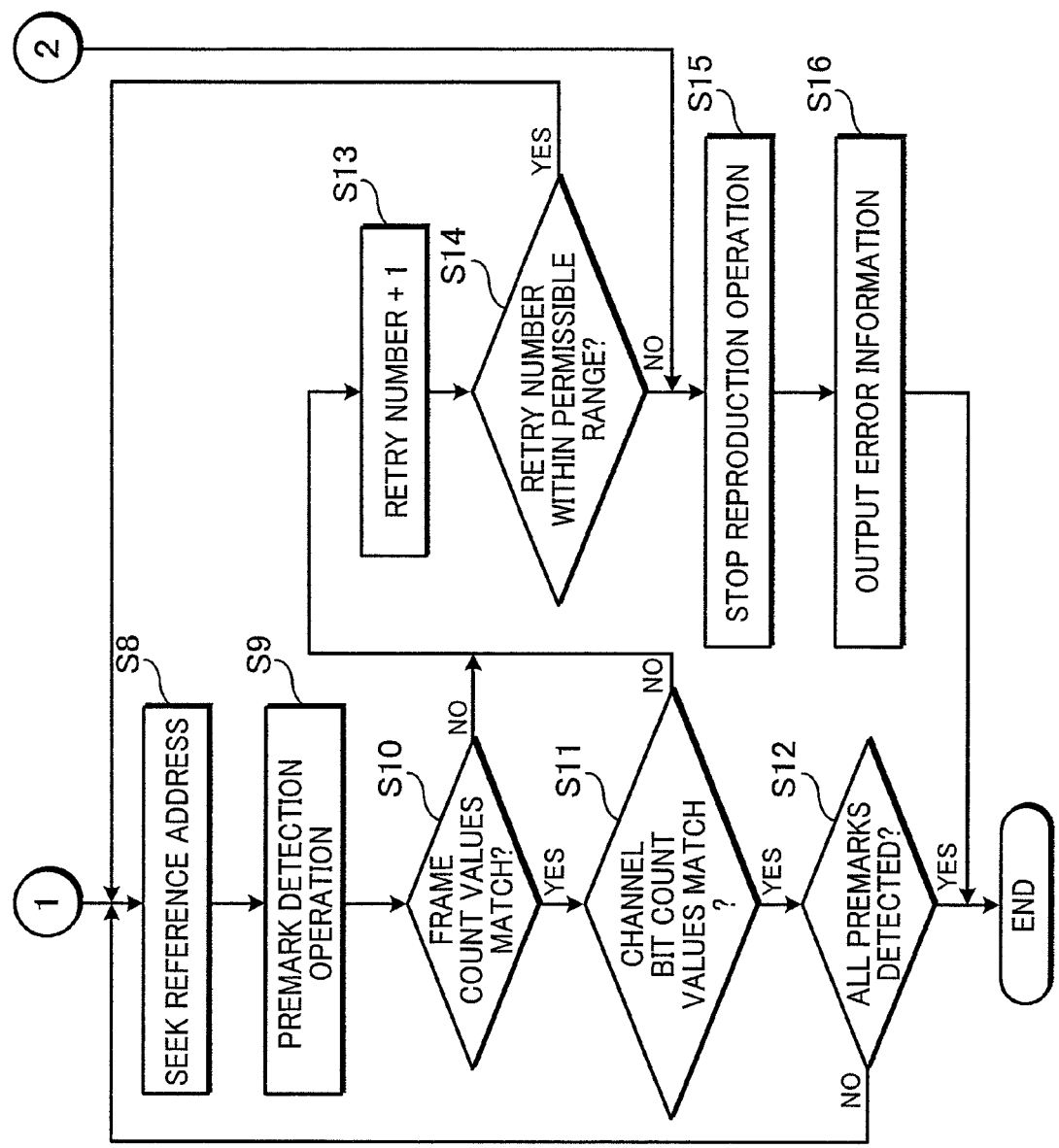
FIG. 18 is a second flow chart showing the illegal disc judgment process in the optical disc reproduction device according to the second embodiment.

FIGS. 17 and 18 are flow charts showing an illegal disc judgment process in the optical disc reproduction device according to the second embodiment. In the optical disc reproduction device 71, the illegal disc judgment process is started when the power supply is turned on and the optical disc is inserted. A start timing may be set before an access to the encrypted program or cyclically set at specified intervals.

First of all, an optical disc 241 is loaded into the optical disc reproduction device 71 (Step S1). After completing the loading, the system controller 23 causes the optical head 13 to seek the position of an address N (e.g. in a user area) where the physical position information is recorded by the recordable mark formed by irradiating laser light in the track direction to change the reflectivity of the reflective film (Step S2).

After completing the seek, the system controller 23 reproduces the sub-information (physical position information) recorded on the optical disc (Step S3). Since the reproduction procedure of this physical position information is similar to that of the medium ID in the optical disc reproduction device 71 of the first embodiment, it is not described here.

Subsequently, the system controller 23 performs an error correction to the physical position information based on parity for error correction assigned to the reproduced physical position information by the error corrector 24 and judges whether or not the error correction was normally performed (Step S4). As a result, if the error correction is judged to be impossible (NO in Step S4), this routine returns to Step S2 to continue the reproduction operation of the sub-information, assuming that the integration time is short.

On the other hand, if the error correction is judged to have been normally performed (YES in Step S4), the system controller 23 saves the sub-information (physical position information) in the memory 11 (Step S5).

The system controller 23 generates an alteration preventing code (hash value for verification) for verification anew from the physical position information, and judges whether the generated alteration preventing code for verification and the alteration preventing code (reproduced hash value) assigned to the physical position information match. In this way, the system controller 23 judges whether or not the physical position information has been altered (Step S6). If the both alteration preventing codes match, the system controller 23 continues the process, judging that there is no illegal alteration in the physical position information. On the other hand, unless the both alteration preventing codes match, the system controller 23 moves onto an operation of interrupting the process, judging that the physical position information has been altered or the optical disc is an optical disc manufactured by an illegal maker.

If the alteration is judged (YES in Step S6), this routine proceeds to a reproduction stop processing in Step S15 and the subsequent Step. On the other hand, if no alteration is judged (NO in Step S6), the system controller 23 obtains a reference address M used to detect the premark position information extracted at the time of recording from the physical position information (Step S7). Subsequently, the system controller 23 causes the optical head 13 to seek the obtained reference address M (Step S8).

When the optical head 13 reaches the reference address M, the premark detection operation is started. Since the premark detection operation is similar to the operation of the physical position information acquiring device 80 of the second embodiment, it is not described here. If the premark detection operation for detecting the premark position information is completed, the frame position information (frame count value FCNT) and the channel bit position information (channel bit count value BCNT) from the reference address M are outputted as described above (Step S9).

Subsequently, the system controller 23 compares the frame count value FCNT included in the sub-information (physical position information) reproduced in Step S3 and the frame count value FCNT obtained in the premark detection operation and judges whether or not the both frame count values FCNT match (Step S10). If the both frame count values FCNT are judged not to match (NO in Step S10), this routine proceeds to a rewrite processing in Step S13 and subsequent Steps.

If the both frame count values FCNT are judged to match (YES in Step S10), the system controller 23 compares the channel bit count value BCNT included in the sub-information (physical position information) reproduced in Step S3 and the channel bit count value BCNT obtained in the premark detection operation and judges whether or not the both channel bit count value BCNT match (Step S11). If the both channel bit count values BCNT are judged not to match (NO in Step S11), this routine proceeds to the retry processing in Step S13 and subsequent Steps. This routine proceeds to the next processing if the both count values match while proceeding with the retry processing if they do not match (Step S11).

On the other hand, if the both channel bit count values BCNT are judged to match (YES in Step S11), the system controller 23 judges whether or not all the premarks have been detected (Step S12). Here, unless it is judged that all the premarks have been detected (NO in Step S12), this routine proceeds to the processing in Step S8 and the system controller 23 causes the optical head 13 to seek a reference address for confirming the position information of the next premark. If it is judged that all the premarks have been detected (YES in Step S12), the system controller 23 permits the reproduction operation and ends the illegal disc judgment process.

Next, the retry processing in Step S13 and subsequent Steps is described. If the both channel bit count values BCNT or the both frame count values FCNT are judged not to match in Steps S10 or S11, the system controller 23 increments a retry number saved beforehand (Step S13).

Subsequently, the system controller 23 judges whether or not the retry number as a result of increment lies in a permissible range (Step S14). If the retry number is judged to lie in the permissible range (YES in Step S14), the routine returns to the processing in Step S8 again and the system controller 23 causes the optical head 13 to seek the reference address M to perform the premark detection operation. On the other hand, if the retry number is judged to exceed the permissible range (NO in Step S14), the reproduction stop processing in Step S15 and subsequent Step follows.

Next, the reproduction stop processing in Step S15 and subsequent Step is described. The reproduction stop processing is a processing for ejecting the optical disc as an illegal disc when the retry number exceeds the permissible range or when the alteration is judged to have been made. First of all, the system controller 23 stops the reproduction operation currently in process (Step S15). At this time, it is desirable not to receive any command except the one to eject the optical disc.

When the reproduction operation is stopped, the system controller 23 generates and outputs error information. This error information desirably includes the cause having led to the stop of the reproduction operation (Step S16). The error information is outputted to and displayed on a display device such as a monitor to be notified to the user.

As described above, in the case of, for example, the alteration of the physical position information recorded by the recordable mark, the optical disc is judged to be an illegal disc and the reproduction operation can be stopped by the illegal disc judgment process by the optical disc reproduction device. Further, unless the premark position information at the time of recording included in the physical position information and the premark position information detected by the optical disc reproduction device match, the reproduction operation can be stopped, assuming the optical disc to be an illegally copied disc. Therefore, the reproduction of the optical disc recorded with the illegally altered physical position information or the optical disc duplicated from a proper one can be stopped and the rights of copyrighted works recorded on the optical disc can be protected.

Further, the construction of the optical disc reproduction device 71 is realized to include both the construction of the physical position information acquiring device 80 in the third manufacturing process 600 of the optical disc manufacturing method according to the second embodiment and that of the optical disc reproduction device 7 according to the first embodiment. In other words, the optical disc reproduction device according to the second embodiment can be realized to have both the function of detecting the physical position information of the premark in the physical position information acquiring device 80 and the function of reproducing the sub-information in the optical disc reproduction device 7 according to the first embodiment. A program for realizing the above illegal disc judgment process is stored in the optical disc reproduction device of the second embodiment.

Although the above illegal disc judgment process is described to detect the premark position information at two points distanced by the specified distance in the radial direction at the same reference address for the sake of simplifying the description, the position information of two points distanced from one reference address in the radial direction may be detected to judge the linearity of the premark. Specifically, the premark position is detected on the same track recorded with the reference address and the same address position is sought again after making an inward movement to cross one track. When the target address position is reached again, the premark position is confirmed by moving the track position several tracks toward the inner or outer side. Even if the premark is illegally copied and not straight in the radial direction, a jump of several tracks is made in the radial direction to judge the presence or absence of the premark again after the presence or absence of the premark is judged based on the reference address, whereby the reproduction of the optical disc is stopped, judging that the premark is not straight or there is no consistency in the physical position information.

Although the position information on all the premarks is conformed in the illegal disc judgment process of the second embodiment, the present invention is not particularly limited to this. Only some of the recorded premarks may be confirmed to shorten the reproduction starting time. For example, out of eight premarks radially formed, the position information on only four premarks may be confirmed.

Third Embodiment

(3-1) Optical Disc According to Third Embodiment

Figure 19:
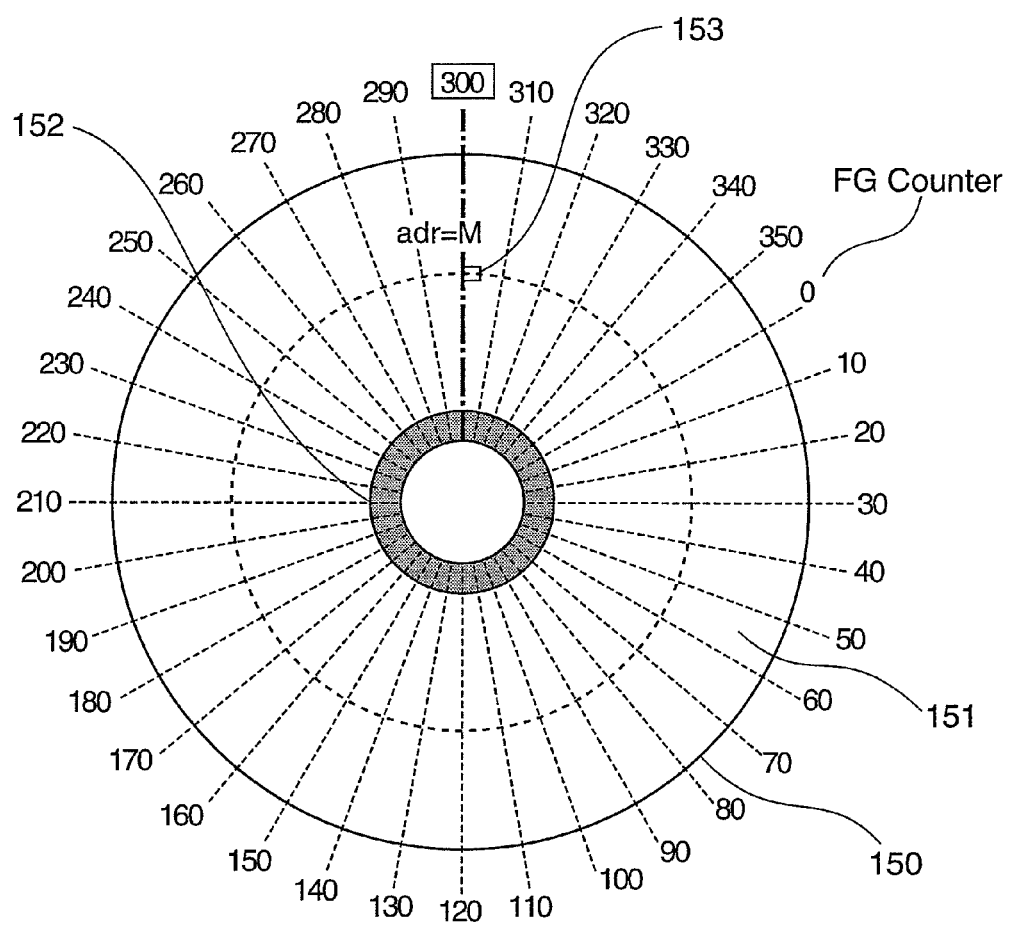
FIG. 19 is a conceptual diagram showing the construction of an optical disc according to a third embodiment.

FIG. 19 is a conceptual diagram showing the construction of an optical disc according to a third embodiment. An optical disc 150 of the third embodiment includes a user region 151, on which content data is recorded, and a sub-information recording region 152, on which the identification information of the optical disc 150 is recorded.

Content data is recorded in the form of concave and convex marks beforehand in the user region 151, and neither concave and convex marks nor wobble guide grooves are recorded in the sub-information recording region 152. A reflective film of the optical disc 150 is a recording film whose reflectivity changes by the irradiation of laser light.

No special synchronization codes are included in the sub-information recording region 152 where the identification information of the optical disc 150 is recorded, and the identification information is recorded from the same angular position as that of the leading end position of an address unit 153 having an address as a reference of the user region 151.

The angular position information of the optical disc is determined in accordance with a rotation synchronization signal outputted from a spindle motor of an optical disc recording device or an optical disc reproduction device. The optical disc recording device or the optical disc reproduction device generates a clock signal synchronized with one rotation by a PLL control of the rotation synchronization signal synchronized with one rotation of the disc. The angular position of the optical disc is calculated by a count value (FG Counter) of these clocks.

In an example of FIG. 19, 360 counts are made for one rotation of the disc. In other words, one cycle of clock is generated at every rotation angle of 1° of the disc and the counter synchronized with this counts one per clock to extract the angle information. In this example, the address unit as a reference of an address value M starts when the count value is "300". Thus, the optical disc recording device moves an optical head to a radial position corresponding to the sub-information recording region after the leading end position of the address unit having the address value M is reproduced beforehand to extract the count value of the rotational synchronization, and records the identification information bit by bit in synchronism with the clock of the rotation synchronization signal from the count value of "300" of rotational synchronization.

In the above manner, in the optical disc 150 of the third embodiment, after the content data is recorded in the form of the concave and convex marks in the user region 151 beforehand, the angle information of the reference address position in the user region 151 is extracted and the identification information of the optical disc is additionally recorded from an extracted angle in the sub-information recording region 152.

The identification information can be used to record medium unique information. Since the identification information can be recorded on the optical disc having the concave and convex marks transferred thereto beforehand, information unique to each optical disc can be additionally recorded even if the optical disc is a read-only optical disc manufactured by transferring concave and convex marks using a stamper.

Although 360 counts are made per one rotation, i.e. 1 count is made at every rotation of 1° of the optical disc in the third embodiment, the present invention is not limited to this. Any resolution may be adopted provided that it can reliably discriminate the reference address position. For example, in the case of a Blu-ray disc, 32 address units are recorded per one rotation near a radial position of 23 mm. Accordingly, in this case, resolution is sufficient to be equal to or above 63 counts (1 count at every rotation of 5.6°) per one rotation so as to be able to reliably discriminate 32 address positions.

(3-2) Optical Disc Recording Device According to Third Embodiment

Figure 20:
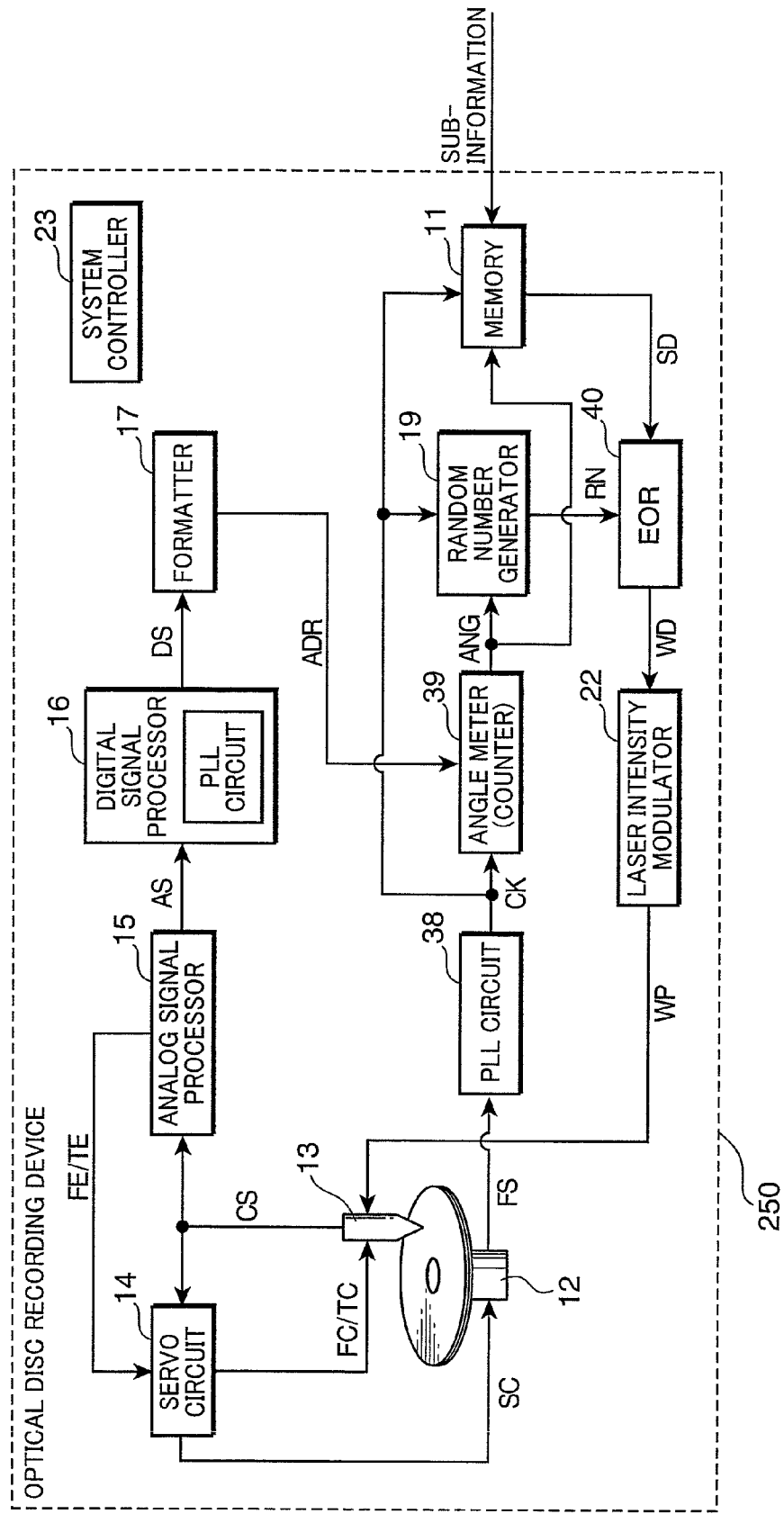
FIG. 20 is a block diagram showing the construction of an optical disc recording device according to the third embodiment.

Next, an optical disc recording device according to the third embodiment is described. FIG. 20 is a block diagram showing the construction of the optical disc recording device according to the third embodiment. The optical disc recording device 250 shown in FIG. 20 is provided with a spindle motor 12, an optical head 13, a servo circuit 14, an analog signal processor 15, a digital signal processor 16, a formatter 17, a PLL circuit 38, an angle meter 39, a random number generator 19, an EOR 40, a memory 11, a laser intensity modulator 22 and a system controller 23.

The spindle motor 12 rotates an optical disc when the optical disc is loaded into the optical disc recording device 250. The optical head 13 irradiates the optical disc with laser light having reproduction intensity, generates a channel signal CS from the reflected light and outputs it to the analog signal processor 15.

The analog signal processor 15 generates a focus error signal FE indicating a displacement of a focus position at a position where the laser light of the optical head 13 is irradiated and a tracking error signal TE indicating a displacement in the radial direction between a track position of the concave and convex marks and a position irradiated with the laser light from the channel signal CS inputted from the optical head 13, and outputs them to the servo circuit 14. The analog signal processor 15 also extracts signal components corresponding to concave and convex marks in accordance with the channel signal CS inputted from the optical head 13, generates an analog reproduction signal AS by amplifying or equalizing the waveforms of the extracted signal components, and output it to the digital signal processor 16.

The servo circuit 14 generates a focus control signal FC for correcting the displacement of the focus position from the focus error signal FE inputted from the analog signal processor 15 and a tracking control signal TC for correcting the displacement of the tracking position from the tracking error signal TE, and outputs them to the optical head 13. The servo circuit 14 also calculates a linear velocity at the radial position, where the information is being reproduced, in accordance with the channel signal CS, calculates a rotation speed from the reproduction signal, generates a rotation control signal SC to attain an optimal rotation speed and outputs it to the spindle motor 12.

When the optical disc is loaded, the optical disc recording device 250 first seeks a reference address position preset in the system controller 23 and moves one track toward the inner circumferential side per one rotation, whereby the track position at the reference address position is held and the rotation speed corresponding to the radial position of the reference address position is held.

The digital signal processor 16 extracts the clock signal CK synchronized with the analog reproduction signal AS inputted from the analog signal processor 15 by a PLL circuit provided inside, generates a binary digital reproduction signal DS by quantizing the inputted analog reproduction signal AS in synchronism with the clock signal CK and outputs it to the formatter 17.

The formatter 17 detects synchronization codes assigned at specified time intervals from the digital reproduction signal DS inputted from the digital signal processor 16, reconfigures it by the frame at a detection timing, divides each frame by the address unit including address information by a synchronization pattern of the synchronization codes, extracts address information ADR assigned to each address unit and output it to the angle meter 39.

The PLL circuit 38 is constructed by a general PLL circuit, calculates a phase error between the rotation synchronization signal FS inputted from the spindle motor 12 and the clock signal CK generated inside and changes the frequency of the clock signal CK generated inside so that the phase error becomes "0". Accordingly, in the PLL circuit 38, the clock signal CK synchronized with the rotation of the optical disc can be generated and is outputted to the angle meter 39, the random number generator 19 and the memory 11.

The angle meter 39 counts the clock signal CK from the PLL circuit 38 to measure the angular position of the optical disc. The angle meter 39 counts the clock signal CK from the PLL circuit 38, and saves a count value at the timing of the leading end position of the address unit having the reference address information if the address information ADR from the formatter 17 is reference address information preset in the system controller 23. In other words, the angle meter 39 extracts and holds the angular position of the reference address position.

If the angular position of the reference address position is measured by the angle meter 39, the system controller 23 controls the spindle motor 12 by a CAV control to make an angular velocity constant, and moves the optical head 13 to a radial position corresponding to the sub-information recording region at the inner circumferential side of the disc.

After the optical head 13 is moved to the sub-information recording region, the PLL circuit 38 generates a clock signal CK synchronized with the rotation synchronization signal FS from the spindle motor 12 and outputs it to the angle meter 39 in a manner similar to the above.

The angle meter 39 counts the clock signal CK inputted from the PLL circuit 38, generates a count value indicating the angular position of the saved reference address as angular position information ANG, and outputs it to the random number generator 19 and the memory 11.

The memory 11 stores the sub-information (medium unique information) SD inputted beforehand, and outputs the sub-information SD bit by bit to the EOR 40 in synchronism with the inputted clock signal CK in accordance with the angular position information ANG from the angle meter 39. The memory 11 outputs the sub-information bit by bit in a bit order from a position "0" of the angular position information, i.e. from the angular position of the reference address.

The random number generator 19 is reset at the leading end position of the angular position information ANG inputted from the angle meter 39 similar to the memory 11, generates a pseudo random sequence RN bit by bit in synchronism with the clock signal CK and outputs it to the EOR 40. The random number generator 19 is a general M-sequence generator including a shift register, and shifts the internal shift register in synchronism with the clock signal CK inputted from the PLL circuit 38 to generate the pseudo random sequence RN bit by bit.

The EOR 40 is a general XOR gate, calculates an exclusive OR of the sub-information SD from the memory 11 and the pseudo random sequence RN from the random number generator 19 to generate recording data WD, and outputs it to the laser intensity modulator 22.

The laser intensity modulator 22 generates a recording pulse WP indicating the timing and intensity of the irradiation of recording laser light in accordance with the recording data WD inputted from the EOR 40, and outputs it to the optical head 13.

The optical head 13 controls the value of a current flowing into a laser based on the recording pulse WP inputted from the laser intensity modulator 22 and irradiates laser light, thereby forming a recordable mark in the sub-information recording region of the optical disc to record the sub-information (medium unique information).

In the above manner, the optical disc recording device 250 moves the optical head 13 to the sub-information recording region after calculating the angular position of the reference address recorded in the form of concave and convex marks beforehand by means of a counter in accordance with the clock signal CK generated from the rotation synchronization signal FS, and records the sub-information in synchronism with the clock signal synchronized with the rotation synchronization signal FS from the same angular position as the angular position information of the reference address. In this way, the medium unique information and the like can be recorded even on an optical disc manufactured by the transfer by a stamper.

Further, the optical disc recording device 250 of the third embodiment records the sub-information scrambled with the pseudo random sequence RN by generating the pseudo random sequence RN based on the angular position of the address recorded by the concave and convex marks. Thus, if the optical disc is illegally duplicated, there is an error between the angular position of the reference address and that of the starting position where the sub-information is recorded and the pseudo random sequence RN cannot be generated at a correct timing. Therefore, the reproduction operation of such an illegal disc can be stopped.

In this embodiment, the PLL circuit 38 corresponds to an example of a clock generator, the angle meter 39 to an example of a reference angle extracting unit, the optical head 13, the random number generator 19, the EOR 40, the memory 11 and the laser intensity modulator 22 to an example of a sub-information recording unit.

Figure 21:
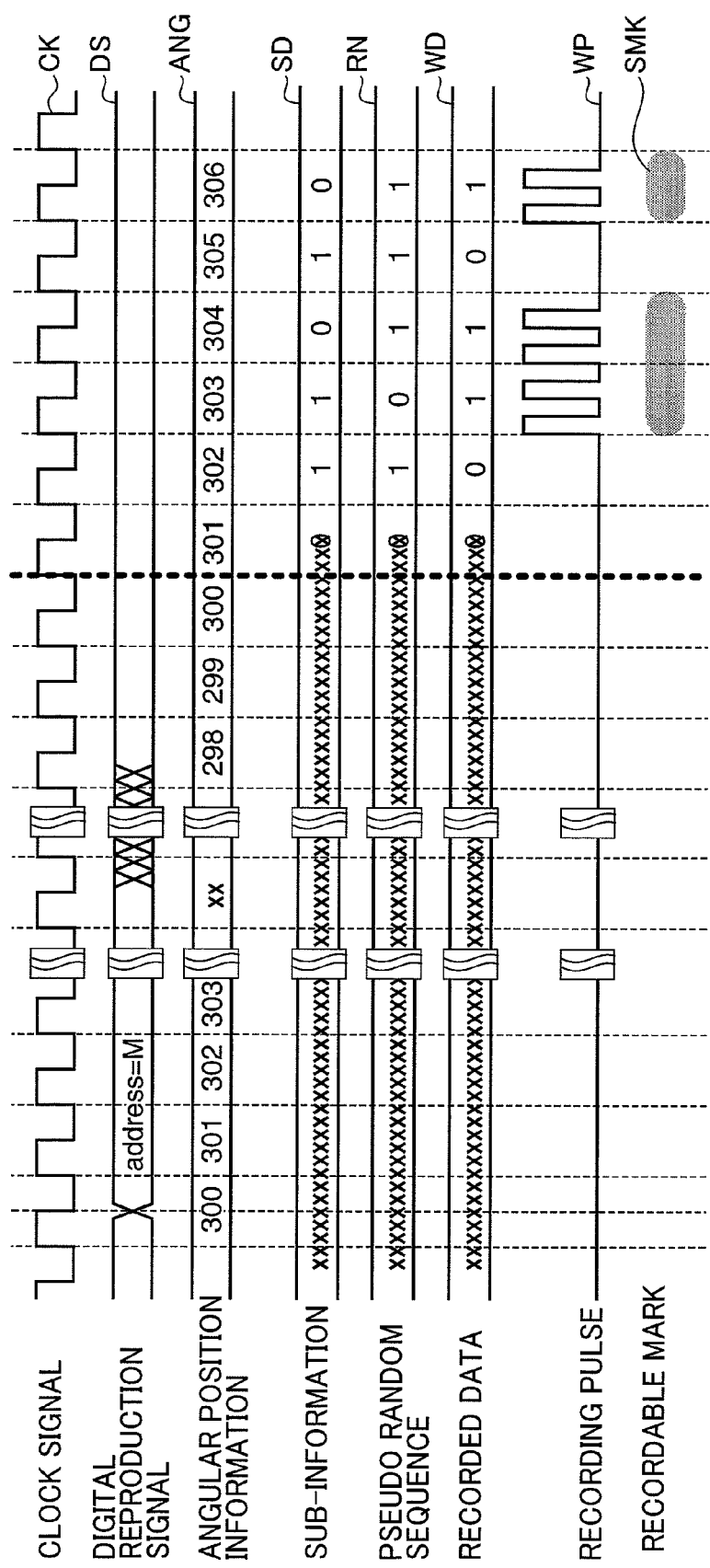
FIG. 21 is a timing chart showing a characteristic operation of the optical disc recording device according to the third embodiment.

FIG. 21 is a timing chart showing a characteristic operation of the optical disc recording device according to the third embodiment. First of all, when an optical disc is loaded into the optical disc recording device 250, the optical disc is rotated by the spindle motor 12 and the optical head 13 is moved to a position having a reference address (M).

Further, the PLL circuit 38 generates a clock signal CK synchronized with a rotation synchronization signal FS in accordance with the rotation synchronization signal FS outputted from the spindle motor 12.

The optical head 13 irradiates the optical disc with laser light having reproduction intensity, extracts a channel signal CS from the reflected light, and outputs it to the analog signal processor 15. The analog signal processor 15 generates an analog reproduction signal AS in accordance with the channel signal CS and outputs it to the digital signal processor 16. The digital signal processor 16 generates a digital reproduction signal DS by quantizing and binarizing the analog reproduction signal AS. The formatter 17 detects synchronization codes assigned at specified time intervals from the digital reproduction signal DS, formats the digital reproduction signal DS by the frame, and divides each frame into address units having address information ADR based on the synchronization pattern of the synchronization codes.

The angle meter 39 is a counter synchronized with the clock signal CK inputted from the PLL circuit 38, and extracts and saves a count value of clocks corresponding to the leading end position of the address unit indicating the reference address if the address information ADR inputted from the formatter 17 is the reference address preset in the system controller 23. In this example, the reference address is "M" and the count value corresponding to the leading end position of the address unit of the reference address is "300".

After the measurement of the count value (angular position) of the reference address position is completed, the rotation of the spindle motor 12 is controlled through the CAV control to move the optical head 13 to the radial position corresponding to the sub-information recording region at the inner circumferential side of the optical disc. Even after the optical head 13 reaches the sub-information recording region, the angle meter 39 similarly counts the clock signal CK synchronized with the rotation synchronization signal FS.

The memory 11 outputs the sub-information saved inside beforehand bit by bit in synchronism with the clock signal CK from the position where the count value is the count value of the reference address saved in the angle meter 39. In other words, the memory 11 outputs the sub-information bit by bit from the same angular position as the reference address.

The random number generator 19 similarly outputs the pseudo random sequence RN bit by bit from the same angular position as the reference address. The EOR 40 calculates an exclusive OR of the sub-information SD from the memory 11 and the pseudo random sequence RN from the random number generator 19 to generate recording data WD scrambled with the sub-information.

The laser intensity modulator 22 generates a recording pulse WP indicating a timing of irradiating recording laser light and a recording power based on the recording data WD inputted from the EOR 40. The optical head 13 irradiates the optical disc with the laser light based on the recording pulse WP to form recordable marks, whose reflectivity was changed, on the disc surface, whereby the sub-information is additionally recorded.

As described above, if the optical disc recording device 250 is used, medium unique information unique to each optical disc can be recorded in the sub-information recording region with the same angular position as the reference address of the concave and convex marks as a starting point after the optical disc is produced even if the optical disc is a read-only optical disc having concave and convex marks transferred thereto.

The reference address position and the starting point of recording the medium unique information are displaced due to a displacement between the recording starting points of an optical disc at a copy source and an optical disc at a copy destination or due to a deviation of linear velocity or rotation speed. If such a displacement occurs, the starting point of reproducing the medium unique information is displaced and correct information cannot be reproduced. Therefore, the reproduction of an illegally duplicated optical disc can be prohibited.

(3-3) Optical Disc Reproduction Device According to Third Embodiment

Figure 22:
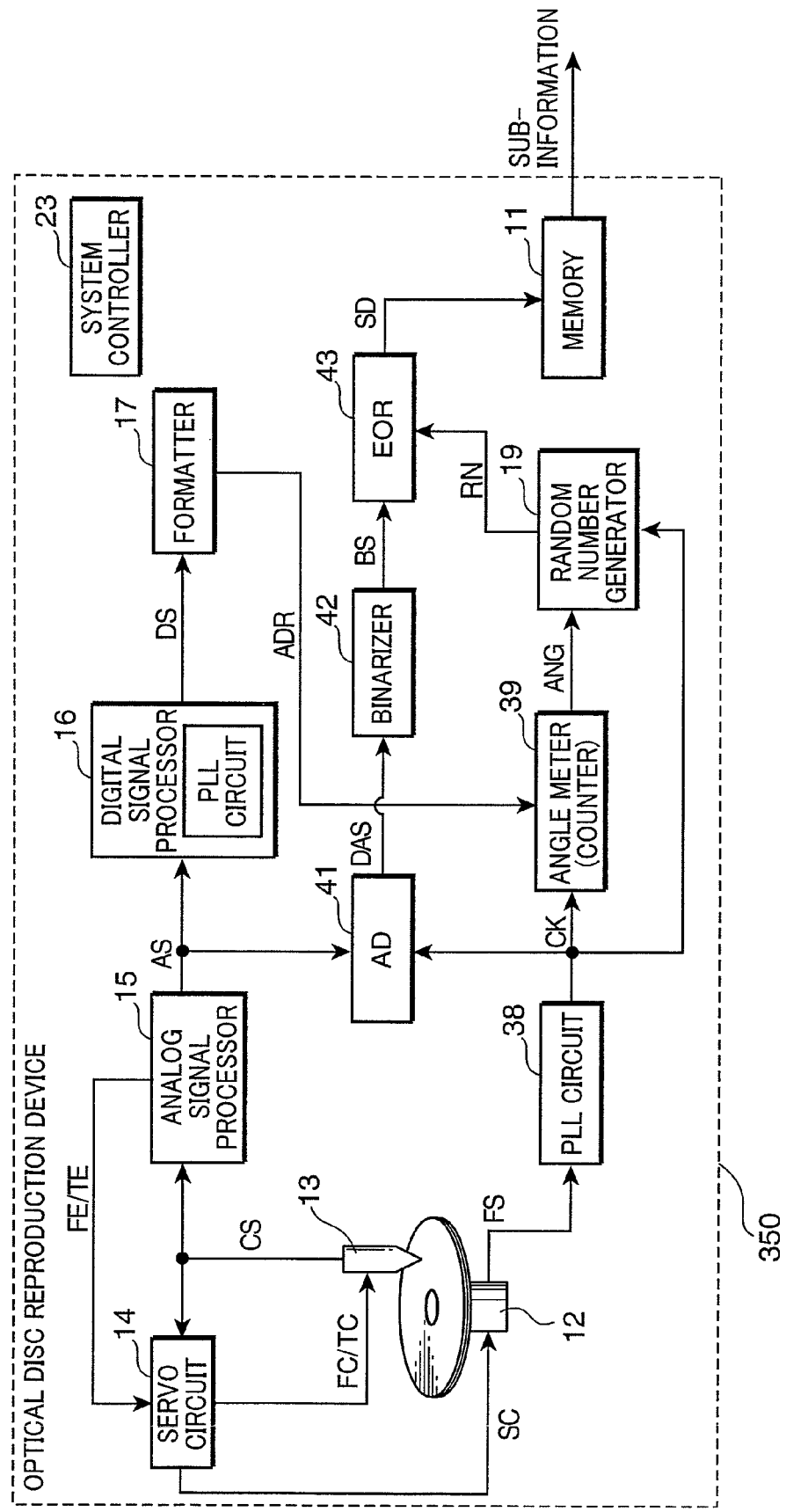
FIG. 22 is a block diagram showing the construction of an optical disc reproduction device according to the third embodiment.

Next, an optical disc reproduction device according to the third embodiment is described. FIG. 22 is a block diagram showing the construction of an optical disc reproduction device 350 according to the third embodiment. The optical disc reproduction device 350 shown in FIG. 22 is provided with a spindle motor 12, an optical head 13, a servo circuit 14, an analog signal processor 15, a digital signal processor 16, a formatter 17, a PLL circuit 38, an angle meter 39, a random number generator 19, an AD 41, a binarizer 42, an EOR 43, a memory 11 and a system controller 23.

The spindle motor 12 rotates an optical disc when the optical disc is loaded into the optical disc reproduction device 350. The optical head 13 irradiates the optical disc with reproduction laser light, generates a channel signal CS from the reflected light and outputs it to the analog signal processor 15.

The analog signal processor 15 generates a focus error signal FE indicating a displacement of a focus position of the laser light and a tracking error signal TE indicating a displacement of a radial position of the laser light with respect to the track position of the concave and convex marks from the channel signal CS inputted from the optical head 13, and outputs them to the servo circuit 14. The analog signal processor 15 also extracts signal components of the channel signal CS corresponding to the concave and convex marks, generates an analog reproduction signal AS by amplifying or equalizing the waveforms of the extracted signal components, and output it to the digital signal processor 16.

The servo circuit 14 generates a focus control signal FC for correcting the displacement of the focus position from the focus error signal FE inputted from the analog signal processor 15 and a tracking control signal TC for correcting the displacement of the tracking position from the tracking error signal TE, and outputs them to the optical head 13. The servo circuit 14 also calculates a linear velocity at the radial position, where the information is being reproduced, in accordance with the channel signal CS, generates a rotation control signal SC for correcting the rotation speed by judging a deviation from the current linear velocity, and outputs it to the spindle motor 12.

The digital signal processor 16 extracts the clock signal CK synchronized with the analog reproduction signal AS inputted from the analog signal processor 15 by a PLL circuit provided inside, generates a digital reproduction signal DS by quantizing and binarizing the inputted analog reproduction signal AS in synchronism with the clock signal CK and outputs it to the formatter 17.

The formatter 17 detects synchronization codes assigned at specified time intervals to the digital reproduction signal DS inputted from the digital signal processor 16, formats the digital reproduction signal DS by the frame, divides each frame into address units including address information by a synchronization pattern of the synchronization codes, extracts address information ADR assigned to each address unit and output it to the angle meter 39.

The PLL circuit 38 is constructed by a general PLL circuit, calculates a phase error between the rotation synchronization signal FS inputted from the spindle motor 12 and the clock signal CK generated inside and controls the frequency of the clock signal CK so that the phase error becomes "0". Accordingly, the PLL circuit 38 generates the clock signal CK synchronized with the rotation synchronization signal FS, and outputs it to the AD 41, the angle meter 39 and the random number generator 19.

The angle meter 39 includes a counter for counting the clock signal CK inputted from the PLL circuit 38, extracts and saves the count value of the counter at the leading end position of the address unit of a reference address when the reference address preset in the system controller 23 and the address information ADR inputted from the formatter 17 are equal. In other words, since the counter counts the clock signal CK synchronized with the rotation synchronization signal FS, it measures the angular position of the optical disc.

To extract the count value at the leading end position of the address unit indicated by the reference address means to extract the angular position at the leading end position of the address unit indicated by the reference address.

After the angular position of the reference address is extracted by the angle meter 39, the system controller 23 controls the spindle motor 12 by a CAV control to make an angular velocity constant, and moves the optical head 13 to a radial position corresponding to the sub-information recording region at the inner circumferential side of the disc.

After the optical head 13 is moved to the sub-information recording region, the PLL circuit 38 generates a clock signal CK synchronized with the rotation synchronization signal FS from the spindle motor 12 and outputs it to the angle meter 39 in a manner similar to the above. The angle meter 39 counts the clock signal CK inputted from the PLL circuit 38 and outputs the count value as angular position information ANG to the random number generator 19.

The random number generator 19 generates a pseudo random sequence RN bit by bit in synchronism with the clock signal CK using the current angular position as a starting point if the count value of the reference address saved in the angle meter 39 and the current count value is equal, i.e. if the angular position at the reference address position and the current angular position are equal, and outputs it to the EOR 40.

The AD 41 is constructed by a general analog-to-digital converter, generates a quantized reproduction signal DAS by sampling and quantizing the analog reproduction signal AS from the analog signal processor 15 in synchronism with the clock signal CK from the PLL circuit 38, and outputs it to the binarizer 42.

The binarizer 42 generates a binary reproduction signal BS by binarizing the quantized reproduction signal DAS inputted from the AD 41 and outputs it to the EOR 43. Since the optical disc reproduction device 350 executes no tracking control to the recordable marks at the time of reproducing the sub-information recording region, the reproduction signal of the sub-information recording region can be divided into reflected light free from the recordable marks and reflected light crossing or scanning the recordable marks. The binarizer 42 outputs a difference between these two reflected lights after binarizing it. Thus, if the quantized reproduction signal DAS is binarized after being averaged in a specified band using a low-pass filter, it can be more efficiently binarized.

The EOR 43 is constructed by a general XOR gate and calculates an exclusive OR of the binary reproduction signal BS from the binarizer 42 and the pseudo random sequence RN from the random number generator 19. Since the random number generator 19 is constructed similar to that of the optical disc recording device 250 according to the third embodiment, the sub-information SD scrambled with the pseudo random sequence RN at the time of recording is descrambled by the EOR 403. Thus, the EOR 43 generates descrambled sub-information SD and outputs it to the memory 11. The memory 11 saves the descrambled sub-information SD bit by bit.

As described above, the optical disc reproduction device 350 extracts the angular position of the leading end position of the address unit indicated by the reference address and reproduces the sub-information from the sub-information recording region of the optical disc using the extracted angular position as a recording starting point. On an illegally duplicated optical disc, a reference address position and a recording starting point of sub-information are displaced due to a displacement of the recording starting point or a deviation of linear velocity or rotation speed. Thus, it is impossible to reproduce the sub-information at the correct starting point and correct sub-information cannot be reproduced from the illegally duplicated optical disc.

The optical disc reproduction device 350 stops the reproduction operation upon judging that no correct sub-information is being reproduced. A method for judging as to the correct sub-information is such that the sub-information is recorded as an error correction code at the time of recording, an error correction is performed after the reproduction of the sub-information, and the reproduction operation is stopped assuming that no correct sub-information can be reproduced when correction impossibility or an error is detected. Alternatively, an alteration preventing code such as a MAC is assigned at the time of recording the sub-information, the MAC is calculated from the sub-information detected at the time of reproduction, it is confirmed whether or not the calculated MAC and the MAC assigned to the sub-information match, and the reproduction operation is stopped assuming that no correct sub-information is recorded unless the two MACs match.

In this embodiment, the PLL circuit 38 corresponds to an example of a clock generator, the angle meter 39 to an example of a reference angle extracting unit, the random number generator 19, the AD 41, the binarizer 42, the EOR 43 and the memory 11 to an example of a sub-information reproducing unit.

Figure 23:
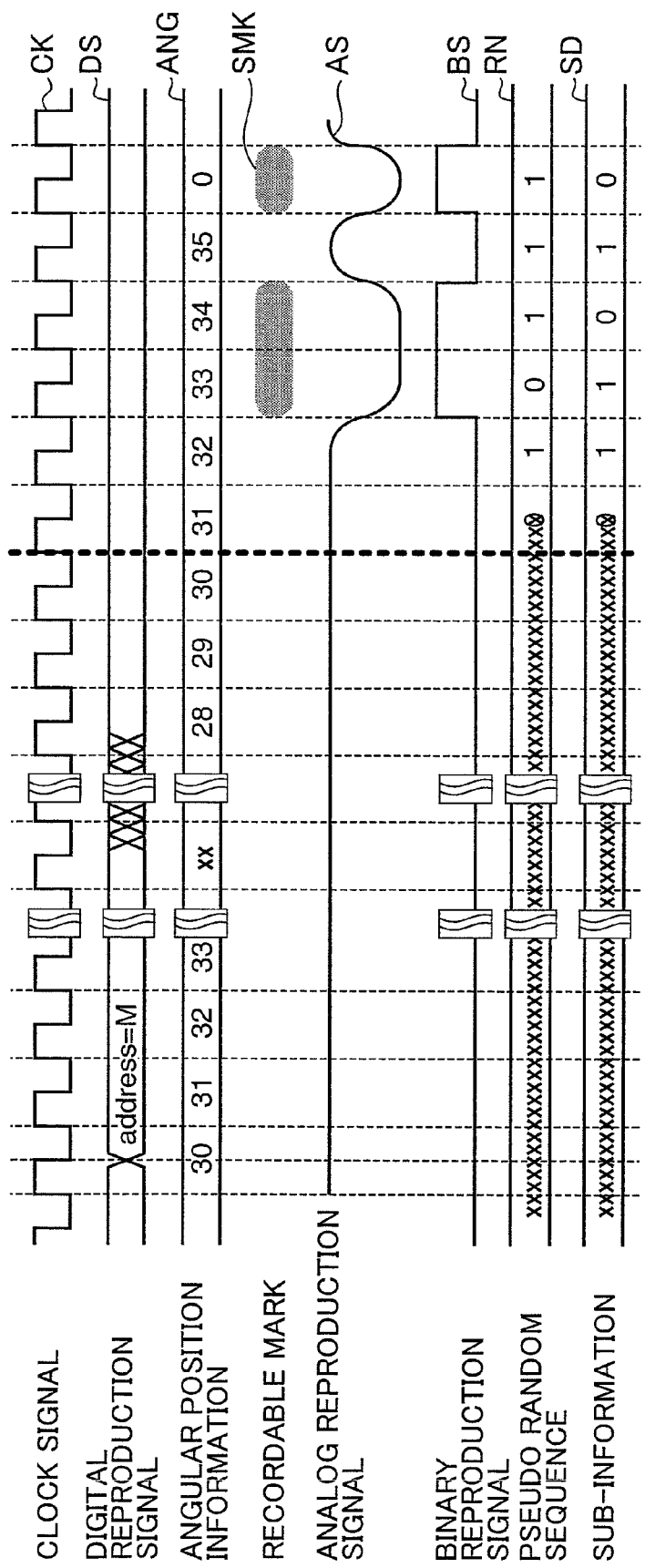
FIG. 23 is a timing chart showing a characteristic operation of the optical disc reproduction device according to the third embodiment.

FIG. 23 is a timing chart showing a characteristic operation of the optical disc reproduction device according to the third embodiment. The PLL circuit 38 generates a clock signal CK synchronized with a rotation synchronization signal FS from the spindle motor 12.

The optical head 13 irradiates the optical disc with reproduction laser light, generates a channel signal CS from the reflected light and outputs it to the analog signal processor 15. The analog signal processor 15 generates an analog reproduction signal AS in accordance with the channel signal CS and outputs it to the digital signal processor 16. The PLL circuit of the digital signal processor 16 extracts the clock signal CK synchronized with the analog reproduction signal AS and generates a digital reproduction signal DS by quantizing and binarizing the analog reproduction signal AS.

The formatter 17 detects synchronization codes assigned at specified time intervals from the digital reproduction signal DS inputted from the digital signal processor 16, formats the digital reproduction signal DS by the frame, and divides each frame into address units including address information ADR in accordance with the synchronization pattern of the synchronization codes.

The angle meter 39 counts the clock signal CK synchronized with the rotation of the optical disc from the PLL circuit 38 and measures the rotational position (angular position) of the optical disc. The angle meter 39 also saves the count value at the leading end position of the address unit indicated by the reference address preset in the system controller 23, i.e. the angular position of the reference address. In this example, the reference address is "M" and the angular position of the reference address is "300".

After the measurement of the angular position of the reference address is completed, the rotation of the spindle motor 12 is controlled through the CAV control to make the angular velocity constant, and moves the optical head 13 to a radial position corresponding to the sub-information recording region at the inner circumferential side of the optical disc.

Since no tracking control is executed to the recordable marks SMK in the sub-information recording region, the optical disc is irradiated with the laser light having reproduction intensity and the analog reproduction signal AS is generated from the reflected light. Further, the analog reproduction signal AS is binarized by the binarizer 42 and divided into areas where the recordable marks SMK are absent and areas where the recordable marks SMK are present.

Similarly in the reproduction of the sub-information recording region, the PLL circuit 38 generates a clock signal CK synchronized with the rotation of the optical disc, and the angle meter 39 counts the clock signal CK to calculate the angular position of the optical disc.

The random number generator 19 generates the pseudo random sequence RN bit by bit in synchronism with the clock signal CK from the same angular position as the reference address based on the count value of the angle meter 39. The EOR 43 reproduces the sub-information SD by descrambling the binary reproduction signal BS to be reproduced by the pseudo random sequence RN generated by the random number generator 19.

As described above, the optical disc reproduction device 350 extracts the angular position of the leading end position of the address unit indicated by the reference address position beforehand, and reproduces the sub-information from the sub-information recording region of the optical disc using the extracted angular position as a starting point. On an illegally duplicated optical disc, a reference address position and a recording starting point of sub-information are displaced due to a displacement of the recording starting point or a deviation of linear velocity or rotation speed. Thus, it is impossible to reproduce the sub-information at the correct starting point and correct sub-information cannot be reproduced from the illegally duplicated optical disc.

The optical disc reproduction device 350 stops the reproduction operation upon judging that no correct sub-information is being reproduced. A method for judging as to the correct sub-information is such that the sub-information is recorded as an error correction code at the time of recording, an error correction is performed after the reproduction of the sub-information, and the reproduction operation is stopped assuming that no correct sub-information can be reproduced when correction impossibility or an error is detected. Alternatively, an alteration preventing code such as a MAC is assigned at the time of recording the sub-information, the MAC is calculated from the sub-information detected at the time of reproduction, it is confirmed whether or not the calculated MAC and the MAC assigned to the sub-information match, and the reproduction operation is stopped assuming that no correct sub-information is recorded unless the two MACs match.

According to the optical disc, the optical disc recording device and the optical disc reproduction device of this embodiment, the angular position of the reference address out of the addresses indicated by the transferred concave and convex marks is reproduced and the sub-information is recorded in the sub-information recording region using the angular position of the reference address as the starting point.

Similarly, the angular position of the reference address similar to the one at the time of recording and indicated by the transferred concave and convex marks can be calculated and the sub-information can be reproduced from the sub-information recording region using the angular position of the reference address as a starting point.

Specifically, whether or not the angular position of the reference address of the concave and convex marks at the time of recording and the one at the time of reproduction match can be judged by the reproduction operation of the sub-information. Normally, if an optical disc is illegally duplicated, the angular position of the reference address and that of the sub-information recorded position are displaced due to a displacement of the recorded position or an error of linear velocity or rotation speed. If these relationships deviate, it is impossible to reproduce the sub-information since a correct timing of reproducing the sub-information cannot be generated. Therefore, the reproduction of an illegal optical disc can be prohibited.

A recordable mark non-recording region where no recordable mark SMK is to be recorded may be set on the optical disc according to the third embodiment based on the count value of the angle meter 39 upon recording the sub-information in the sub-information recording region. By doing so, a so-called mirror region where neither the recordable marks SMK nor the concave and convex marks MK are recorded is formed as a fan-shaped region in a part of the sub-information recording region. This mirror region is desirably wider than a tracking servo pursuit zone where tracking is performed. By doing so, even if it is tried to duplicate the recordable marks SMK by performing a tracking control to the recordable marks SMK, it is impossible to perform the tracking control in the recordable mark non-recording region and, hence, duplicate the recordable marks SMK.

Although the reference address for extracting the angular position is the fixed value preset in the system controller 23 in the third embodiment, it is not limited to this. For example, an arbitrary address is selected at the time of recording and is recorded as the reference address instead of the medium ID described in the first embodiment. Since the sub-information is recorded based on the address position different for each optical disc in this way, the illegal analysis of the optical disc can be prevented. In this case, the address is desirably recorded while having an alteration preventing code assigned thereto or being encrypted. In this way, it is virtually impossible for a pirate marker having no legal encryption key to record the address information.

Since no tracking control is performed to the recordable marks SMK in the reproduction from the sub-information recording region, the sub-information is desirably recorded in a range of a plurality of tracks in the radial direction of the optical disc.

Of course, the sub-information may be read by performing tracking to the recordable marks SMK. In this case, the recordable marks SMK are reproduced by providing no recordable mark non-recording region at all or by performing no tracking control in the recordable mark non-recording region. The recordable mark non-recording region may be recorded by irradiating the laser light to the reflective film on the tracks of the concave and convex marks MK to change the reflectivity like the medium ID of the first embodiment. In this case, it is possible to set the recordable mark non-recording region unique to each medium.

In the third embodiment, 360 counts are made per one rotation by the angle meter 39. The sub-information is extracted by judging whether or not the recordable mark is present in each of 360 blocks obtained by dividing the optical disc in the circumferential direction. Thus, by forming recordable marks SMK or scratch blocks through the removal of the reflective film in arbitrary ones of these blocks, the medium ID of the first embodiment may, for example, be recorded depending on in which blocks the recordable mark SMK or the scratch block is present.

Although the sub-information is reproduced by one rotation of the sub-information recording region in the third embodiment, the reproduction mode is not limited to this. Normally, if the recordable marks SMK are reproduced without any tracking control, there is a possibility of reproducing mirror regions between the recordable marks in a partial region. Thus, the correct sub-information cannot be reproduced at this time. Accordingly, the stable sub-information can be reproduced if the reproduced binary reproduction signals BS are integrated and extracted in synchronism with a one-rotation timing while a movement is made toward the inner or outer circumferential side in the radial direction during one rotation.

Further, if the sub-information recording region is divided into a plurality of areas according to the radial positions and different reference addresses or different random sequences are set for the respective areas, security strength can be improved.

Similarly, if different pieces of information are recorded in a plurality of areas according to the radial positions, the recording capacity of the sub-information can be increased.

Although no concave and convex marks MK are formed in the sub-information recording region in the third embodiment, the present invention is not limited to this. Even if the recordable marks SMK are recorded on the concave and convex marks MK, the recording band of the concave and convex marks MK is sufficiently higher than the recordable mark band. Thus, the concave and convex marks MK and the recordable marks SMK can be easily separated, wherefore the recordable marks SMK can be stably reproduced.

(4) Other Embodiments

Here, another recording mode of the recordable marks is described although it is not described in the first and second embodiments. The medium ID is recorded by the recordable marks in the first embodiment, and the physical position information is recorded by the recordable marks in the second embodiment. FIG. 24 are diagrams showing recording modes of recordable marks according to other embodiments.

In the first and second embodiments, the shape and formation positions of the recordable marks can be variously changed. FIG. 24A is a diagram showing recordable marks intermittently formed between tracks, FIG. 24B is a diagram showing a recordable mark formed in a meandering manner on concave and convex marks, FIG. 24C is a diagram showing recordable marks having a short interval in a circumferential direction and intermittently formed, FIG. 24D is a diagram showing a recordable mark longer than the length of the concave and convex marks in a radial direction and continuously formed, and FIG. 24E is a diagram showing recordable marks longer than the length of the concave and convex marks in the radial direction and intermittently formed.

In FIG. 24A, the recordable marks SMK are intermittently formed between the tracks of the concave and convex marks MK in a band lower than the longest one of the concave and convex marks in the circumferential direction. Although one recordable mark SMK is recorded in the band lower than the longest one of the concave and convex marks in the circumferential direction in the first embodiment, the influence on the reproduction accuracy of the concave and convex marks MK can be further reduced if recordable marks are intermittently formed. A position between the tracks does not necessarily means the center between the tracks of the concave and convex marks. Upon performing tracking between the tracks of the concave and convex marks MK, the recordable marks MK are formed at positions displaced from the central position between the tracks by offsetting the track position beforehand. Thus, the detection accuracy of the recordable marks SMK can be improved since the recordable marks SMK are detected by performing tracking to the tracks of the concave and convex marks MK at the time of reproduction.

In FIG. 24B, the recordable mark SMK is formed on the concave and convex marks MK in a meandering manner.

Although the recordable mark SMK is formed straight in the circumferential direction in the first embodiment, the present invention is not particularly limited to this and the recordable mark SMK may be formed in a meandering manner in the circumferential direction.

In FIG. 24C, the recordable marks SMK are formed to have nonuniform width in the radial direction. Such recordable marks SMK are formed by increasing or decreasing the laser intensity upon being recorded to record a plurality of recording pulses (multipulse) and to narrow the multipulse width of each pulse, i.e. to shorten the irradiation time of the laser light having recording intensity. The recordable marks SMK are intermittent, but close to each other in the circumferential direction, wherefore the recordable marks SMK are connected.

In FIG. 24D, the recordable mark SMK is formed longer than the concave and convex marks MK in the radial direction. Depending on the characteristic of the recordable mark SMK, cases are known where the modulation factor of the concave and convex marks MK is higher at the time of reproduction even if the recordable mark SMK thicker than the concave and convex marks MK in the radial direction is formed at the time of recording. Thus, in such cases, the recordable mark SMK thicker than the concave and convex marks MK in the radial direction may be formed.

In FIG. 24E, the recordable marks SMK are intermittently formed to be longer than the concave and convex marks in the radial direction similar to FIG. 24D. In this case, the influence on the reproduction accuracy of the concave and convex marks MK can be reduced since the recordable marks SMK are intermittently formed.

Any mode shown in FIGS. 24A to 24E lies in the scope of the present invention and obtains the same effects as those in the respective embodiments. The present invention is not limited to such shapes. All the inventions of recording the recordable marks by changing the reflectivity of the disc after the production of the disc by recording the concave and convex marks lie in the scope of the present invention.

Although the medium ID is recorded by the recordable marks in the first embodiment and the physical position information is recorded by the recordable marks in the second embodiment, the present invention is not limited to this. For example, any information on digital copyrighted works to be recorded such as information on decryption including key information for decrypting encrypted contents recorded in the user region, certificate data indicating that the optical disc is legitimate, information on the number of times, time and period the content is moved or permitted to duplicate and information indicating an illegal disc can be recorded.

The above specific embodiments mainly embrace inventions having the following constructions.

An optical disc according to one aspect of the present invention is an optical disc in which a reflective film is formed on concave and convex marks after the concave and convex marks synchronized with the integral multiple of a channel bit length are formed in accordance with modulated main information and which is characterized in that, after the optical disc is produced, continuous or intermittent laser light synchronized with the integral multiple of the channel bit length is irradiated at intervals longer than the longest one of the concave and convex marks in accordance with a spiral track formed in the circumferential direction of the concave and convex marks to change an optical characteristic of the reflective film, thereby forming a recordable mark to record sub-information necessary to reproduce the main information in a superimposition manner.

According to this construction, after the reflective film is formed on the concave and convex marks of the optical disc, the continuous or intermittent laser light synchronized with the integral multiple of the channel bit length is irradiated at intervals longer than the longest one of the concave and convex marks in accordance with the spiral track formed in the circumferential direction of the concave and convex marks. Thus, the recordable mark is formed by changing the optical characteristic of the reflective film, and the sub-information necessary to reproduce the main information is recorded in a superimposition manner.

Thus, the sub-information necessary to reproduce the main information can be recorded in a superimposition manner without deteriorating the reading accuracy of the main information, so that the illegal duplication of the optical disc can be prevented.

In the above optical disc, the width of the recordable mark in a radial direction is preferably narrower than that of the concave and convex marks in the radial direction. According to this construction, since the width of the recordable mark in the radial direction is narrower than that of the concave and convex marks in the radial direction, the fluctuation of the reflected light level caused by forming the recordable mark at the time of reproduction can be made smaller than the modulation factor of the concave and convex marks and the deterioration in the reproduction accuracy of the concave and convex marks can be reduced.

In the optical disc, the recordable mark is preferably formed on the spiral track formed in the circumferential direction of the concave and convex marks. According to this construction, the recordable mark can be formed on the spiral track formed in the circumferential direction of the concave and convex marks.

In the above optical disc, the recordable mark is preferably formed between track parts of the spiral track formed in the circumferential direction of the concave and convex marks. According to this construction, the recordable mark can be formed between the track parts of the spiral track formed in the circumferential direction of the concave and convex marks. Since the recordable mark is formed between the track parts adjacent in the radial direction, the recordable mark can be formed without influencing the reproduction accuracy of the concave and convex marks. Since the recordable mark is formed by changing the reflectivity between the track parts of the concave and convex marks, there is no influence on the reproduction of the concave and convex marks as the main information and, in addition, the track pitches of the concave and convex marks are the same regardless of the presence or absence of the recordable mark. Therefore, there is no likelihood of reducing the disc capacity.

In the above optical disc, the recordable mark is preferably formed at an intermediate position between a first track having the concave and convex marks and a second track adjacent to the first track. According to this construction, since the recordable mark is formed at the intermediate position between the first track having the concave and convex marks and the second track adjacent to the first track, the recordable mark can be formed without influencing the reproduction accuracy of the concave and convex marks. It should be noted that the intermediate position means not only a central part between the first and second tracks, but also a substantially central part between the first and second tracks.

In the above optical disc, the recordable mark is preferably formed closer to the first track than the intermediate position between the first track having the concave and convex marks and the second track adjacent to the first track. According to this construction, the recordable mark can be formed closer to the first track than the intermediate position between the first track having the concave and convex marks and the second track adjacent to the first track.

In the above optical disc, 1 bit of the sub-information is preferably recorded with a plurality of recordable marks. According to this construction, 1 bit of the sub-information can be recorded with the plurality of recordable marks.

In the above optical disc, 1 bit of the sub-information is preferably recorded as a set of recordable marks intermittently formed. According to this construction, 1 bit of the sub-information can be recorded as a set of the intermittently formed recordable marks.

In the above optical disc, the length of the recordable mark in the circumferential direction is preferably equal to or shorter than a shortest mark length of the concave and convex marks in the circumferential direction. According to this construction, the recordable mark can be formed without deteriorating the reproduction accuracy of the concave and convex marks since the length of the recordable mark in the circumferential direction is equal to or shorter than the shortest mark length of the concave and convex marks in the circumferential direction.

In the above optical disc, the length of the recordable mark in the circumferential direction is preferably equal to or shorter than the channel bit length. According to this construction, the recordable mark can be formed without deteriorating the reproduction accuracy of the concave and convex marks since the length of the recordable mark in the circumferential direction is equal to or shorter than the channel bit length.

In the above optical disc, a modulation factor of the recordable mark as a fluctuation of the reflected light level caused by forming the recordable mark is preferably smaller than a modulation factor of the concave and convex marks as a difference between the reflected light level of the concave and convex marks and that of the reflective film other than the concave and convex marks.

According to this construction, the modulation factor of the recordable mark as the fluctuation of the reflected light level caused by forming the recordable mark is smaller than that of the concave and convex marks as the difference between the reflected light level of the concave and convex marks and that of the reflective film other than the concave and convex marks. Thus, the concave and convex marks can be reproduced while the influence by the recordable mark is suppressed.

In the above optical disc, the modulation factor of the recordable mark is preferably averagely smaller than half that of the concave and convex marks. According to this construction, since the modulation factor of the recordable mark is averagely smaller than half that of the concave and convex marks, there is no likelihood of erroneously reproducing an edge position of a reproduction signal of the concave and convex marks. Thus, the recordable mark can be formed without influencing reproduction accuracy of the concave and convex marks.

In the above optical disc, the recordable mark is preferably formed by increasing the reflectivity of the reflective film in a part irradiated with the laser light. According to this construction, the recordable mark is formed by increasing the reflectivity of the reflective film in the part irradiated with the laser light. Since the reflectivity of a metal film of a read-only optical disc normally decreases upon the irradiation of the laser light, the sub-information cannot be recorded unless the reflectivity of the reflective film in the part irradiated with the laser light is increased in the optical disc. Therefore, the illegal duplication of the optical disc can be prevented.

In the above optical disc, the sub-information is recorded while being frequency diffused by a pseudo random sequence. According to this construction, since the sub-information is recorded while being frequency diffused by the pseudo random sequence, it is difficult to distinguish from noise components even if it is tried to apply frequency analysis to the fluctuation of the reflectivity. Therefore, it can be prevented to illegally duplicate an optical disc by analyzing the sub-information.

In the above optical disc, the sub-information is preferably recorded by applying a PE modulation. According to this construction, since the sub-information is recorded by applying the PE modulation, an occurrence probability is substantially equal in a part where the reflectivity is changed and in a part where the reflectivity is not changed. It can be avoided to apply direct-current components to a tracking signal and a reproduction signal at the time of reproduction.

In the above optical disc, it is preferable that the recordable mark is formed in a direction orthogonal to the track on the concave and convex marks, and that the sub-information includes physical position information indicating a physical position of a region, where the recordable mark is formed, on the optical disc.

According to this construction, the recordable mark is formed in the direction orthogonal to the track on the concave and convex marks, and the sub-information includes the physical position information indicating the physical position of the region, where the recordable mark is formed, on the optical disc. Thus, at the time of reproduction, whether or not the optical disc is an illegally duplicated optical disc can be judged by detecting a physical position of the recordable mark formed in the direction orthogonal to the track on the concave and convex marks and comparing the detected position with the physical position information recorded beforehand, whereby the reproduction of the illegally duplicated optical disc can be prohibited.

An optical disc manufacturing method according to another aspect of the present invention comprises a mastering step of producing an optical disc master formed with concave and convex marks synchronized with the integral multiple of a channel bit length in accordance with modulated main information; a stamping step of transferring the concave and convex marks of the optical disc master to an optical disc substrate; a sputtering step of forming a reflective film on the optical disc substrate; and a sub-information recording step of irradiating continuous or intermittent laser light synchronized with the integral multiple of the channel bit length at intervals longer than the longest one of the concave and convex marks in accordance with a spiral track formed in a circumferential direction of the concave and convex marks to change an optical characteristic of the reflective film after the reflective film is formed on the concave and convex marks of the optical disc in the sputtering step, thereby forming a recordable mark to record sub-information necessary to reproduce the main information in a superimposition manner.

According to this construction, in the mastering step, the optical disc master formed with the concave and convex marks synchronized with the integral multiple of the channel bit length is produced in accordance with the modulated main information. The concave and convex marks of the optical disc master are transferred to the optical disc substrate in the stamping step, and the reflective film is formed on the optical disc substrate in the sputtering step. After the reflective film is formed on the concave and convex marks of the optical disc in the sputtering step, the continuous or intermittent laser light synchronized with the integral multiple of the channel bit length is irradiated at the interval longer than the longest one of the concave and convex marks in accordance with the spiral track formed in the circumferential direction of the concave and convex marks in the sub-information recording step, whereby the optical characteristic of the reflective film is changed to form the recordable mark and the sub-information necessary to reproduce the main information is recorded in a superimposition manner.

Accordingly, the sub-information necessary to reproduce the main information can be recorded without deteriorating the reading accuracy of the main information, so that the illegal duplication of the optical disc can be prevented.

An optical disc recording device according to still another aspect of the present invention is an optical disc recording device for recording sub-information necessary to reproduce main information on an optical disc prerecorded with the main information by concave and convex marks in a superimposition manner, comprising a tracking unit for controlling a position to be irradiated with laser light in accordance with a spiral track formed in a circumferential direction of the concave and convex marks; a reproduction signal extracting unit for extracting a reproduction signal from the reflected light of reproduction laser light irradiated to the concave and convex marks; a clock extracting unit for extracting a channel clock synchronized with a channel bit length of the concave and convex marks; and a sub-information recording unit for irradiating recording laser light synchronized with a band which is the integral multiple of the channel clock and lower than the band of the reproduction signal to change an optical characteristic of a reflective film formed on a recording surface of the optical disc, thereby forming a recordable mark to record the sub-information on the optical disc in a superimposition manner.

According to this construction, the position to be irradiated with the laser light in accordance with the spiral track formed in the circumferential direction of the concave and convex marks prerecorded with the main information is controlled by the tracking unit. The reproduction signal is extracted from the reflected light of the reproduction laser light irradiated to the concave and convex marks by the reproduction signal extracting unit, and the channel clock synchronized with the channel bit length of the concave and convex marks is extracted by the clock extracting unit. Subsequently, the recording laser light synchronized with the band which is the integral multiple of the channel clock and lower than the band of the reproduction signal is irradiated and the optical characteristic of the reflective film formed on the recording surface of the optical disc is changed to form the recordable mark by the sub-information recording unit, whereby the sub-information necessary to reproduce the main information is recorded on the optical disc in a superimposition manner.

Accordingly, the sub-information necessary to reproduce the main information can be recorded without deteriorating the reading accuracy of the main information, so that the illegal duplication of the optical disc can be prevented.

An optical disc reproduction device according to further another aspect of the present invention is an optical disc reproduction device for reproducing main information from concave and convex marks of an optical disc and reproducing sub-information necessary to reproduce the main information from a recordable mark formed by changing an optical characteristic of a reflective film of the optical disc through the irradiation of laser light, comprising a tracking unit for controlling a position to be irradiated with the laser light in accordance with a spiral track formed in a circumferential direction of the concave and convex marks; a reproduction signal extracting unit for extracting a reproduction signal from the reflected light of reproduction laser light irradiated to the concave and convex marks; a clock extracting unit for extracting a channel clock synchronized with a channel bit length from the reproduction signal; a separating unit for separating a concave and convex mark reproduction signal corresponding to the concave and convex marks and a recordable mark reproduction signal corresponding to the recordable mark from the reproduction signal; and a sub-information reproducing unit for reproducing the sub-information from the recordable mark reproduction signal synchronized with a band which is the integral multiple of the channel clock and lower than the band of the concave and convex mark reproduction signal.

According to this construction, the position to be irradiated with the laser light in accordance with the spiral track formed in the circumferential direction of the concave and convex marks pre-recorded with the main information is controlled by the tracking unit. The reproduction signal is extracted from the reflected light of the reproduction laser light irradiated to the concave and convex marks the reproduction signal extracting unit, and the channel clock synchronized with the channel bit length is extracted from the reproduction signal by the clock extracting unit. Subsequently, the concave and convex mark reproduction signal corresponding to the concave and convex marks and the recordable mark reproduction signal corresponding to the recordable mark are separated from the reproduction signal by the separating unit, and the sub-information necessary to reproduce the main information is reproduced from the recordable mark reproduction signal synchronized with the band which is the integral multiple of the channel clock and lower than the band of the concave and convex mark reproduction signal by the sub-information reproducing unit.

Accordingly, the sub-information necessary to reproduce the main information can be reproduced without deteriorating the reading accuracy of the main information, so that the illegal duplication of the optical disc can be prevented.

In the above optical disc reproduction device, it is preferable that a synchronization code detector for detecting synchronization codes assigned at specified intervals from the reproduction signal is further provided; and that the sub-information reproducing unit reproduces the sub-information in synchronism with detection timings of the synchronization codes by the synchronization code detector.

According to this construction, the synchronization codes assigned at the specified intervals are detected from the reproduction signal by the synchronization code detector, and the sub-information is reproduced in synchronism with the detection timings of the synchronization codes by the synchronization code detector by the sub-information reproducing unit. Since the synchronization codes are assigned to the reproduction signal at the specified intervals beforehand and the sub-information is reproduced in synchronism with the detection timings of these synchronization codes, the sub-information can be easily reproduced.

In the above optical disc reproduction device, the sub-information reproducing unit preferably includes a correlation sequence generator for generating a correlation sequence, a correlation detector for detecting a correlation value of the correlation sequence generated by the correlation sequence generator and the recordable mark reproduction signal, and a reproducer for reproducing the sub-information based on the correlation value detected by the correlation detector.

According to this construction, the correlation sequence is generated by the correlation sequence generator, the correlation value of the correlation sequence generated by the correlation sequence generator and the recordable mark reproduction signal is detected by the correlation detector and the sub-information is reproduced based on the correlation value detected by the correlation detector by the reproducer. Thus, the sub-information can be reproduced based on the correlation value of the generated correlation sequence and the recordable mark reproduction signal.

In the above optical disc reproduction device, it is preferable that a synchronization code detector for detecting synchronization codes assigned at specified intervals from the reproduction signal is further provided; and that the correlation sequence generator generates the correlation sequence in synchronism with detection timings of the synchronization codes detected by the synchronization code detector.

According to this construction, the synchronization codes assigned at the specified intervals are detected from the reproduction signal by the synchronization code detector and the correlation sequence is generated in synchronism with the detection timings of the synchronization codes detected by the synchronization code detector by the correlation sequence generator. Since the synchronization codes are assigned to the reproduction signal at the specified intervals beforehand and the correlation sequence is generated in synchronism with the detection timings of these synchronization codes, the sub-information can be reproduced based on the correlation value of the correlation sequence generated in synchronism with the detection timings of the synchronization codes and the recordable mark reproduction signal.

In the above optical disc reproduction device, the separating unit preferably includes a band-limiting filter for extracting signal components in a band lower than a band corresponding to the concave and convex marks as the recordable mark reproduction signal from the reproduction signal.

According to this construction, the signal components in the band lower than the band corresponding to the concave and convex marks are extracted as the recordable mark reproduction signal from the reproduction signal by the band-limiting filter. Thus, the concave and convex mark reproduction signal and the recordable mark reproduction signal can be separated by the band-limiting filter, wherefore accuracies in reproducing the both reproduction signals can be ensured.

In the above optical disc reproduction device, it is preferable that the recordable mark is formed in a direction orthogonal to the track on the concave and convex marks; the sub-information includes physical position information indicating a physical position of a region, where the recordable mark is formed, on the optical disc; and that the optical disc reproduction device further comprises a position confirming unit for confirming the physical position information of the recordable mark formed orthogonally to the track with respect to a concave and convex mark position, a comparing unit for comparing the physical position information included in the sub-information reproduced by the sub-information reproducing unit and the physical position information confirmed by the position confirming unit and a reproduction limiting unit for limiting the reproduction of the main information if the pieces of physical position information do not match as a result of the comparison by the comparing unit.

According to this construction, the recordable mark is formed in the direction orthogonal to the track on the concave and convex marks, and the sub-information includes the physical position information indicating the physical position of the region, where the recordable mark is formed, on the optical disc. The physical position information of the recordable mark formed orthogonally to the track with respect to the concave and convex mark position is confirmed by the position confirming unit, and the physical position information included in the sub-information reproduced by the sub-information reproducing unit and the physical position information confirmed by the position confirming unit are compared by the comparing unit. Thereafter, if the pieces of physical position information do not match as a result of comparison by the comparing unit, the reproduction of the main information is limited by the reproduction limiting unit.

Accordingly, in the case of an illegally duplicated disc, there is no correlation between the physical position information at the time of recording and the physical position information at the time of reproduction and these pieces of physical position information do not match. Thus, the reproduction of the main information is limited and the reproduction of information from the illegally duplicated optical disc can be prevented.

An optical disc according to another aspect of the present invention is an optical disc including a main information recording region where main information is recorded by concave and convex marks and a sub-information recording region where sub-information necessary to reproduce the main information is recorded by a recordable mark formed by irradiating laser light after the concave and convex marks are formed, wherein the recordable mark is formed in the sub-information recording region by irradiating the laser light from a recording starting point based on an angular position of a reference position in the main information recording region to change the reflectivity of a reflective film, whereby the sub-information is recorded in a superimposition manner.

According to this construction, the optical disc includes the main information recording region where the main information is recorded by the concave and convex marks and the sub-information recording region where the sub-information necessary to reproduce the main information is recorded by the recordable mark formed by irradiating the laser light after the concave and convex marks are formed. The recordable mark is formed in the sub-information recording region by irradiating the laser light from the recording starting point based on the angular position of the reference position in the main information recording region to change the reflectivity of the reflective film, whereby the sub-information is recorded in a superimposition manner.

Accordingly, there is a displacement between a reference position and a recording starting point for sub-information due to a displacement of the recording starting point or a deviation of linear velocity or rotation speed on an illegally duplicated optical disc, wherefore the sub-information cannot be reproduced from a correct recording starting point. Hence, the correct sub-information cannot be reproduced from the illegally duplicated optical disc and the reproduction of the main information from the illegally duplicated optical disc can be prevented.

In the above optical disc, the sub-information recording region preferably includes a recordable mark non-recording region, where the recordable mark is not formed, in a specified angle range of the sub-information recording region. According to this construction, since the sub-information recording region includes the recordable mark non-recording region, where the recordable mark is not formed, in the specified angle range, a tracking control is impossible in the recordable mark non-recording region even if it is tried to duplicate the recordable mark by executing the tracking control to the recordable mark. Thus, it is impossible to duplicate the recordable mark and the illegal duplication of the optical disc can be prevented.

In the above optical disc, information specifying the reference position is preferably recorded by irradiating laser light onto the spiral track in the circumferential direction of the concave and convex marks to change the reflectivity of the reflective film.

According to this construction, since the information specifying the reference position is preferably recorded by irradiating the laser light onto the spiral track in the circumferential direction of the concave and convex marks to change the reflectivity of the reflective film, an arbitrary reference position is, for example, selected at the time of recording and the selected reference position is recorded by changing the reflectivity of the reflective film. Thus, a different reference position is recorded for each optical disc, wherefore the illegal analysis of the optical disc can be prevented.

An optical disc recording device according to another aspect of the present invention is an optical disc recording device for recording main information and sub-information on an optical disc including a main information recording region where main information is recorded by concave and convex marks and a sub-information recording region where sub-information necessary to reproduce the main information is recorded by a recordable mark formed by irradiating laser light after the concave and convex marks are formed, the optical disc recording device comprising a clock generator for generating a clock signal synchronized with the rotation of the optical disc; a reference angle extracting unit for extracting an angular position of a reference position in the main information recording region; and a sub-information recording unit for irradiating laser light synchronized with the clock signal generated by the clock generator from a recording starting point in the sub-information recording region specified based on the angular position extracted by the reference angle extracting unit to record the sub-information in a superimposition manner.

According to this construction, the optical disc includes the main information recording region where the main information is recorded by the concave and convex marks and the sub-information recording region where the sub-information necessary to reproduce the main information is recorded by the recordable mark formed by irradiating the laser light after the concave and convex marks are formed. The clock signal synchronized with the rotation of the disc is generated by the clock generator, and the angular position of the reference position in the main information recording region is extracted by the reference angle extracting unit. Subsequently, the laser light synchronized with the clock signal generated by the clock generator is irradiated from the recording starting point in the sub-information recording region specified based on the angular position extracted by the reference angle extracting unit by the sub-information recording unit to record the sub-information in a superimposition manner.

Accordingly, there is a displacement between a reference position and a recording starting point for sub-information due to a displacement of the recording starting point or a deviation of linear velocity or rotation speed on an illegally duplicated optical disc, wherefore the sub-information cannot be reproduced from a correct recording starting point. Hence, the correct sub-information cannot be reproduced from the illegally duplicated optical disc and the reproduction of the main information from the illegally duplicated optical disc can be prevented.

In the above optical disc recording device, the reference position is preferably specified by an address recorded by the concave and convex marks. According to this construction, the reference position in the main information recording region can be specified by the address recorded by the concave and convex marks.

In the above optical disc recording device, the cycle of the clock signal is preferably shorter than a cycle of recording the address. According to this construction, one or more recordable marks can be recorded in an address cycle since the cycle of the clock signal is shorter than the cycle of recording the address.

An optical disc reproduction device according to another aspect of the present invention is an optical disc reproduction device for reproducing main information and sub-information from an optical disc including a main information recording region where main information is recorded by concave and convex marks and a sub-information recording region where sub-information necessary to reproduce the main information is recorded by a recordable mark formed by irradiating laser light after the concave and convex marks are formed, the optical disc reproduction device comprising a clock generator for generating a clock signal synchronized with the rotation of the optical disc; a reference angle extracting unit for extracting an angular position of a reference position in the main information recording region; and a sub-information reproducing unit for reproducing the sub-information in synchronism with the clock signal generated by the clock generator from a reproduction starting point in the sub-information recording region specified based on the angular position extracted by the reference angle extracting unit.

According to this construction, the optical disc includes the main information recording region where the main information is recorded by the concave and convex marks and the sub-information recording region where the sub-information necessary to reproduce the main information is recorded by the recordable mark formed by irradiating laser light after the concave and convex marks are formed. The clock signal synchronized with the rotation of the disc is generated by the clock generator, and the angular position of the reference position in the main information recording region is extracted by the reference angle extracting unit. Subsequently, the sub-information is reproduced in synchronism with the clock signal generated by the clock generator from the reproduction starting point in the sub-information recording region specified based on the angular position extracted by the reference angle extracting unit.

Accordingly, there is a displacement between a reference position and a recording starting point for sub-information due to a displacement of the recording starting point or a deviation of linear velocity or rotation speed on an illegally duplicated optical disc, wherefore the sub-information cannot be reproduced from a correct recording starting point. Hence, the correct sub-information cannot be reproduced from the illegally duplicated optical disc and the reproduction of the main information from the illegally duplicated optical disc can be prevented.

In the above optical disc reproduction device, the reference position is preferably specified by an address recorded by the concave and convex marks. According to this construction, the reference position in the main information recording region can be specified by the address recorded by the concave and convex marks.

In the above optical disc reproduction device, the cycle of the clock signal is preferably shorter than a cycle of recording the address. According to this construction, one or more recordable marks can be recorded in an address cycle since the cycle of the clock signal is shorter than the cycle of recording the address.

The optical disc, the optical disc manufacturing method, the optical disc recording device and the optical disc reproduction device according to the present invention can not only record sub-information, but also prevent the illegal duplication on other optical discs even if the optical disc is a read-only optical disc. Thus, there can be provided an optical disc, an optical disc manufacturing method, an optical disc recording device and an optical disc reproduction device which hinder the illegal infringement of the copyright of main information recorded on the optical disc.

What is claimed is:

1. An optical disc, comprising:
concave and convex marks synchronized with an integral multiple of a channel bit length in accordance with modulated main information; and
a reflective film formed on the concave and the convex marks after the concave and convex marks are formed,
wherein after the optical disc is produced, continuous or intermittent laser light synchronized with the integral multiple of the channel bit length is irradiated at intervals longer than a longest one of the concave and convex marks in accordance with a spiral track formed in a circumferential direction of the concave and convex marks to change an optical characteristic of the reflective film, thereby forming a recordable mark to record sub-information necessary to reproduce the main information in a superimposition manner, and
the width of the recordable mark in a radial direction is narrower than that of the concave and convex marks in a radial direction.

2. An optical disc, comprising:
concave and convex marks synchronized with an integral multiple of a channel bit length in accordance with modulated main information; and
a reflective film formed on the concave and convex marks after the concave and convex marks are formed,
wherein after the optical disc is produced, continuous or intermittent laser light synchronized with the integral multiple of the channel bit length is irradiated at intervals longer than a longest one of the concave and convex marks in accordance with a spiral track formed in a circumferential direction of the concave and convex marks to change an optical characteristic of the reflective film, thereby forming a recordable mark to record sub-information necessary to reproduce the main information in a superimposition manner, and
the recordable mark is formed on the spiral track formed in the circumferential direction of the concave and convex marks.

3. An optical disc, comprising:
concave and convex marks synchronized with an integral multiple of a channel bit length in accordance with modulated main information; and
a reflective film formed on the concave and convex marks after the concave and convex marks are formed,
wherein after the optical disc is produced, continuous or intermittent laser light synchronized with the integral multiple of the channel bit length is irradiated at intervals longer than a longest one of the concave and convex marks in accordance with a spiral track formed in a circumferential direction of the concave and convex marks to change an optical characteristic of the reflective film, thereby forming a recordable mark to record sub-information necessary to reproduce the main information in a superimposition manner, and
the recordable mark is formed between track parts of the spiral track formed in the circumferential direction of the concave and convex marks.

4. An optical disc according to claim 3, wherein the recordable mark is formed at an intermediate position between a first track having the concave and convex marks and a second track adjacent to the first track.

5. An optical disc according to claim 3, wherein the recordable mark is formed closer to a first track than an intermediate position between a first track having the concave and convex marks and a second track adjacent to the first track.

6. An optical disc, comprising:
concave and convex marks synchronized with an integral multiple of a channel bit length in accordance with modulated main information; and
a reflective film formed on the concave and convex marks after the concave and convex marks are formed,
wherein after the optical disc is produced, continuous or intermittent laser light synchronized with the integral multiple of the channel bit length is irradiated at intervals longer than a longest one of the concave and convex marks in accordance with a spiral track formed in the circumferential direction of the concave and convex marks to change an optical characteristic of the reflective film, thereby forming a recordable mark to record sub-information necessary to reproduce the main information in a superimposition manner, and
1 bit of the sub-information is recorded with a plurality of recordable marks.

7. An optical disc according to claim 1, wherein 1 bit of the sub-information is recorded as a set of the recordable marks intermittently formed.

8. An optical disc according to claim 7, wherein the length of the recordable mark in the circumferential direction is equal to or shorter than a shortest mark length of the concave and convex marks in the circumferential direction.

9. An optical disc according to claim 7, wherein the length of the recordable mark in the circumferential direction is equal to or shorter than the channel bit length.

10. An optical disc according to claim 1, wherein a modulation factor of the recordable mark as a fluctuation of the reflected light level caused by forming the recordable mark is smaller than a modulation factor of the concave and convex marks as a difference between the reflected light level of the concave and convex marks and that of the reflective film other than the concave and convex marks.

11. An optical disc according to claim 10, wherein the modulation factor of the recordable mark is averagely smaller than half that of the concave and convex marks.

12. An optical disc according to claim 1, wherein the recordable mark is formed by increasing the reflectivity of the reflective film in a part irradiated with the laser light.

13. An optical disc according to claim 1, wherein the sub-information is recorded while being frequency diffused by a pseudo random sequence.

14. An optical disc, comprising:
concave and convex marks synchronized with an integral multiple of a channel bit length in accordance with modulated main information; and
a reflective film formed on the concave and convex marks after the concave and convex marks are formed,
wherein after the optical disc is produced, continuous or intermittent laser light synchronized with the integral multiple of the channel bit length is irradiated at intervals longer than a longest one of the concave and convex marks in accordance with a spiral track formed in the circumferential direction of the concave and convex marks to change an optical characteristic of the reflective film, thereby forming a recordable mark to record sub-information necessary to reproduce the main information in a superimposition manner, and
the sub-information is recorded by applying a PE modulation.

15. An optical disc, comprising:
concave and convex marks synchronized with an integral multiple of a channel bit length in accordance with modulated main information; and
a reflective film formed on the concave and convex marks after the concave and convex marks are formed,
wherein after the optical disc is produced, continuous or intermittent laser light synchronized with the integral multiple of the channel bit length is irradiated at intervals longer than the longest one of the concave and convex marks in accordance with a spiral track formed in the circumferential direction of the concave and convex marks to change an optical characteristic of the reflective film, thereby forming a recordable mark to record sub-information necessary to reproduce the main information in a superimposition manner, and
the recordable mark is formed in a direction orthogonal to the track on the concave and convex marks, and the sub-information includes physical position information indicating a physical position of a region, where the recordable mark is formed, on the optical disc.

* * * * *